US012804395B2

(12) United States Patent
Gao

(10) Patent No.: US 12,804,395 B2
(45) Date of Patent: Nov. 17, 2026

(54) AUTHENTICATION METHOD, DEVICE, AND SYSTEM

(71) Applicant: Yinwang Intelligent Technologies Co., Ltd., Shenzhen (CN)

(72) Inventor: Changjian Gao, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 229 days.

(21) Appl. No.: 17/563,706

(22) Filed: Dec. 28, 2021

(65) Prior Publication Data

US 2022/0124086 A1 Apr. 21, 2022

Related U.S. Application Data

(63) Continuation of application No. PCT/CN2020/092164, filed on May 25, 2020.

(30) Foreign Application Priority Data

Jun. 28, 2019 (CN) ......................... 201910579227.9

(51) Int. Cl.

*H04W 12/069* (2021.01)
*H04L 9/40* (2022.01)
*H04L 67/12* (2022.01)

(52) U.S. Cl.

CPC ......... *H04W 12/069* (2021.01); *H04L 63/061* (2013.01); *H04L 63/083* (2013.01); *H04L 63/0853* (2013.01); *H04L 63/0876* (2013.01); *H04L 67/12* (2013.01)

(58) Field of Classification Search

CPC ............... H04L 63/083; H04L 63/0853; H04L 63/0876; H04L 63/061; G06F 21/445
See application file for complete search history.

(56) References Cited

U.S. PATENT DOCUMENTS

| | | | | |
|---|---|---|---|---|
| 2008/0046732 | A1* | 2/2008 | Fu | H04L 9/083 726/4 |
| 2008/0083022 | A1 | 4/2008 | Lee et al. | |
| 2009/0144807 | A1 | 6/2009 | Zheng | |
| 2014/0114497 | A1 | 4/2014 | Miyake | |

(Continued)

FOREIGN PATENT DOCUMENTS

| | | |
|---|---|---|
| CN | 101123498 A | 2/2008 |
| CN | 101155029 A | 4/2008 |

(Continued)

*Primary Examiner* — Nicholas P Celani
(74) *Attorney, Agent, or Firm* — Conley Rose, P.C.

(57) ABSTRACT

An authentication server may obtain information about a plurality of nodes or information about a replacement node in an in-vehicle system, and perform authentication on the nodes based on the information about the nodes or perform authentication on the replacement node based on the information about the replacement node. After the authentication succeeds, the authentication server may further send an identifier of a subnode of a node, key information of the subnode of the node, an identifier of a parent node of the node, and key information of the parent node of the node to the node in the in-vehicle system. Therefore, when the in-vehicle system is started, the node performs authentication on another node in the in-vehicle system.

20 Claims, 32 Drawing Sheets

(56) References Cited

U.S. PATENT DOCUMENTS

| | | | | |
|---|---|---|---|---|
| 2014/0189828 | A1* | 7/2014 | Baghdasaryan | H04L 63/0861 726/6 |
| 2016/0080416 | A1* | 3/2016 | Purohit | H04L 12/18 713/151 |
| 2016/0219051 | A1* | 7/2016 | Morita | H04L 63/0869 |
| 2017/0099201 | A1* | 4/2017 | Segawa | H04L 43/0894 |
| 2018/0054734 | A1 | 2/2018 | Hahn et al. | |
| 2021/0021413 | A1* | 1/2021 | Simplicio | H04L 9/3066 |

FOREIGN PATENT DOCUMENTS

| | | | |
|---|---|---|---|
| CN | 101980558 | A | 2/2011 |
| CN | 103415011 | A | 11/2013 |
| CN | 105292020 | A | 2/2016 |
| CN | 105827587 | A | 8/2016 |
| CN | 107182052 | A | 9/2017 |
| EP | 1906619 | A2 | 4/2008 |

* cited by examiner

AUTHENTICATION METHOD, DEVICE, AND SYSTEM

CROSS-REFERENCE TO RELATED APPLICATIONS

This is a continuation of International Patent Application No. PCT/CN2020/092164 filed on May 25, 2020, which claims priority to Chinese Patent Application No. 201910579227.9 filed on Jun. 28, 2019. The disclosures of the aforementioned applications are hereby incorporated by reference in their entireties.

TECHNICAL FIELD

This disclosure relates to the field of internet of vehicles technologies, and in particular, to an authentication method, a device, and a system.

BACKGROUND

Functions of automobiles are increasing, and are developing towards intelligence and networking. Vehicle networking not only enables a vehicle factory to understand and track a vehicle status, but also brings a lot of convenience to user's daily life. However, if an unauthorized user operates or controls a vehicle by deeply connecting to a vehicle system through a network, user's vehicle safety is greatly threatened. For example, the unauthorized user may install an unauthorized device in a vehicle to listen to data of a vehicle-mounted device and send a malicious or false instruction. Consequently, a vehicle function is interfered with or damaged, and vehicle safety is affected. Therefore, how to ensure that a device installed in a vehicle is an authorized device has always attracted much attention.

In recent years, the industry has proposed a plurality of authentication methods to ensure that a device installed in a vehicle is an authorized device. However, these authentication methods are all for a specific device (for example, a gateway) in a vehicle. In other words, these methods can only ensure that a specific device (for example, a gateway) in a vehicle is an authorized device. Consequently, security of an in-vehicle system is degraded.

SUMMARY

Embodiments of this application provide an authentication method, a device, and a system, to perform authentication on a plurality of nodes in an in-vehicle system, thereby improving security of the in-vehicle system.

To achieve the foregoing objective, the following technical solutions are used in the embodiments of this application.

According to a first aspect, an embodiment of this application provides an authentication method. The authentication method is used to perform authentication on a plurality of nodes in an in-vehicle system. The method includes that an authentication server obtains information about the plurality of nodes, the authentication server receives authentication requests from the plurality of nodes, and the authentication server separately sends authentication responses for the plurality of nodes to the plurality of nodes based on the information about the plurality of nodes.

According to the technical solution provided in the first aspect, the authentication server may receive the authentication requests of the plurality of nodes in the in-vehicle system, and separately send the authentication responses for the plurality of nodes to the plurality of nodes based on the information about the plurality of nodes, so as to perform authentication on the plurality of nodes in the in-vehicle system, thereby improving security of the in-vehicle system.

With reference to the first aspect, in a first possible implementation, the information about the plurality of nodes includes identifiers of the plurality of nodes and key information of the plurality of nodes. Based on the first possible implementation of the first aspect, the authentication server may separately send the authentication responses for the plurality of nodes to the plurality of nodes based on the identifiers of the plurality of nodes and the key information of the plurality of nodes, so as to perform authentication on the plurality of nodes in the in-vehicle system, thereby improving security of the in-vehicle system.

With reference to the first aspect and the first possible implementation of the first aspect, in a second possible implementation, the plurality of nodes includes a primary authentication node and a plurality of secondary authentication nodes. If the authentication on the plurality of nodes succeeds, the method further includes that the authentication server sends an identifier of the secondary authentication node and key information of the secondary authentication node to the primary authentication node, and the authentication server sends an identifier of the primary authentication node and key information of the primary authentication node to the secondary authentication node. Based on the second possible implementation of the first aspect, after the authentication on the plurality of nodes succeeds, the authentication server may send the identifier of the secondary authentication node and the key information of the secondary authentication node to the primary authentication node, and send the identifier of the primary authentication node and the key information of the primary authentication node to the secondary authentication node. Therefore, when the in-vehicle system is started, the primary authentication node performs authentication on the secondary authentication node.

With reference to the second possible implementation of the first aspect, in a third possible implementation, the plurality of nodes further includes subnodes of the plurality of secondary authentication nodes. The method further includes that the authentication server generates an authentication key for each of the subnodes of the plurality of secondary authentication nodes, where subnodes of one secondary authentication node have a same authentication key, the authentication server sends an identifier and the authentication key of the subnode of the secondary authentication node to the secondary authentication node, and the authentication server sends the identifier of the secondary authentication node and the authentication key to the subnode of the secondary authentication node. Based on the third possible implementation of the first aspect, the authentication server may generate the authentication key for the subnode of the secondary authentication node, send the identifier and the authentication key of the subnode of the secondary authentication node to the secondary authentication node, and send the identifier of the secondary authentication node and the authentication key to the subnode of the secondary authentication node. Therefore, when the in-vehicle system is started, the secondary authentication node performs authentication on the subnode of the secondary authentication node. In addition, because subnodes of one secondary authentication node have a same authentication key, the secondary authentication node does not need to store a plurality of authentication keys, thereby saving computing resources of the secondary authentication node. Moreover, the secondary authentication node does not need to manage the plurality of authentication keys, thereby reducing a load of the secondary authentication node.

With reference to the first aspect and the various possible implementations of the first aspect, in a fourth possible implementation, the authentication server obtains an identifier of a replacement node and key information of the replacement node, the authentication server receives an authentication request from the replacement node, and the authentication server sends an authentication response for the replacement node to the replacement node based on the identifier of the replacement node and the key information of the replacement node. Based on the fourth possible implementation of the first aspect, the authentication server may receive the authentication request of the replacement node, and send the authentication response for the replacement node to the replacement node based on the identifier of the replacement node and the key information of the replacement node, so as to perform authentication on the replacement node, thereby improving security of the in-vehicle system.

With reference to the fourth possible implementation of the first aspect, in a fifth possible implementation, if the authentication on the replacement node succeeds and the replacement node has a parent node, the method further includes that the authentication server sends the identifier of the replacement node and the key information of the replacement node to the parent node of the replacement node, and the authentication server sends an identifier of the parent node of the replacement node and key information of the parent node of the replacement node to the replacement node. Based on the fifth possible implementation of the first aspect, if the authentication on the replacement node succeeds and the replacement node has the parent node, the authentication server sends the identifier of the replacement node and the key information of the replacement node to the parent node of the replacement node, and sends the identifier of the parent node of the replacement node and the key information of the parent node of the replacement node to the replacement node, so that the replacement node performs authentication on the parent node of the replacement node.

With reference to the fifth possible implementation of the first aspect, in a sixth possible implementation, if the replacement node is a subnode of a secondary authentication node, the key information of the replacement node and the key information of the parent node of the replacement node each include the authentication key. Based on the sixth possible implementation of the first aspect, if the replacement node is the subnode of the secondary authentication node, the authentication server sends the identifier of the replacement node and the authentication key to the secondary authentication node, and sends the identifier of the secondary authentication node and the authentication key to the replacement node, so that the replacement node performs authentication on the secondary authentication node. In addition, because subnodes of one secondary authentication node have a same authentication key, the secondary authentication node does not need to store a plurality of authentication keys, thereby saving computing resources of the secondary authentication node. Moreover, the secondary authentication node does not need to manage the plurality of authentication keys, thereby reducing a load of the secondary authentication node.

With reference to the fifth possible implementation of the first aspect and the sixth possible implementation of the first aspect, in a seventh possible implementation, if the replacement node has a subnode, the method further includes that the authentication server sends an identifier of the subnode of the replacement node and key information of the subnode of the replacement node to the replacement node, and the authentication server sends the identifier of the replacement node and the key information of the replacement node to the subnode of the replacement node. Based on the seventh possible implementation of the first aspect, if the replacement node has the subnode, the authentication server may send the identifier of the subnode of the replacement node and the key information of the subnode of the replacement node to the replacement node, and send the identifier of the replacement node and the key information of the replacement node to the subnode of the replacement node, so that the replacement node performs authentication on the subnode of the replacement node.

With reference to the fifth possible implementation of the first aspect, the sixth possible implementation of the first aspect, and the sixth possible implementation of the first aspect, in an eighth possible implementation, the method further includes that the authentication server receives an authentication complete message from the replacement node. Based on the eighth possible implementation of the first aspect, the authentication server may learn, by receiving the authentication complete message of the replacement node, whether the authentication performed by the replacement node on the subnode of the replacement node succeeds and/or whether the authentication performed by the replacement node on the parent node of the replacement node succeeds.

According to a second aspect, an embodiment of this application provides an authentication method. The authentication method is applied to an in-vehicle system. The in-vehicle system includes a plurality of nodes. The method includes that the plurality of nodes sends authentication requests of the plurality of nodes to an authentication server, and the plurality of nodes receive authentication responses for the plurality of nodes from the authentication server.

According to the technical solution provided in the second aspect, the in-vehicle system may send the authentication requests of the plurality of nodes to the authentication server, so that the authentication server performs authentication on the plurality of nodes in the in-vehicle system, thereby improving security of the in-vehicle system.

With reference to the second aspect, in a first possible implementation, the plurality of nodes includes a primary authentication node and a plurality of secondary authentication nodes. The primary authentication node is connected to the plurality of secondary authentication nodes. If the authentication on the plurality of nodes succeeds, the method further includes that the primary authentication node receives an identifier of the secondary authentication node and key information of the secondary authentication node from the authentication server, the secondary authentication node receives an identifier of the primary authentication node and key information of the primary authentication node from the authentication server, and the primary authentication node performs authentication on the secondary authentication node. Based on the first possible implementation of the second aspect, the primary authentication node may perform authentication on the secondary authentication node based on the identifier of the primary authentication node, the key information of the primary authentication node, the identifier of the secondary authentication node, and the key information of the secondary authentication node.

With reference to the first possible implementation of the second aspect, in a second possible implementation, the plurality of nodes further includes subnodes of the plurality of secondary authentication nodes. The secondary authentication node is connected to a subnode of the secondary authentication node. If the authentication performed by the primary authentication node on the secondary authentication node succeeds, the method further includes that the secondary authentication node receives an identifier and an authentication key of the subnode of the secondary authentication node from the authentication server, where the authentication key is generated by the authentication server for each of the subnodes of the plurality of secondary authentication nodes, and subnodes of one secondary authentication node have a same authentication key, the subnode of the secondary authentication node receives the identifier of the secondary authentication node and the authentication key from the authentication server, and the secondary authentication node performs authentication on the subnode of the secondary authentication node. Based on the second possible implementation of the second aspect, the secondary authentication node may perform authentication on the subnode of the secondary authentication node based on the identifier of the secondary authentication node, and the identifier and the authentication key of the subnode of the secondary authentication node. In addition, because subnodes of one secondary authentication node have a same authentication key, the secondary authentication node does not need to store a plurality of authentication keys, thereby saving computing resources of the secondary authentication node. Moreover, the secondary authentication node does not need to manage the plurality of authentication keys, thereby reducing a load of the secondary authentication node.

With reference to the second aspect and the various possible implementations of the second aspect, in a third possible implementation, the in-vehicle system further includes a replacement node. The method further includes that the replacement node sends an authentication request of the replacement node to the authentication server, and the replacement node receives an authentication response for the replacement node from the authentication server. Based on the third possible implementation of the second aspect, the replacement node in the in-vehicle system may send the authentication request of the replacement node to the authentication server, so that the authentication server performs authentication on the replacement node, thereby improving security of the in-vehicle system.

With reference to the third possible implementation of the second aspect, in a fourth possible implementation, if the authentication on the replacement node succeeds and the replacement node has a parent node, the method further includes that the parent node of the replacement node receives an identifier of the replacement node and key information of the replacement node from the authentication server, the replacement node receives an identifier of the parent node of the replacement node and key information of the parent node of the replacement node from the authentication server, and the replacement node performs two-way authentication on the parent node of the replacement node by using the identifier of the replacement node, the key information of the replacement node, the identifier of the parent node of the replacement node, and the key information of the parent node of the replacement node. Based on the fourth possible implementation of the second aspect, the replacement node may perform two-way authentication on the parent node of the replacement node by using the identifier of the replacement node, the key information of the replacement node, the identifier of the parent node of the replacement node, and the key information of the parent node of the replacement node.

With reference to the fourth possible implementation of the second aspect, in a fifth possible implementation, if the replacement node is a subnode of a secondary authentication node, the key information of the replacement node and the key information of the parent node of the replacement node each include the authentication key. Based on the fifth possible implementation of the second aspect, if the replacement node is the subnode of the secondary authentication node, the replacement node may perform two-way authentication on the parent node of the replacement node based on the identifier of the parent node of the replacement node, the identifier of the replacement node, and the authentication key. In addition, because subnodes of one secondary authentication node have a same authentication key, the secondary authentication node does not need to store a plurality of authentication keys, thereby saving computing resources of the secondary authentication node. Moreover, the secondary authentication node does not need to manage the plurality of authentication keys, thereby reducing a load of the secondary authentication node.

With reference to the fifth possible implementation of the second aspect, in a sixth possible implementation, if the authentication performed by the replacement node on the parent node of the replacement node succeeds, and the replacement node has a subnode, the method further includes that the replacement node receives an identifier of the subnode of the replacement node and key information of the subnode of the replacement node from the authentication server, the subnode of the replacement node receives the identifier of the replacement node and the key information of the replacement node from the authentication server, and the replacement node performs two-way authentication on the subnode of the replacement node by using the identifier of the subnode of the replacement node, the key information of the subnode of the replacement node, the identifier of the replacement node, and the key information of the replacement node. Based on the sixth possible implementation of the second aspect, if the authentication performed by the replacement node on the parent node of the replacement node succeeds, and the replacement node has the subnode, the replacement node performs two-way authentication on the subnode of the replacement node by using the identifier of the subnode of the replacement node, the key information of the subnode of the replacement node, the identifier of the replacement node, and the key information of the replacement node.

With reference to the fourth possible implementation of the second aspect, the fifth possible implementation of the second aspect, and the sixth possible implementation of the second aspect, in a seventh possible implementation, if the authentication performed by the replacement node on the parent node of the replacement node succeeds, or if the authentication performed by the replacement node on the parent node of the replacement node succeeds and the authentication performed by the replacement node on the subnode of the replacement node succeeds, the method further includes that the replacement node sends an authentication complete message to the authentication server. Based on the seventh possible implementation of the second aspect, the replacement node sends the authentication complete message to the authentication server, so that the authentication server learns whether the authentication performed by the replacement node on the subnode of the replacement node succeeds and/or whether the authentication performed by the replacement node on the parent node of the replacement node succeeds.

According to a third aspect, an embodiment of this application provides an authentication method. The method includes that a primary authentication node sends an authentication request of the primary authentication node to an authentication server, the primary authentication node receives an authentication response for the primary authentication node from the authentication server, and the primary authentication node receives an identifier of a secondary authentication node and key information of the secondary authentication node from the authentication server.

According to the technical solution provided in the third aspect, the primary authentication node may send the authentication request of the primary authentication node to the authentication server, so that the authentication server performs authentication on the primary authentication node. After the authentication on the primary authentication node succeeds, the primary authentication node receives the identifier of the secondary authentication node and the key information of the secondary authentication node from the authentication server, so that the primary authentication node performs authentication on the secondary authentication node.

With reference to the third aspect, in a first possible implementation, the method further includes that the primary authentication node performs authentication on the secondary authentication node. Based on the first possible implementation of the third aspect, the primary authentication node may perform authentication on the secondary authentication node, thereby improving security of an in-vehicle system.

With reference to the third aspect and the first possible implementation of the third aspect, in a second possible implementation, the primary authentication node is an initially deployed primary authentication node, or the primary authentication node is a primary authentication node obtained after device replacement. Based on the second possible implementation of the third aspect, regardless of whether the primary authentication node is an initially deployed primary authentication node or a primary authentication node obtained after device replacement, the primary authentication node may send the authentication request of the primary authentication node to the authentication server, so that the authentication server performs authentication on the primary authentication node.

According to a fourth aspect, an embodiment of this application provides an authentication method. The method includes that a secondary authentication node sends an authentication request of the secondary authentication node to an authentication server, the secondary authentication node receives an authentication response for the secondary authentication node from the authentication server, and the secondary authentication node receives an identifier of a primary authentication node and key information of the primary authentication node from the authentication server.

According to the technical solution provided in the fourth aspect, the secondary authentication node may send the authentication request of the secondary authentication node to the authentication server, so that the authentication server performs authentication on the secondary authentication node. After the authentication on the secondary authentication node succeeds, the secondary authentication node receives the identifier of the primary authentication node and the key information of the primary authentication node from the authentication server, so that the primary authentication node performs authentication on the secondary authentication node.

With reference to the fourth aspect, in a first possible implementation, the method further includes that the secondary authentication node receives an identifier and an authentication key of a subnode of the secondary authentication node from the authentication server, where the authentication key is generated by the authentication server for the subnode of the secondary authentication node, and the secondary authentication node performs authentication on the subnode of the secondary authentication node. Based on the first possible implementation of the fourth aspect, if the secondary authentication node has the subnode of the secondary authentication node, the secondary authentication node receives the identifier and the authentication key of the subnode of the secondary authentication node from the authentication server, so that the secondary authentication node can perform authentication on the subnode of the secondary authentication node, thereby improving security of an in-vehicle system.

With reference to the fourth aspect and the first possible implementation of the fourth aspect, in a second possible implementation, the secondary authentication node is an initially deployed secondary authentication node, or the secondary authentication node is a secondary authentication node obtained after device replacement. Based on the second possible implementation of the fourth aspect, regardless of whether the secondary authentication node is an initially deployed secondary authentication node or a secondary authentication node obtained after device replacement, the secondary authentication node may send the authentication request of the secondary authentication node to the authentication server, so that the authentication server performs authentication on the secondary authentication node.

According to a fifth aspect, an embodiment of this application provides an authentication method. The method includes that a subnode of a secondary authentication node sends an authentication request of the subnode of the secondary authentication node to an authentication server, the subnode of the secondary authentication node receives an authentication response for the subnode of the secondary authentication node from the authentication server, and the subnode of the secondary authentication node receives an identifier of the secondary authentication node and an authentication key from the authentication server, where the authentication key is generated by the authentication server for the subnode of the secondary authentication node.

According to the technical solution provided in the fifth aspect, the subnode of the secondary authentication node may send the authentication request of the subnode of the secondary authentication node to the authentication server, so that the authentication server performs authentication on the subnode of the secondary authentication node. After the authentication on the subnode of the secondary authentication node succeeds, the subnode of the secondary authentication node receives the identifier of the secondary authentication node and the authentication key from the authentication server, so that the secondary authentication node performs authentication on the subnode of the secondary authentication node.

With reference to the fifth aspect, in a first possible implementation, the subnode of the secondary authentication node is a subnode of an initially deployed secondary authentication node, or the subnode of the secondary authentication node is a subnode of a secondary authentication node obtained after device replacement. Based on the first possible implementation of the fifth aspect, regardless of whether the subnode of the secondary authentication node is a subnode of an initially deployed secondary authentication node or a subnode of a secondary authentication node obtained after device replacement, the subnode of the secondary authentication node may send the authentication request of the subnode of the secondary authentication node to the authentication server, so that the authentication server performs authentication on the subnode of the secondary authentication node.

According to a sixth aspect, an embodiment of this application provides an authentication server. The authentication server has functions of implementing the method described in the first aspect. The functions may be implemented by hardware, or may be implemented by hardware executing corresponding software. The hardware or the software includes one or more modules corresponding to the functions.

According to a seventh aspect, an embodiment of this application provides an in-vehicle system. The in-vehicle system has functions of implementing the method described in the second aspect. The functions may be implemented by hardware, or may be implemented by hardware executing corresponding software. The hardware or the software includes one or more modules corresponding to the functions.

According to an eighth aspect, an embodiment of this application provides a primary authentication node. The primary authentication node has functions of implementing the method described in the third aspect. The functions may be implemented by hardware, or may be implemented by hardware executing corresponding software. The hardware or the software includes one or more modules corresponding to the functions.

According to a ninth aspect, an embodiment of this application provides a secondary authentication node. The secondary authentication node has functions of implementing the method described in the fourth aspect. The functions may be implemented by hardware, or may be implemented by hardware executing corresponding software. The hardware or the software includes one or more modules corresponding to the functions.

According to a tenth aspect, an embodiment of this application provides a subnode of a secondary authentication node. The subnode of the secondary authentication node has functions of implementing the method described in the fifth aspect. The functions may be implemented by hardware, or may be implemented by hardware executing corresponding software. The hardware or the software includes one or more modules corresponding to the functions.

According to an eleventh aspect, an embodiment of this application provides an authentication server, including at least one processor, at least one memory, and a communications interface. The communications interface and the at least one memory are coupled to the at least one processor. The authentication server communicates with another device through the communications interface. The at least one memory is configured to store a computer program, so that the computer program is executed by the at least one processor to implement the authentication method according to the first aspect and the possible implementations of the first aspect.

According to a twelfth aspect, an embodiment of this application provides an in-vehicle system, including a primary authentication node, a secondary authentication node, and a subnode of the secondary authentication node. The primary authentication node may implement the authentication method according to the third aspect and the possible implementations of the third aspect. The secondary authentication node may implement the authentication method according to the fourth aspect and the possible implementations of the fourth aspect. The subnode of the secondary authentication node may implement the authentication method according to the fifth aspect and the possible implementations of the fifth aspect.

According to a thirteenth aspect, an embodiment of this application provides a primary authentication node, including at least one processor, at least one memory, and a communications interface. The communications interface and the at least one memory are coupled to the at least one processor. The primary authentication node communicates with another device through the communications interface. The at least one memory is configured to store a computer program, so that the computer program is executed by the at least one processor to implement the authentication method according to the third aspect and the possible implementations of the third aspect.

According to a fourteenth aspect, an embodiment of this application provides a secondary authentication node, including at least one processor, at least one memory, and a communications interface. The communications interface and the at least one memory are coupled to the at least one processor. The secondary authentication node communicates with another device through the communications interface. The at least one memory is configured to store a computer program, so that the computer program is executed by the at least one processor to implement the authentication method according to the fourth aspect and the possible implementations of the fourth aspect.

According to a fifteenth aspect, an embodiment of this application provides a subnode of a secondary authentication node, including at least one processor, at least one memory, and a communications interface. The communications interface and the at least one memory are coupled to the at least one processor. The subnode of the secondary authentication node communicates with another device through the communications interface. The at least one memory is configured to store a computer program, so that the computer program is executed by the at least one processor to implement the authentication method according to the fifth aspect and the possible implementations of the fifth aspect.

According to a sixteenth aspect, this application provides a system chip. The system chip may be applied to an authentication server. The system chip includes at least one processor. A related program instruction is executed by the at least one processor, to implement functions of the authentication server in the method according to the first aspect and any design of the first aspect. Optionally, the system chip may further include at least one memory, and the memory stores the related program instruction.

According to a seventeenth aspect, this application provides a system chip. The system chip may be applied to a primary authentication node in an in-vehicle system. The system chip includes at least one processor. A related program instruction is executed by the at least one processor, to implement functions of the primary authentication node in the method according to the third aspect and any design of the third aspect. Optionally, the system chip may further include at least one memory, and the memory stores the related program instruction.

According to an eighteenth aspect, this application provides a system chip. The system chip may be applied to a secondary authentication node in an in-vehicle system. The system chip includes at least one processor. A related program instruction is executed by the at least one processor, to implement functions of the secondary authentication node in the method according to the fourth aspect and any design of the fourth aspect. Optionally, the system chip may further include at least one memory, and the memory stores the related program instruction.

According to a nineteenth aspect, this application provides a system chip. The system chip may be applied to a subnode of a secondary authentication node in an in-vehicle system. The system chip includes at least one processor. A related program instruction is executed by the at least one processor, to implement functions of the subnode of the secondary authentication node in the method according to the fifth aspect and any design of the fifth aspect. Optionally, the system chip may further include at least one memory, and the memory stores the related program instruction.

According to a twentieth aspect, an embodiment of this application provides a computer-readable storage medium, for example, a non-transitory computer-readable storage medium. The computer-readable storage medium stores a computer program. When the computer program is run on a computer, the computer is enabled to perform the method according to the first aspect and the possible implementations of the first aspect. For example, the computer may be at least one storage node.

According to a twenty-first aspect, an embodiment of this application provides a computer-readable storage medium, for example, a non-transitory computer-readable storage medium. The computer-readable storage medium stores a computer program. When the computer program is run on a computer, the computer is enabled to perform the method according to the second aspect and the possible implementations of the second aspect. For example, the computer may be at least one storage node.

According to a twenty-second aspect, an embodiment of this application provides a computer-readable storage medium, for example, a non-transitory computer-readable storage medium. The computer-readable storage medium stores a computer program. When the computer program is run on a computer, the computer is enabled to perform the method according to the third aspect and the possible implementations of the third aspect. For example, the computer may be at least one storage node.

According to a twenty-third aspect, an embodiment of this application provides a computer-readable storage medium, for example, a non-transitory computer-readable storage medium. The computer-readable storage medium stores a computer program. When the computer program is run on a computer, the computer is enabled to perform the method according to the fourth aspect and the possible implementations of the fourth aspect. For example, the computer may be at least one storage node.

According to a twenty-fourth aspect, an embodiment of this application provides a computer-readable storage medium, for example, a non-transitory computer-readable storage medium. The computer-readable storage medium stores a computer program. When the computer program is run on a computer, the computer is enabled to perform the method according to the fifth aspect and the possible implementations of the fifth aspect. For example, the computer may be at least one storage node.

According to a twenty-fifth aspect, an embodiment of this application provides a computer program product. When the computer program product is run on a computer, the method according to the first aspect or the possible implementations of the first aspect is performed. For example, the computer may be at least one storage node.

According to a twenty-sixth aspect, an embodiment of this application provides a computer program product. When the computer program product is run on a computer, the computer is enabled to perform the method according to the second aspect and the possible implementations of the second aspect. For example, the computer may be at least one storage node.

According to a twenty-seventh aspect, an embodiment of this application provides a computer program product. When the computer program product is run on a computer, the computer is enabled to perform the method according to the third aspect and the possible implementations of the third aspect. For example, the computer may be at least one storage node.

According to a twenty-eighth aspect, an embodiment of this application provides a computer program product. When the computer program product is run on a computer, the computer is enabled to perform the method according to the fourth aspect and the possible implementations of the fourth aspect. For example, the computer may be at least one storage node.

According to a twenty-ninth aspect, an embodiment of this application provides a computer program product. When the computer program product is run on a computer, the computer is enabled to perform the method according to the fifth aspect and the possible implementations of the fifth aspect. For example, the computer may be at least one storage node.

According to a thirtieth aspect, an embodiment of this application provides a communications system. The communications system may include any one or more of the authentication server in the sixth aspect, the in-vehicle system in the seventh aspect, the primary authentication node in the eighth aspect, the secondary authentication node in the ninth aspect, the subnode of the secondary authentication node in the tenth aspect, the authentication server in the eleventh aspect, the in-vehicle system in the twelfth aspect, the primary authentication node in the thirteenth aspect, the secondary authentication node in the fourteenth aspect, the subnode of the secondary authentication node in the fifteenth aspect, the system chip in the sixteenth aspect, the system chip in the seventeenth aspect, the system chip in the eighteenth aspect, the system chip in the nineteenth aspect, the computer-readable storage medium in the twentieth aspect, the computer-readable storage medium in the twenty-first aspect, the computer-readable storage medium in the twenty-second aspect, the computer-readable storage medium in the twenty-third aspect, the computer-readable storage medium in the twenty-fourth aspect, the computer program product in the twenty-fifth aspect, the computer program product in the twenty-sixth aspect, the computer program product in the twenty-seventh aspect, the computer program product in the twenty-eighth aspect, or the computer program product in the twenty-ninth aspect.

It can be understood that any one of the authentication server, the in-vehicle system, the primary authentication node, the secondary authentication node, the subnode of the secondary authentication node, the system chip, the computer storage medium, the computer program product, the communications system, or the like provided above is configured to perform the corresponding method provided above. Therefore, for beneficial effects that can be achieved, refer to beneficial effects in the corresponding method. Details are not described herein again.

According to a thirty-first aspect, an embodiment of this application provides an authentication method. The authentication method is used to perform authentication on a plurality of nodes in an in-vehicle system. The method includes obtaining information about the plurality of nodes, receiving authentication requests from the plurality of nodes, and separately sending authentication responses for the plurality of nodes to the plurality of nodes based on the information about the plurality of nodes.

According to the technical solution provided in the thirty-first aspect, the authentication requests of the plurality of nodes in the in-vehicle system may be received, and the authentication responses for the plurality of nodes may be separately sent to the plurality of nodes based on the information about the plurality of nodes, so as to perform authentication on the plurality of nodes in the in-vehicle system, thereby improving security of the in-vehicle system.

With reference to the thirty-first aspect, in a first possible implementation, the information about the plurality of nodes includes identifiers of the plurality of nodes and key information of the plurality of nodes. Based on the first possible implementation of the thirty-first aspect, the authentication responses for the plurality of nodes may be separately sent to the plurality of nodes based on the identifiers of the plurality of nodes and the key information of the plurality of nodes, so as to perform authentication on the plurality of nodes in the in-vehicle system, thereby improving security of the in-vehicle system.

With reference to the thirty-first aspect and the first possible implementation of the thirty-first aspect, in a second possible implementation, the plurality of nodes includes a primary authentication node and a plurality of secondary authentication nodes. If the authentication on the plurality of nodes succeeds, the method further includes sending an identifier of the secondary authentication node and key information of the secondary authentication node to the primary authentication node, and sending an identifier of the primary authentication node and key information of the primary authentication node to the secondary authentication node. Based on the second possible implementation of the thirty-first aspect, after the authentication on the plurality of nodes succeeds, the identifier of the secondary authentication node and the key information of the secondary authentication node may be sent to the primary authentication node, and the identifier of the primary authentication node and the key information of the primary authentication node may be sent to the secondary authentication node. Therefore, when the in-vehicle system is started, the primary authentication node performs authentication on the secondary authentication node.

With reference to the second possible implementation of the thirty-first aspect, in a third possible implementation, the plurality of nodes further includes subnodes of the plurality of secondary authentication nodes. The method further includes generating an authentication key for each of the subnodes of the plurality of secondary authentication nodes, where subnodes of one secondary authentication node have a same authentication key, sending an identifier and the authentication key of the subnode of the secondary authentication node to the secondary authentication node, and sending the identifier of the secondary authentication node and the authentication key to the subnode of the secondary authentication node. Based on the third possible implementation of the thirty-first aspect, the authentication key may be generated for the subnode of the secondary authentication node, the identifier and the authentication key of the subnode of the secondary authentication node may be sent to the secondary authentication node, and the identifier of the secondary authentication node and the authentication key may be sent to the subnode of the secondary authentication node. Therefore, when the in-vehicle system is started, the secondary authentication node performs authentication on the subnode of the secondary authentication node. In addition, because subnodes of one secondary authentication node have a same authentication key, the secondary authentication node does not need to store a plurality of authentication keys, thereby saving computing resources of the secondary authentication node. Moreover, the secondary authentication node does not need to manage the plurality of authentication keys, thereby reducing a load of the secondary authentication node.

With reference to the thirty-first aspect and the various possible implementations of the thirty-first aspect, in a fourth possible implementation, the method further includes obtaining an identifier of a replacement node and key information of the replacement node, receiving an authentication request from the replacement node, and sending an authentication response for the replacement node to the replacement node based on the identifier of the replacement node and the key information of the replacement node. Based on the fourth possible implementation of the thirty-first aspect, the authentication request of the replacement node may be received, and the authentication response for the replacement node may be sent to the replacement node based on the identifier of the replacement node and the key information of the replacement node, so as to perform authentication on the replacement node, thereby improving security of the in-vehicle system.

With reference to the fourth possible implementation of the thirty-first aspect, in a fifth possible implementation, if the authentication on the replacement node succeeds and the replacement node has a parent node, the method further includes sending the identifier of the replacement node and the key information of the replacement node to the parent node of the replacement node, and sending an identifier of the parent node of the replacement node and key information of the parent node of the replacement node to the replacement node. Based on the fifth possible implementation of the thirty-first aspect, if the authentication on the replacement node succeeds and the replacement node has the parent node, the identifier of the replacement node and the key information of the replacement node are sent to the parent node of the replacement node, and the identifier of the parent node of the replacement node and the key information of the parent node of the replacement node are sent to the replacement node, so that the replacement node performs authentication on the parent node of the replacement node.

With reference to the fifth possible implementation of the thirty-first aspect, in a sixth possible implementation, if the replacement node is a subnode of a secondary authentication node, the key information of the replacement node and the key information of the parent node of the replacement node each include the authentication key. Based on the sixth possible implementation of the thirty-first aspect, if the replacement node is the subnode of the secondary authentication node, the identifier of the replacement node and the authentication key are sent to the secondary authentication node, and the identifier of the secondary authentication node and the authentication key are sent to the replacement node, so that the replacement node performs authentication on the secondary authentication node. In addition, because subnodes of one secondary authentication node have a same authentication key, the secondary authentication node does not need to store a plurality of authentication keys, thereby saving computing resources of the secondary authentication node. Moreover, the secondary authentication node does not need to manage the plurality of authentication keys, thereby reducing a load of the secondary authentication node.

With reference to the fifth possible implementation of the thirty-first aspect and the sixth possible implementation of the thirty-first aspect, in a seventh possible implementation, if the replacement node has a subnode, the method further includes sending an identifier of the subnode of the replacement node and key information of the subnode of the replacement node to the replacement node, and sending the identifier of the replacement node and the key information of the replacement node to the subnode of the replacement node. Based on the seventh possible implementation of the thirty-first aspect, if the replacement node has the subnode, the identifier of the subnode of the replacement node and the key information of the subnode of the replacement node may be sent to the replacement node, and the identifier of the replacement node and the key information of the replacement node may be sent to the subnode of the replacement node, so that the replacement node performs authentication on the subnode of the replacement node.

With reference to the fifth possible implementation of the thirty-first aspect, the sixth possible implementation of the thirty-first aspect, and the sixth possible implementation of the thirty-first aspect, in an eighth possible implementation, the method further includes receiving an authentication complete message from the replacement node. Based on the eighth possible implementation of the thirty-first aspect, it may be learned, by receiving the authentication complete message of the replacement node, whether the authentication performed by the replacement node on the subnode of the replacement node succeeds and/or whether the authentication performed by the replacement node on the parent node of the replacement node succeeds.

According to a thirty-second aspect, an embodiment of this application provides an authentication method. The authentication method is applied to an in-vehicle system. The in-vehicle system includes a plurality of nodes. The method includes sending authentication requests of the plurality of nodes to an authentication server, and receiving authentication responses for the plurality of nodes from the authentication server.

According to the technical solution provided in the thirty-second aspect, the authentication requests of the plurality of nodes may be sent to the authentication server, so that the authentication server performs authentication on the plurality of nodes in the in-vehicle system, thereby improving security of the in-vehicle system.

With reference to the thirty-second aspect, in a first possible implementation, the plurality of nodes includes a primary authentication node and a plurality of secondary authentication nodes. The primary authentication node is connected to the plurality of secondary authentication nodes. If the authentication on the plurality of nodes succeeds, the method further includes receiving an identifier of the secondary authentication node and key information of the secondary authentication node from the authentication server, receiving an identifier of the primary authentication node and key information of the primary authentication node from the authentication server, and performing authentication on the secondary authentication node. Based on the first possible implementation of the thirty-second aspect, authentication may be performed on the secondary authentication node based on the identifier of the primary authentication node, the key information of the primary authentication node, the identifier of the secondary authentication node, and the key information of the secondary authentication node.

With reference to the first possible implementation of the thirty-second aspect, in a second possible implementation, the plurality of nodes further includes subnodes of the plurality of secondary authentication nodes. The secondary authentication node is connected to a subnode of the secondary authentication node. If the authentication performed by the primary authentication node on the secondary authentication node succeeds, the method further includes receiving an identifier and an authentication key of the subnode of the secondary authentication node from the authentication server, where the authentication key is generated by the authentication server for each of the subnodes of the plurality of secondary authentication nodes, and subnodes of one secondary authentication node have a same authentication key, receiving the identifier of the secondary authentication node and the authentication key from the authentication server, and performing authentication on the subnode of the secondary authentication node. Based on the second possible implementation of the thirty-second aspect, authentication may be performed on the subnode of the secondary authentication node based on the identifier of the secondary authentication node, and the identifier and the authentication key of the subnode of the secondary authentication node. In addition, because subnodes of one secondary authentication node have a same authentication key, the secondary authentication node does not need to store a plurality of authentication keys, thereby saving computing resources of the secondary authentication node. Moreover, the secondary authentication node does not need to manage the plurality of authentication keys, thereby reducing a load of the secondary authentication node.

With reference to the thirty-second aspect and the various possible implementations of the thirty-second aspect, in a third possible implementation, the in-vehicle system further includes a replacement node. The method further includes sending an authentication request of the replacement node to the authentication server, and receiving an authentication response for the replacement node from the authentication server. Based on the third possible implementation of the thirty-second aspect, the authentication request of the replacement node may be sent to the authentication server, so that the authentication server performs authentication on the replacement node, thereby improving security of the in-vehicle system.

With reference to the third possible implementation of the thirty-second aspect, in a fourth possible implementation, if the authentication on the replacement node succeeds and the replacement node has a parent node, the method further includes receiving an identifier of the replacement node and key information of the replacement node from the authentication server, receiving an identifier of the parent node of the replacement node and key information of the parent node of the replacement node from the authentication server, and performing two-way authentication on the parent node of the replacement node by using the identifier of the replacement node, the key information of the replacement node, the identifier of the parent node of the replacement node, and the key information of the parent node of the replacement node. Based on the fourth possible implementation of the thirty-second aspect, the replacement node may perform two-way authentication on the parent node of the replacement node by using the identifier of the replacement node, the key information of the replacement node, the identifier of the parent node of the replacement node, and the key information of the parent node of the replacement node.

With reference to the fourth possible implementation of the thirty-second aspect, in a fifth possible implementation, if the replacement node is a subnode of a secondary authentication node, the key information of the replacement node and the key information of the parent node of the replacement node each include the authentication key. Based on the fifth possible implementation of the thirty-second aspect, if the replacement node is the subnode of the secondary authentication node, the replacement node may perform two-way authentication on the parent node of the replacement node based on the identifier of the parent node of the replacement node, the identifier of the replacement node, and the authentication key. In addition, because subnodes of one secondary authentication node have a same authentication key, the secondary authentication node does not need to store a plurality of authentication keys, thereby saving computing resources of the secondary authentication node. Moreover, the secondary authentication node does not need to manage the plurality of authentication keys, thereby reducing a load of the secondary authentication node.

With reference to the fifth possible implementation of the thirty-second aspect, in a sixth possible implementation, if the authentication performed by the replacement node on the parent node of the replacement node succeeds, and the replacement node has a subnode, the method further includes receiving an identifier of the subnode of the replacement node and key information of the subnode of the replacement node from the authentication server, receiving the identifier of the replacement node and the key information of the replacement node from the authentication server, and performing two-way authentication on the subnode of the replacement node by using the identifier of the subnode of the replacement node, the key information of the subnode of the replacement node, the identifier of the replacement node, and the key information of the replacement node. Based on the sixth possible implementation of the thirty-second aspect, if the authentication performed by the replacement node on the parent node of the replacement node succeeds, and the replacement node has the subnode, the replacement node performs two-way authentication on the subnode of the replacement node by using the identifier of the subnode of the replacement node, the key information of the subnode of the replacement node, the identifier of the replacement node, and the key information of the replacement node.

With reference to the fourth possible implementation of the thirty-second aspect, the fifth possible implementation of the thirty-second aspect, and the sixth possible implementation of the thirty-second aspect, in a seventh possible implementation, if the authentication performed by the replacement node on the parent node of the replacement node succeeds, or if the authentication performed by the replacement node on the parent node of the replacement node succeeds and the authentication performed by the replacement node on the subnode of the replacement node succeeds, the method further includes sending an authentication complete message to the authentication server. Based on the seventh possible implementation of the thirty-second aspect, the authentication complete message is sent to the authentication server, so that the authentication server learns whether the authentication performed by the replacement node on the subnode of the replacement node succeeds and/or whether the authentication performed by the replacement node on the parent node of the replacement node succeeds.

According to a thirty-third aspect, an embodiment of this application provides an authentication method. The method includes sending an authentication request of a primary authentication node to an authentication server, receiving an authentication response for the primary authentication node from the authentication server, and receiving an identifier of a secondary authentication node and key information of the secondary authentication node from the authentication server.

According to the technical solution provided in the thirty-third aspect, the authentication request of the primary authentication node may be sent to the authentication server, so that the authentication server performs authentication on the primary authentication node. After the authentication on the primary authentication node succeeds, the primary authentication node receives the identifier of the secondary authentication node and the key information of the secondary authentication node from the authentication server, so that the primary authentication node performs authentication on the secondary authentication node.

With reference to the thirty-third aspect, in a first possible implementation, the method further includes performing authentication on the secondary authentication node. Based on the first possible implementation of the thirty-third aspect, authentication may be performed on the secondary authentication node, thereby improving security of an in-vehicle system.

With reference to the thirty-third aspect and the first possible implementation of the thirty-third aspect, in a second possible implementation, the primary authentication node is an initially deployed primary authentication node, or the primary authentication node is a primary authentication node obtained after device replacement. Based on the second possible implementation of the thirty-third aspect, regardless of whether the primary authentication node is an initially deployed primary authentication node or a primary authentication node obtained after device replacement, the primary authentication node may send the authentication request of the primary authentication node to the authentication server, so that the authentication server performs authentication on the primary authentication node.

According to a thirty-fourth aspect, an embodiment of this application provides an authentication method. The method includes sending an authentication request of a secondary authentication node to an authentication server, receiving an authentication response for the secondary authentication node from the authentication server, and receiving an identifier of a primary authentication node and key information of the primary authentication node from the authentication server.

According to the technical solution provided in the thirty-fourth aspect, the authentication request of the secondary authentication node may be sent to the authentication server, so that the authentication server performs authentication on the secondary authentication node. After the authentication on the secondary authentication node succeeds, the secondary authentication node receives the identifier of the primary authentication node and the key information of the primary authentication node from the authentication server, so that the secondary authentication node performs authentication on the primary authentication node.

With reference to the thirty-fourth aspect, in a first possible implementation, the method further includes receiving an identifier and an authentication key of a subnode of the secondary authentication node from the authentication server, where the authentication key is generated by the authentication server for the subnode of the secondary authentication node, and performing authentication on the subnode of the secondary authentication node. Based on the first possible implementation of the thirty-fourth aspect, if the secondary authentication node has the subnode of the secondary authentication node, the secondary authentication node receives the identifier and the authentication key of the subnode of the secondary authentication node from the authentication server, so that the secondary authentication node performs authentication on the subnode of the secondary authentication node, thereby improving security of an in-vehicle system.

With reference to the thirty-fourth aspect and the first possible implementation of the thirty-fourth aspect, in a second possible implementation, the secondary authentication node is an initially deployed secondary authentication node, or the secondary authentication node is a secondary authentication node obtained after device replacement. Based on the second possible implementation of the thirty-fourth aspect, regardless of whether the secondary authentication node is an initially deployed secondary authentication node or a secondary authentication node obtained after device replacement, the secondary authentication node may send the authentication request of the secondary authentication node to the authentication server, so as to perform authentication on the authentication server.

According to a thirty-fifth aspect, an embodiment of this application provides an authentication method. The method includes sending an authentication request of a subnode of a secondary authentication node to an authentication server, receiving an authentication response for the subnode of the secondary authentication node from the authentication server, and receiving an identifier of the secondary authentication node and an authentication key from the authentication server, where the authentication key is generated by the authentication server for the subnode of the secondary authentication node.

According to the technical solution provided in the thirty-fifth aspect, the authentication request of the subnode of the secondary authentication node may be sent to the authentication server, so that the authentication server performs authentication on the subnode of the secondary authentication node. After the authentication on the subnode of the secondary authentication node succeeds, the subnode of the secondary authentication node receives the identifier of the secondary authentication node and the authentication key from the authentication server, so that the subnode of the secondary authentication node performs authentication on the secondary authentication node.

With reference to the thirty-fifth aspect, in a first possible implementation, the subnode of the secondary authentication node is a subnode of an initially deployed secondary authentication node, or the subnode of the secondary authentication node is a subnode of a secondary authentication node obtained after device replacement. Based on the first possible implementation of the thirty-fifth aspect, regardless of whether the subnode of the secondary authentication node is a subnode of an initially deployed secondary authentication node or a subnode of a secondary authentication node obtained after device replacement, the subnode of the secondary authentication node may send the authentication request of the subnode of the secondary authentication node to the authentication server, so as to perform authentication on the authentication server.

DESCRIPTION OF EMBODIMENTS

The following describes implementations of the embodiments of this application in detail with reference to the accompanying drawings.

It should be noted that an authentication method provided in the embodiments of this application may be applied to a system that includes a plurality of devices between which there is a hierarchical relationship, for example, an in-vehicle system, a system including a device on an airplane, or a system including a device on a D-train or a G-train. This application is described by using an in-vehicle system as an example. For an authentication method in another type of system, refer to specific descriptions of the authentication method for the in-vehicle system. Details are not described again.

Figure 1A:
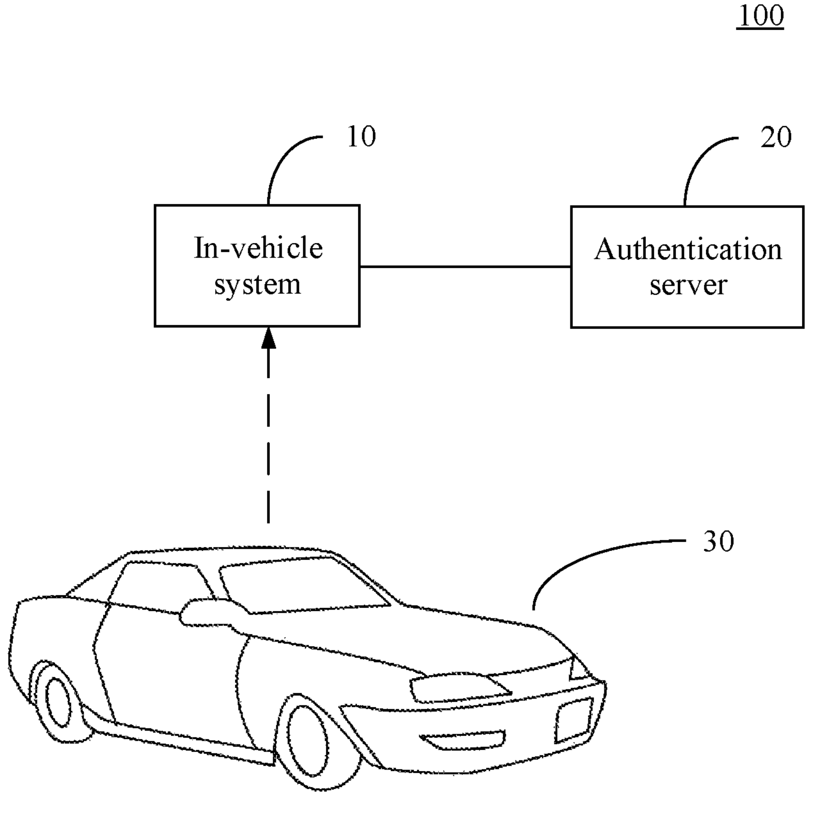
FIG. 1A is a schematic architectural diagram of an authentication system according to an embodiment of this application.

FIG. 1A is a schematic architectural diagram of an authentication system 100 according to an embodiment of this application. In FIG. 1A, the authentication system 100 may include an in-vehicle system 10 and an authentication server 20.

The in-vehicle system 10 in FIG. 1A may include a plurality of electronic devices in a vehicle 30. For example, the in-vehicle system 10 may include devices such as a vehicle-mounted telematics box (T-Box), a gateway, a domain controller, an on-board diagnostics (OBD), and an advanced driver-assistance system (ADAS). Further, an architecture of the in-vehicle system 10 may be shown in FIG. 1B.

Figure 1B:
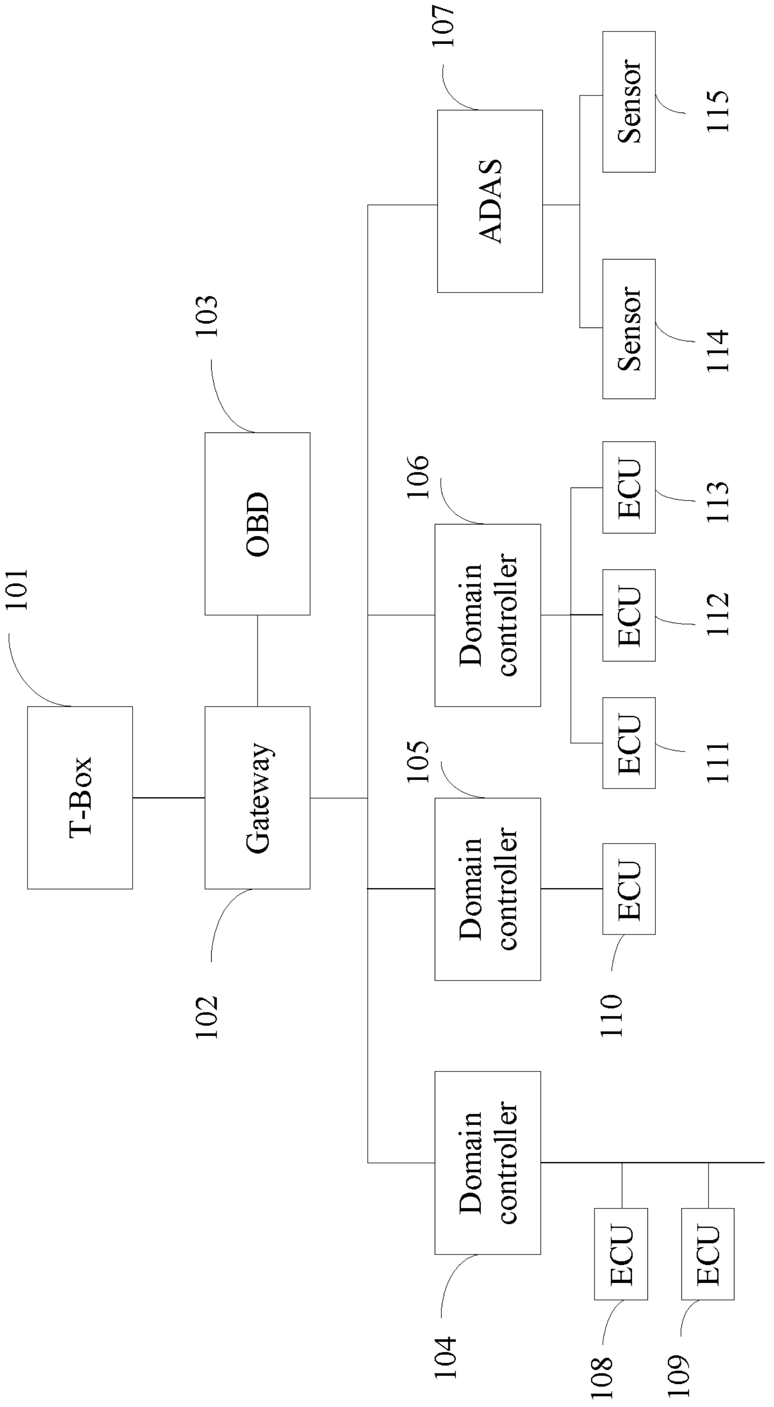
FIG. 1B is a schematic architectural diagram of an in-vehicle system according to an embodiment of this application.

FIG. 1B is a schematic composition diagram of the in-vehicle system 10 according to an embodiment of this application. As shown in FIG. 1B, the in-vehicle system 10 includes a T-Box 101, a gateway 102, an OBD 103, a domain controller 104 to a domain controller 106, an ADAS 107, an electronic control unit (ECU) 108 to an ECU 113, and a sensor 114 and a sensor 115.

The T-Box 101 and the gateway 102 may be connected through the Ethernet. The gateway 102 and the OBD 103 may be connected through the Ethernet or a Controller Area Network (CAN). The gateway 102 and the domain controller may be connected through the Ethernet or the CAN. For example, the gateway 102 and the domain controller 104 may be connected through the Ethernet or the CAN. The gateway 102 and the ADAS 107 may be connected through the Ethernet or the CAN. The domain controller and the ECU may be connected through the Ethernet or the CAN, and the ADAS and the sensor may be connected through the Ethernet or the CAN. For example, the domain controller 104 and the ECU may be connected through the Ethernet or the CAN, and the ADAS 107 and the sensor 114 may be connected through the Ethernet or the CAN.

The T-Box 101 may be configured to communicate with an external device of the in-vehicle system 10 and an internal device of the in-vehicle system 10. The external device of the in-vehicle system 10 may be described as a device outside the in-vehicle system 10, for example, the authentication server 20 in FIG. 1A. The internal device of the in-vehicle system 10 may be a device shown in FIG. 1B, for example, the gateway 102, the OBD 103, or the domain controller 104.

The T-Box 101 may communicate with the internal device of the in-vehicle system 10 to obtain information about the internal device of the in-vehicle system 10 (for example, to obtain an identifier of the gateway 102). The T-Box 101 may further communicate with the internal device of the in-vehicle system 10 to forward (or transparently transmit), to the internal device of the in-vehicle system 10, received information that is sent by the external device of the in-vehicle system 10 (for example, to forward (or transparently transmit), to the gateway 102, an identifier of the T-Box 101 that is sent by the authentication server 20). The T-Box 101 may communicate with the external device of the in-vehicle system 10 to perform authentication on the in-vehicle system 10. The T-Box 101 may further communicate with the external device of the in-vehicle system 10 to receive information that is sent by the external device of the in-vehicle system 10 to the internal device of the in-vehicle system 10 (for example, the identifier of the T-Box 101 that is sent by the authentication server 20 to the gateway 102). The T-Box 101 may further communicate with the external device of the in-vehicle system 10 to forward (or transparently transmit) obtained information about the internal device of the in-vehicle system 10 to the external device of the in-vehicle system 10 (for example, to forward (or transparently transmit) the obtained identifier of the gateway 102 to the authentication server 20).

The gateway 102 may be configured to connect two networks with different protocols (for example, the gateway 102 may connect the Ethernet and the CAN to each other). The OBD 103 may be configured to monitor a running status of an engine and a working status of an exhaust gas postprocessing system. The domain controller may be configured to manage domains (for example, a power assembly domain, a vehicle body electronic domain, a vehicle security domain, and an entertainment information domain) in which electronic devices having different functions in the vehicle 30 are located. For example, the domain controller 104 may be configured to manage the entertainment information domain in the vehicle 30. The ADAS 107 may be configured to perform proactive determining and take a preventive action in an emergency to prevent a danger and assist driving. The ECU may be configured to perform a preset control function. For example, the ECU 108 may be configured to control engine running, and the ECU 110 may be configured to protect vehicle safety. The sensor is configured to complete a sensing task of the ADAS 107. For example, the sensor 114 may be configured to detect a location of an obstacle.

It should be understood that the architecture of the in-vehicle system 10 shown in FIG. 1B is merely used as an example, and is not intended to limit the technical solutions of this application. A person skilled in the art should understand that, in a specific implementation process, the in-vehicle system 10 may further include another device, and a quantity of each type of devices (for example, domain controllers) in the in-vehicle system 10 may also be determined according to a specific requirement.

The authentication server 20 in FIG. 1A may be configured to perform authentication on the device in the in-vehicle system 10, for example, perform authentication on the T-Box 101 in FIG. 1B, perform authentication on the gateway 102 in FIG. 1B, perform authentication on the OBD 103 in FIG. 1B, perform authentication on the domain controller 104 to the domain controller 106 in FIG. 1B, perform authentication on the ADAS 107 in FIG. 1B, perform authentication on the ECU 108 to the ECU 113 in FIG. 1B, and perform authentication on the sensor 114 and the sensor 115 in FIG. 1B.

It should be understood that the authentication system 100 shown in FIG. 1A is merely used as an example, and is not intended to limit the technical solutions of this application. A person skilled in the art should understand that, in a specific implementation process, the authentication system 100 may further include another device, and quantities of devices in the authentication server 20 and the in-vehicle system 10 may also be determined according to a specific requirement. This is not limited.

In other approaches, in a possible implementation, the authentication server 20 performs authentication on the device in the in-vehicle system 10 by using a public key password-based digital signature authentication method.

Figure 2A:
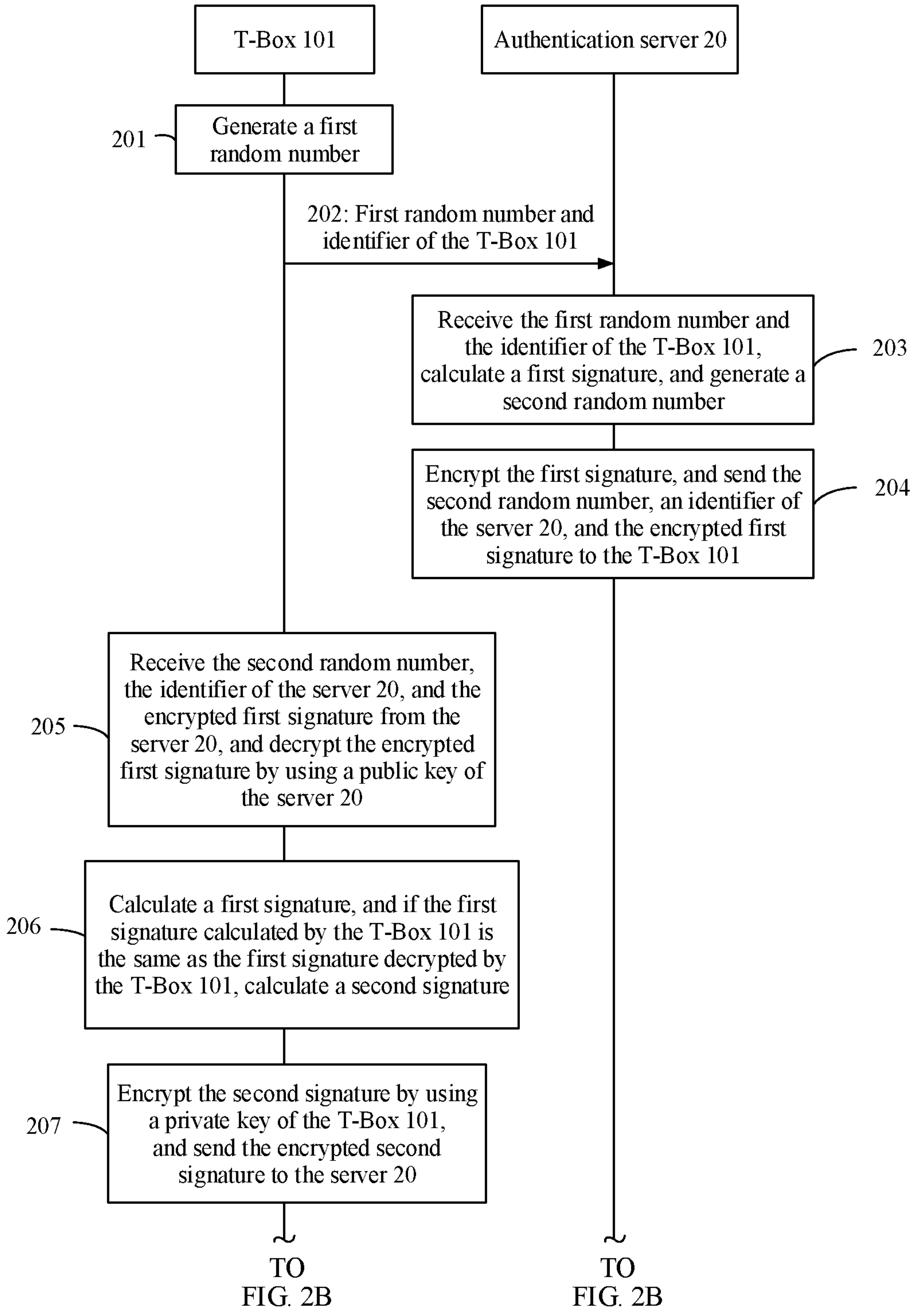
FIG. 2A and FIG. 2B are a schematic flowchart of a public key password based digital signature authentication method according to an embodiment of this application.
Figure 2B:
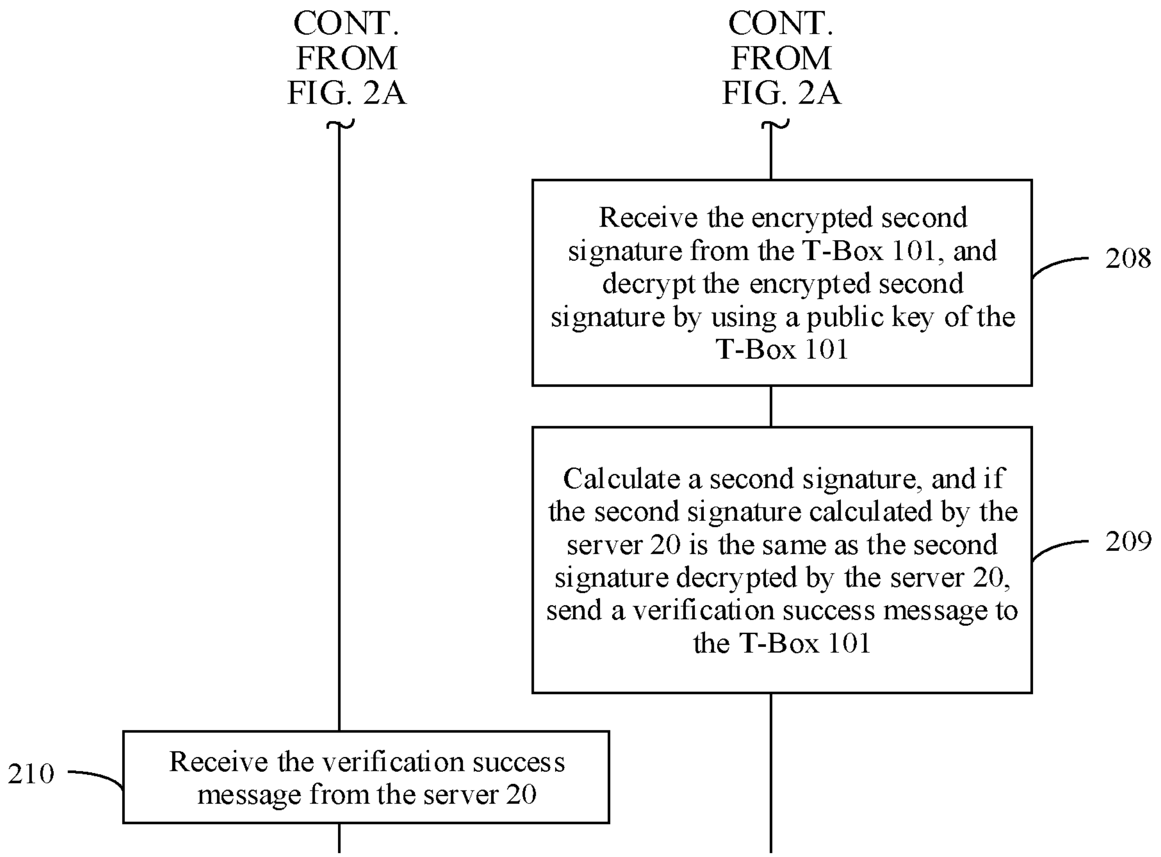

With reference to FIG. 2A and FIG. 2B, an example in which the authentication server 20 performs authentication on the T-Box 101 in FIG. 1B by using the public key password-based digital signature authentication method is used below for description.

As shown in FIG. 2A and FIG. 2B, the authentication method includes step 201 to step 210.

Step 201: The T-Box 101 generates a first random number.

Step 202: The T-Box 101 sends the first random number and an identifier of the T-Box 101 to the authentication server 20.

Step 203: The authentication server 20 receives the first random number and the identifier of the T-Box 101 from the T-Box 101, calculates a first signature, and generates a second random number.

Step 204: The authentication server 20 encrypts the first signature by using a private key of the authentication server 20, and sends the second random number, an identifier of the authentication server 20, and the encrypted first signature to the T-Box 101.

Step 205: The T-Box 101 receives the second random number, the identifier of the authentication server 20, and the encrypted first signature from the authentication server 20, and decrypts the encrypted first signature by using a public key of the authentication server 20.

The T-Box 101 may pre-store the public key of the authentication server 20. If the T-Box 101 does not store the public key of the authentication server 20, the authentication server 20 may send the public key to the T-Box 101 before step 205.

Step 206: The T-Box 101 calculates a first signature, and if the first signature calculated by the T-Box 101 is the same as the first signature decrypted by the T-Box 101, the T-Box 101 calculates a second signature.

Step 207: The T-Box 101 encrypts the second signature by using a private key of the T-Box 101, and sends the encrypted second signature to the authentication server 20.

Step 208: The authentication server 20 receives the encrypted second signature from the T-Box 101, and decrypts the encrypted second signature by using a public key of the T-Box 101.

The authentication server 20 may pre-store the public key of the T-Box 101. If the authentication server 20 does not store the public key of the T-Box 101, the T-Box 101 may send the public key to the authentication server 20 before step 208.

Step 209: The authentication server 20 calculates a second signature, and if the second signature calculated by the authentication server 20 is the same as the second signature decrypted by the authentication server 20, the authentication server 20 sends an authentication success message to the T-Box 101.

Step 210: The T-Box 101 receives the authentication success message from the authentication server 20.

According to the method shown in FIG. 2A and FIG. 2B, the authentication server 20 may perform authentication on the T-Box 101. However, when the authentication server 20 performs authentication on the device in the in-vehicle system 10, the following problems exist: (1) The T-Box 101 (or the authentication server 20) needs to store the public key of the authentication server 20 (or the T-Box 101) and the private key of the T-Box 101 (or the authentication server 20). (2) The T-Box 101 (or the authentication server 20) needs to encrypt a message by using the private key of the T-Box 101 (or the authentication server 20). After receiving the encrypted message, the authentication server 20 (or the T-Box 101) needs to decrypt the encrypted message by using the public key of the T-Box 101 (or the authentication server 20). Specific computing resources need to be occupied to store a public key, and encrypt and decrypt a message. Therefore, the method shown in FIG. 2A and FIG. 2B is not applicable to the authentication server 20 and the T-Box 101 having limited computing resources.

In another possible implementation, the authentication server 20 may perform authentication on the device in the in-vehicle system 10 by using a challenge/response-based identity authentication method.

An example in which the authentication server 20 performs authentication on the T-Box 101 in FIG. 1B by using the challenge/response-based identity authentication method is used below for description.

Figure 3:
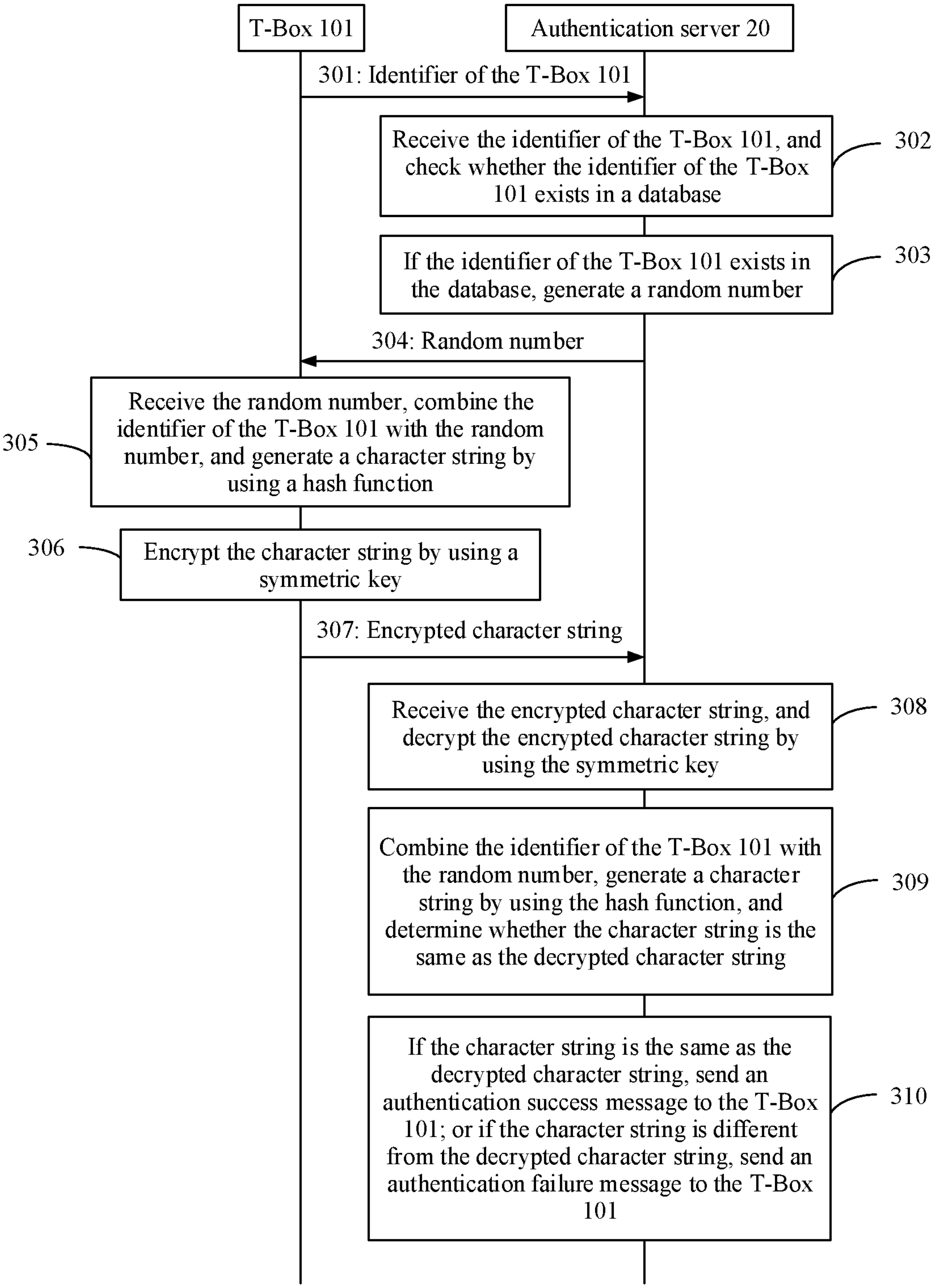
FIG. 3 is a schematic flowchart of a challenge/response based identity authentication method according to an embodiment of this application.

As shown in FIG. 3, the method includes step 301 to step 310.

Step 301: The T-Box 101 sends an identifier of the T-Box 101 to the authentication server 20.

Step 302: The authentication server 20 receives the identifier of the T-Box 101 from the T-Box 101, and checks whether the identifier of the T-Box 101 exists in a database.

Step 303: If the identifier of the T-Box 101 exists in the database, the authentication server 20 generates a random number.

Step 304: The authentication server 20 sends the random number to the T-Box 101.

Step 305: The T-Box 101 receives the random number from the authentication server 20, combines the identifier of the T-Box 101 with the random number, and generates a character string by using a hash function.

Step 306: The T-Box 101 encrypts the character string by using a symmetric key.

The symmetric key may be pre-stored in the T-Box 101.

Step 307: The T-Box 101 sends the encrypted character string to the authentication server 20.

Step 308: The authentication server 20 receives the encrypted character string from the T-Box 101, and decrypts the encrypted character string by using a symmetric key.

The symmetric key may be pre-stored in the authentication server 20. If the authentication server 20 does not store the symmetric key, the T-Box 101 may send the symmetric key to the authentication server 20 before step 308.

Step 309: The authentication server 20 combines the identifier of the T-Box 101 with the random number, generates a character string by using the hash function, and determines whether the character string is the same as the decrypted character string.

Step 310: If the character string is the same as the decrypted character string, the authentication server 20 sends an authentication success message to the T-Box 101, or if the character string is different from the decrypted character string, the authentication server 20 sends an authentication failure message to the T-Box 101.

According to the method shown in FIG. 3, the authentication server 20 may perform authentication on the T-Box 101. In a process in which the authentication server 20 performs authentication on the T-Box 101, the T-Box 101 encrypts a message by using the symmetric key, and the authentication server 20 decrypts the message by using the symmetric key. Therefore, the T-Box 101 (or the authentication server 20) does not need to store a public key of the authentication server 20 (or the T-Box 101) and a private key of the T-Box 101 (or the authentication server 20), but only needs to store the symmetric key. In addition, a relatively small quantity of computing resources is occupied to encrypt and decrypt a message by using the symmetric key. Therefore, the method shown in FIG. 3 needs fewer computing resources of an authentication device. However, security of performing authentication by using a symmetric key is relatively low. Therefore, the method shown in FIG. 3 is not applicable to a case of performing authorized authentication having a high security requirement on the in-vehicle system 10 and an external device (for example, the authentication server 20).

It is learned from the other approaches authentication procedure that, in the method shown in FIG. 2A and FIG. 2B and the method shown in FIG. 3, authentication is performed on a specific device (for example, the T-Box 101) in the in-vehicle system 10 instead of the plurality of devices in the in-vehicle system 10.

To resolve an existing problem that authentication cannot be performed on the plurality of devices in the in-vehicle system 10, in the embodiments of this application, the authentication server may obtain information about each device in the in-vehicle system, and perform authentication on each device in the in-vehicle system based on the information about the device. For a specific process of the authentication method, refer to descriptions in embodiments corresponding to methods shown in FIG. 5 and FIG. 8A to FIG. 8C. According to the method, the authentication server 20 may perform authentication on the plurality of devices in the in-vehicle system 10, thereby improving security of the in-vehicle system 10.

Figure 4:
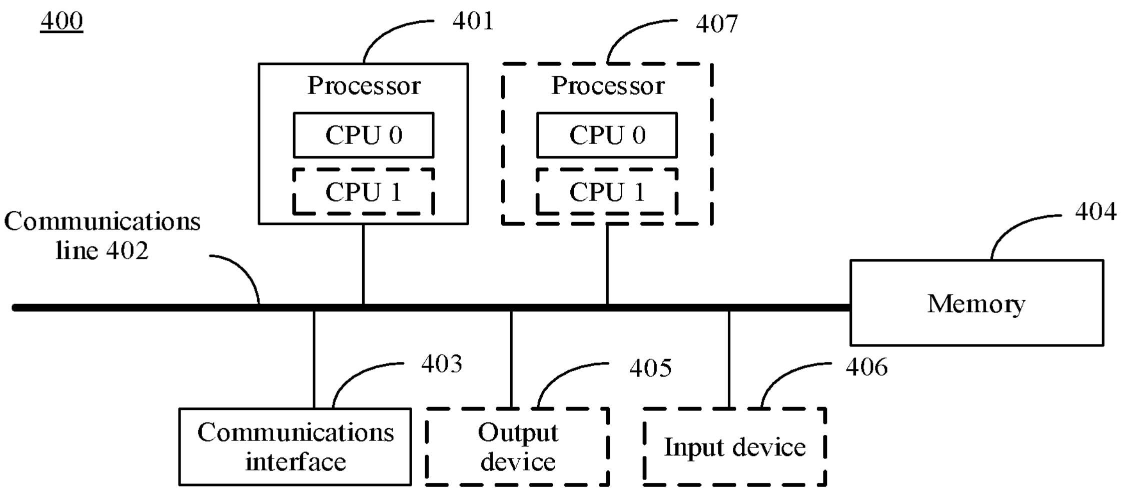
FIG. 4 is a schematic diagram of a hardware structure of an authentication device according to an embodiment of this application.

During specific implementation, the authentication server 20 shown in FIG. 1A and the devices (for example, the T-Box 101 and the gateway 102) shown in FIG. 1B each may use a composition structure shown in FIG. 4, or include a component shown in FIG. 4.

FIG. 4 is a schematic composition diagram of an authentication device 400 according to an embodiment of this application. The authentication device 400 may be a centralized controller or a chip or a system-on-a-chip in the centralized controller, or may be a functional entity or a chip or a system-on-a-chip in the functional entity. The authentication device 400 includes a processor 401, a communications line 402, and a communications interface 403.

The authentication device 400 may further include a memory 404. The processor 401, the memory 404, and the communications interface 403 may be connected to each other through the communications line 402.

The processor 401 may be a central processing unit (CPU), a general-purpose network processor (NP), a digital signal processor (DSP), a microprocessor, a microcontroller, a programmable logic device (PLD), or any combination thereof. The processor 401 may alternatively be any other apparatus having a processing function, for example, a circuit, a device, or a software module. This is not limited.

The communications line 402 is configured to transmit information between the components included in the authentication device 400.

The communications interface 403 is configured to communicate with another device or another communications network. The other communications network may be the Ethernet, a radio access network (RAN), a wireless local area network (WLAN), or the like. The communications interface 403 may be a module, a circuit, a transceiver, or any apparatus that can implement communication.

The memory 404 is configured to store an instruction. The instruction may be a computer program.

The memory 404 may be a read-only memory (ROM) or another type of static storage device that can store static information and/or an instruction, or may be a random-access memory (RAM) or another type of dynamic storage device that can store information and/or an instruction, or may be an electrically erasable programmable ROM (EEPROM), a compact disc (CD) ROM (CD-ROM) or another CD storage, an optical disc storage (including a compressed optical disc, a laser disc, an optical disc, a digital universal optical disc, a BLU-RAY optical disc, and the like), a magnetic disk storage medium or another magnetic storage device, or the like. This is not limited.

It should be noted that the memory 404 may exist independently of the processor 401, or may be integrated into the processor 401. The memory 404 may be configured to store an instruction, program code, some data, or the like. The memory 404 may be located inside the authentication device 400, or may be located outside the authentication device 400. This is not limited.

The processor 401 is configured to execute the instruction stored in the memory 404, to implement the methods provided in the following embodiments of this application.

In an example, the processor 401 may include one or more CPUs, for example, a CPU 0 and a CPU 1 in FIG. 4.

In an optional implementation, the authentication device 400 includes a plurality of processors. For example, in addition to the processor 401 in FIG. 4, the authentication device 400 may further include a processor 407.

In an optional implementation, the authentication device 400 further includes an output device 405 and an input device 406. For example, the input device 406 is a device such as a keyboard, a mouse, a microphone, or a joystick, and the output device 405 is a device such as a display or a speaker.

It should be noted that the composition structure shown in FIG. 4 does not constitute a limitation on the communications apparatus. In addition to the components shown in FIG. 4, the communications apparatus may include more or fewer components than those shown in the figure, or combine some components, or have different component arrangements.

In this embodiment of this application, a chip system may include a chip, or may include a chip and another discrete component.

In addition, actions, terms, and the like in the embodiments of this application may be mutually referenced. This is not limited. In the embodiments of this application, a name of a message exchanged between devices, a name of a parameter in the message, or the like is merely an example. During specific implementation, another name may alternatively be used. This is not limited.

It should be noted that, in the descriptions of this application, terms such as "primary authentication node" and "secondary authentication node" are merely used for distinguishing between descriptions, and cannot be understood as an indication or implication of relative importance or an indication or implication of an order. The "primary authentication node" may alternatively be described as a "first authentication node", and the "secondary authentication node" may alternatively be described as a "second authentication node".

The following describes the authentication methods provided in the embodiments of this application by using the architecture shown in FIG. 1A as an example. The device in the following embodiments may have the components shown in FIG. 4.

It can be understood that, in the embodiments of this application, an authentication server, and/or an in-vehicle system, and/or a primary authentication node, and/or a secondary authentication node, and/or a subnode of the secondary authentication node may perform some or all of the steps in the embodiments of this application. These steps are merely examples. In the embodiments of this application, other steps or variations of various steps may be further performed. In addition, the steps may be performed in different sequences presented in the embodiments of this application, and not all of the steps in the embodiments of this application may need to be performed.

Figure 5:
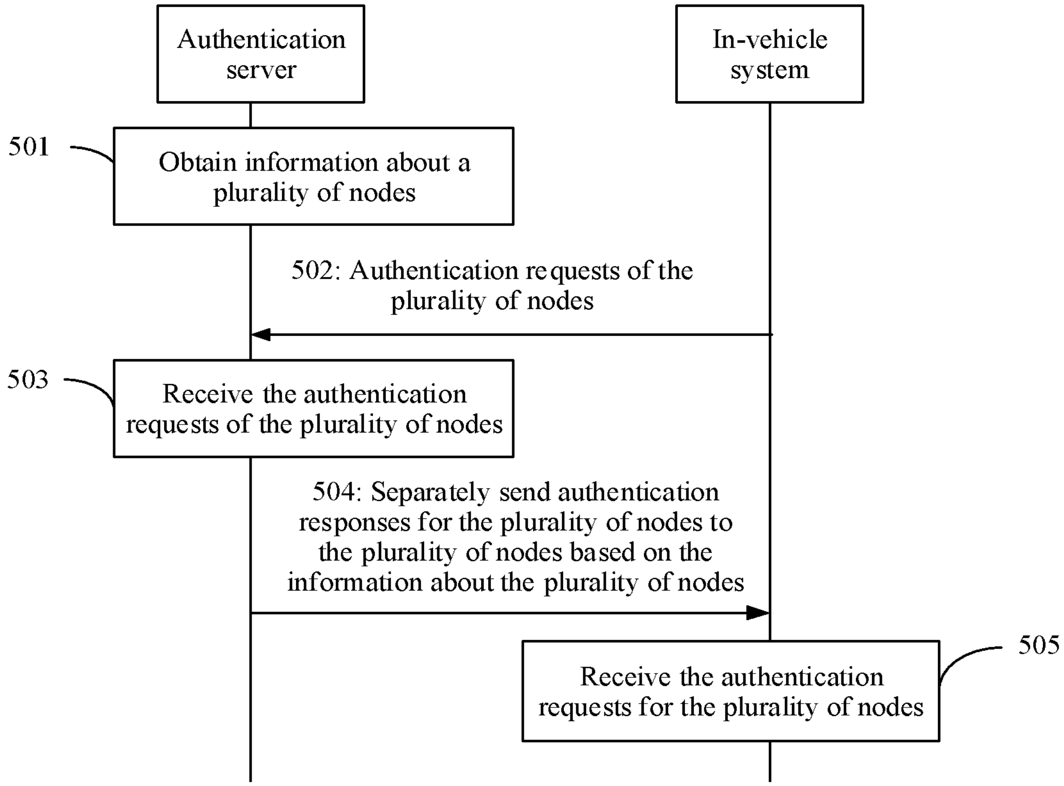
FIG. 5 is a schematic flowchart of an authentication method according to an embodiment of this application.

FIG. 5 shows an authentication method according to an embodiment of this application. The authentication method shown in FIG. 5 is used to perform authentication on a plurality of nodes in an in-vehicle system. The authentication method shown in FIG. 5 may include step 501 to step 505.

The in-vehicle system may be the in-vehicle system 10 shown in FIG. 1A. The in-vehicle system 10 may be an in-vehicle system of the vehicle 30 shown in FIG. 1A. The plurality of nodes in the in-vehicle system may be a plurality of devices such as the T-Box 101, the gateway 102, the OBD 103, the domain controller 104 to the domain controller 106, the ADAS 107, the ECU 108 to the ECU 113, the sensor 114, and the sensor 115 shown in FIG. 1B.

It should be understood that the plurality of nodes in the in-vehicle system may include more or fewer nodes than the nodes shown in FIG. 1B. This is not limited.

Step 501: An authentication server obtains information about a plurality of nodes.

The authentication server may be the authentication server 20 shown in FIG. 1A. The plurality of nodes may be the plurality of nodes in the foregoing in-vehicle system.

In a possible implementation, the authentication server pre-stores the information about the plurality of nodes. That an authentication server obtains information about a plurality of nodes includes that the authentication server locally obtains the information about the plurality of nodes.

In an embodiment, a device manufacturer or an original equipment manufacturer (OEM) pre-writes the information about the plurality of nodes in the in-vehicle system 10 into the authentication server 20. For example, the OEM sends the information about the plurality of nodes to the authentication server 20, and the authentication server 20 receives the information about the plurality of nodes and locally stores the received information about the plurality of nodes.

In another possible implementation, that an authentication server obtains information about a plurality of nodes includes that the plurality of nodes sends first information including the information about the nodes to the authentication server. The authentication server receives the first information, and obtains the information about the plurality of nodes from the first information.

For example, the device manufacturer or the OEM writes information about a node in the in-vehicle system into the node, and the node sends the information about the node to the authentication server when the node is initially connected to the authentication server. For example, the in-vehicle system includes a T-Box, a gateway, and a domain controller. The device manufacturer or the OEM writes information about the T-Box into the T-Box, the device manufacturer or the OEM writes information about the gateway into the gateway, and the device manufacturer or the OEM writes information about the domain controller into the domain controller. The T-Box sends the information about the T-Box to the authentication server when the T-Box is initially connected to the authentication server. The gateway sends the information about the gateway to the authentication server when the gateway is initially connected to the authentication server. The domain controller sends the information about the domain controller to the authentication server when the domain controller is initially connected to the authentication server.

The information about the plurality of nodes may include identifiers of the plurality of nodes and key information of the plurality of nodes.

An identifier of a node may be used to mark the node.

For example, the identifier of the node may be a sequence number of the node. For example, an identifier of the T-Box 101 may be a sequence number of the T-Box 101, and an identifier of the gateway 102 may be a sequence number of the gateway 102.

For example, the identifier of the node may be a combination of an identifier of a vehicle and a sequence number of the node. For example, an identifier of the T-Box 101 may be a combination of an identifier of the vehicle 30 and a sequence number of the T-Box 101, an identifier of the gateway 102 may be a combination of a sequence number of the gateway 102 and the identifier of the vehicle 30, and an identifier of the domain controller 104 may be a combination of the identifier of the vehicle 30, the sequence number of the gateway 102, and a sequence number of the domain controller 104.

In a possible implementation, key information of a node may include a key type of the node and/or a first registration key of the node. The key type may include a symmetric key and an asymmetric key. If the key type of the node is a symmetric key, the first registration key of the node may include an encrypted symmetric key of the node. If the key type of the node is an asymmetric key, the first registration key of the node may include a public key of the node.

For example, if a key type of the T-Box 101 is an asymmetric key, a first registration key of the T-Box 101 may be a public key of the T-Box 101. If a key type of the domain controller 104 is an asymmetric key, a first registration key of the domain controller 104 may be a public key of the domain controller 104. If a key type of the domain controller 105 is a symmetric key, a first registration key of the domain controller 105 may be an encrypted symmetric key of the domain controller 105.

In another possible implementation, key information of a node may not include a key type of the node. The node may send the key type of the node to the authentication server before step 504, so that the authentication server separately sends authentication responses for the plurality of nodes to the plurality of nodes based on the information about the plurality of nodes and key types of the plurality of nodes.

Step 502: The plurality of nodes in the in-vehicle system send authentication requests of the plurality of nodes to the authentication server.

The authentication request of the node may be used to indicate the authentication server to perform authentication on the node.

Optionally, the authentication request of the node includes an identifier of the node.

Optionally, the authentication request of the node further includes a key type of the node.

Optionally, the node stores the identifier of the node, or the node stores the identifier of the node and the key type of the node.

Optionally, the node further stores a second registration key of the node.

For example, the device manufacturer or the OEM may write an identifier of a node in the in-vehicle system, a key type of the node, and a second registration key of the node into the node.

For example, the device manufacturer or the OEM may write the identifier of the T-Box 101, the key type of the T-Box 101, and a second registration key of the T-Box 101 into the T-Box 101. The device manufacturer or the OEM may write the identifier of the gateway 102, the key type of the gateway 102, and a second registration key of the gateway 102 into the gateway 102. The device manufacturer or the OEM may write an identifier of the domain controller 105, the key type of the domain controller 105, and a second registration key of the domain controller 105 into the domain controller 105. The device manufacturer or the OEM may write an identifier of the ADAS 107, a key type of the ADAS 107, and a second registration key of the ADAS 107 into the ADAS 107. The device manufacturer or the OEM may write an identifier of the ECU 108, a key type of the ECU 108, and a second registration key of the ECU 108 into the ECU 108. The device manufacturer or the OEM may write an identifier of the sensor 114, a key type of the sensor 114, and a second registration key of the sensor 114 into the sensor 114.

It should be understood that the device manufacturer or the OEM may write more or less information than the foregoing information into the node in the in-vehicle system. This is not limited. For example, if the key type of the node is a symmetric key, the device manufacturer or the OEM may not write the key type of the node in the in-vehicle system into the node. In other words, if the node does not store the key type of the node, it may indicate that the key type of the node is a symmetric key. For another example, if the authentication server stores the key type of the node, the device manufacturer or the OEM may not write the key type of the node in the in-vehicle system into the node. Subsequently, the authentication server may send the key type of the node to the node.

Optionally, if the key type of the node is an asymmetric key, the second registration key of the node includes a private key of the node. If the key type of the node is a symmetric key, the second registration key of the node includes an encrypted symmetric key of the node.

Optionally, if the key type of the node is an asymmetric key, the second registration key of the node further includes a public key of the node.

An example in which the device manufacturer writes an identifier of a node in the in-vehicle system and a second registration key of the node into the node is used below to describe a method in which the device manufacturer writes information into a node in the in-vehicle system.

Figure 6:
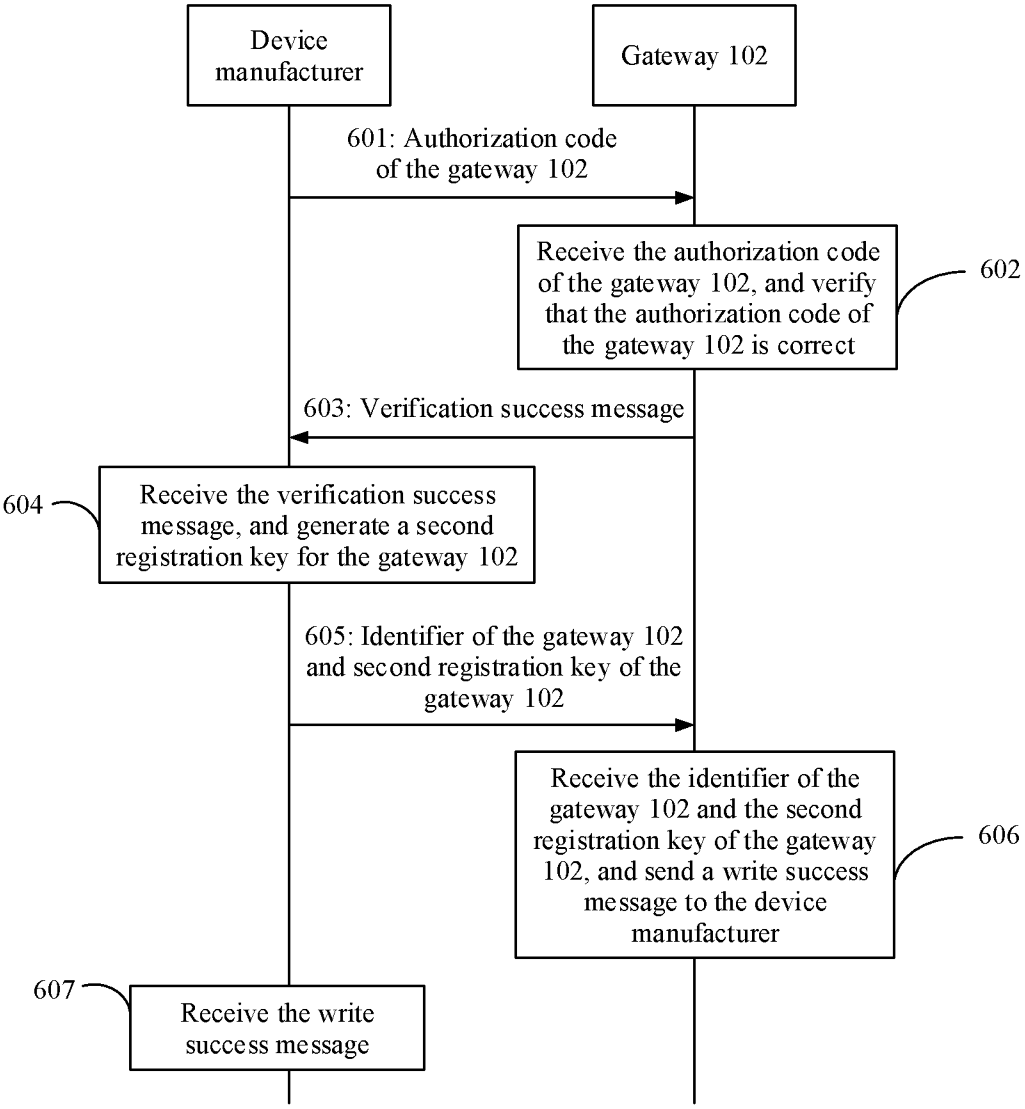
FIG. 6 is a schematic flowchart of a method for writing an identifier of a node and a second registration key of the node into the node in an in-vehicle system according to an embodiment of this application.

FIG. 6 shows a method in which the device manufacturer writes an identifier of a node in the in-vehicle system and a second registration key of the node into the node. The method includes step 601 to step 607.

The method shown in FIG. 6 is described by using an example in which the node in the in-vehicle system is the gateway 102. For a case in which the node in the in-vehicle system is another node, refer to the method shown in FIG. 6. Details are not described again.

Step 601: The device manufacturer sends an authorization code of the gateway 102 to the gateway 102.

Step 602: The gateway 102 receives the authorization code of the gateway 102 from the device manufacturer, and verifies that the authorization code of the gateway 102 is correct.

Optionally, if the gateway 102 verifies that the authorization code of the gateway 102 is incorrect, the gateway 102 sends an authentication failure message to the device manufacturer.

Step 603: The gateway 102 sends an authentication success message to the device manufacturer.

Step 604: The device manufacturer receives the authentication success message from the gateway 102, and generates a second registration key for the gateway 102.

Step 605: The device manufacturer sends an identifier of the gateway 102 and the second registration key of the gateway 102 to the gateway 102.

Step 606: The gateway 102 receives the identifier of the gateway 102 and the second registration key of the gateway 102 from the device manufacturer, and sends a write success message to the device manufacturer.

Step 607: The device manufacturer receives the write success message from the gateway 102.

After step 607, the device manufacturer may further send the identifier of the gateway 102 and the second registration key of the gateway 102 to the OEM, and the OEM may store and securely maintain the identifier of the gateway 102 and the second registration key of the gateway 102.

The device manufacturer may further send related information of the plurality of nodes (for example, the identifiers of the plurality of nodes, the key types of the plurality of nodes, second registration keys of the plurality of nodes, and authorization codes of the plurality of nodes) in the in-vehicle system to the OEM in one or more batches. The OEM may store and securely maintain the related information of the plurality of nodes. Subsequently, the OEM may write related information of a node in the in-vehicle system into the node based on the related information of the plurality of nodes.

An example in which the OEM writes an identifier of a node in the in-vehicle system and a second registration key of the node into the node is used below to describe a method in which the OEM writes information into a node in the in-vehicle system.

Figure 7:
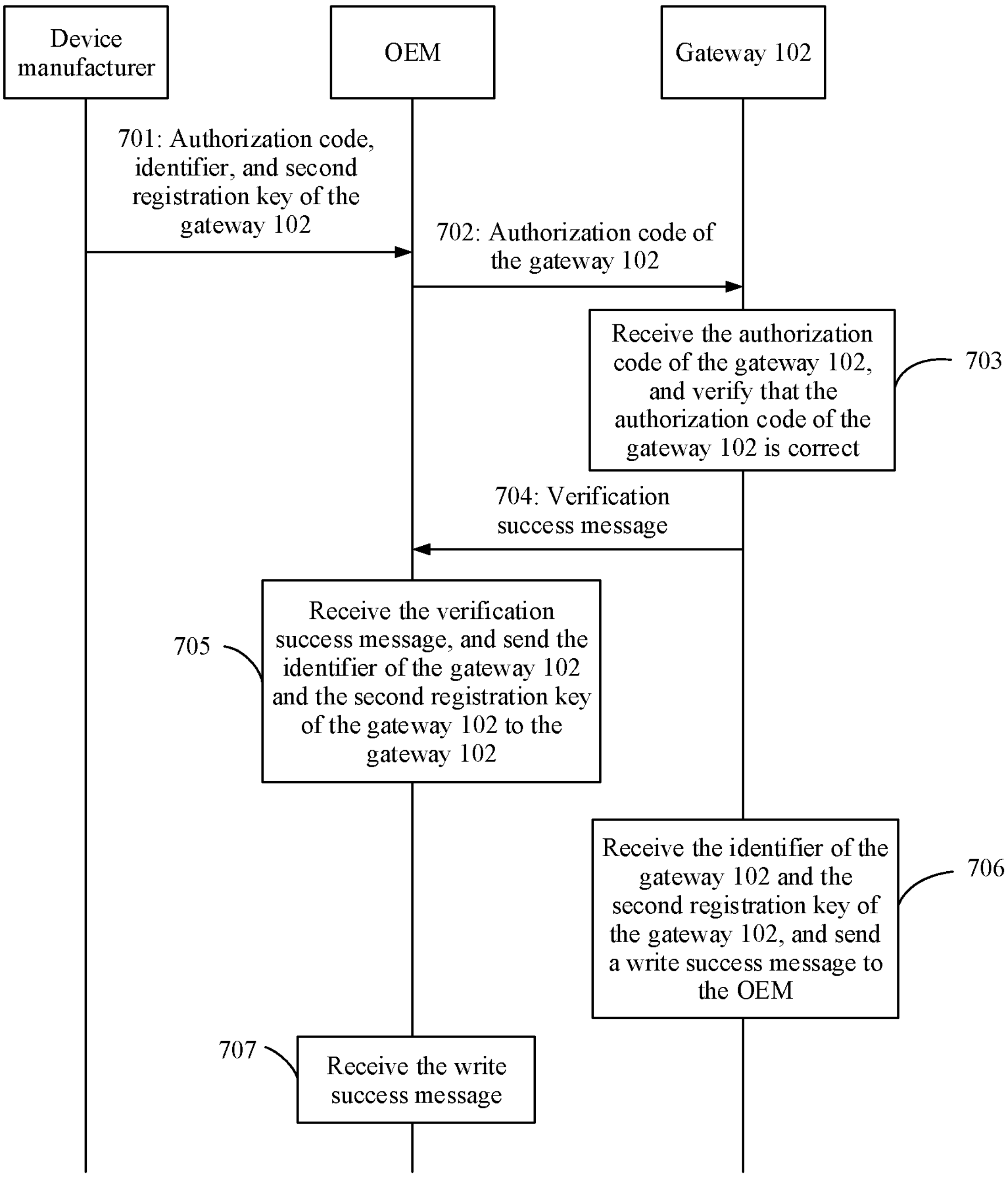
FIG. 7 is a schematic flowchart of a method for writing an identifier of a node and a second registration key of the node into the node in an in-vehicle system according to an embodiment of this application.

FIG. 7 shows a method in which the OEM writes an identifier of a node in the in-vehicle system and a second registration key of the node into the node. The method includes step 701 to step 707.

The method shown in FIG. 7 is described by using an example in which the node in the in-vehicle system is the gateway 102. For a case in which the node in the in-vehicle system is another node, refer to the method shown in FIG. 7. Details are not described again.

Step 701: The device manufacturer sends an authorization code of the gateway 102, an identifier of the gateway 102, and a second registration key of the gateway 102 to the OEM.

Optionally, the device manufacturer sends the encrypted authorization code of the gateway 102 to the OEM, and the OEM stores the encrypted authorization code. For example, the device manufacturer encrypts the authorization code of the gateway 102, and sends the encrypted authorization code of the gateway 102 to the OEM. The OEM receives the encrypted authorization code of the gateway 102, and stores the encrypted authorization code.

Step 702: The OEM sends the authorization code of the gateway 102 to the gateway 102.

Step 703: The gateway 102 receives the authorization code of the gateway 102 from the OEM, and verifies that the authorization code of the gateway 102 is correct.

Optionally, if the gateway 102 verifies that the authorization code of the gateway 102 is incorrect, the gateway 102 sends an authentication failure message to the OEM.

Step 704: The gateway 102 sends an authentication success message to the OEM.

Step 705: The OEM receives the authentication success message from the gateway 102, and sends the identifier of the gateway 102 and the second registration key of the gateway 102 to the gateway 102.

Step 706: The gateway 102 receives the identifier of the gateway 102 and the second registration key of the gateway 102 from the OEM, and sends a write success message to the OEM.

Step 707: The OEM receives the write success message from the gateway 102.

Optionally, if the device manufacturer does not send the second registration key of the gateway 102 to the OEM in step 701, the OEM may generate the second registration key of the gateway 102 after receiving the authentication success message from the gateway 102, and then send the identifier of the gateway 102 and the second registration key of the gateway 102 to the gateway 102.

Step 503: The authentication server receives the authentication requests from the plurality of nodes.

Step 504: The authentication server separately sends authentication responses for the plurality of nodes to the plurality of nodes based on the information about the plurality of nodes.

An authentication response for a node may respond to an authentication request of the node.

In a possible implementation, the authentication request of the node includes an identifier of the node. After receiving the authentication request of the node, the authentication server obtains a key type of the node based on the authentication request of the node and the information about the node that is obtained in step 501 (the information about the node may include the identifier of the node, the key type of the node, and a first registration key of the node), performs authentication on the node based on the key type of the node, and sends the authentication response for the node to the node.

Optionally, if the key type of the node is a symmetric key, the authentication server performs authentication on the node by using the method shown in FIG. 3. If the key type of the node is an asymmetric key, the authentication server performs authentication on the node by using the method shown in FIG. 2A and FIG. 2B.

For example, the gateway 102 sends an authentication request to the authentication server. The authentication request includes the identifier of the gateway 102, and the authentication server stores the identifier of the gateway 102, the key type of the gateway 102, and a first registration key of the gateway 102. An example in which the key type of the gateway 102 is an asymmetric key is used. After receiving the authentication request of the gateway 102, the authentication server may detect, based on the identifier of the gateway 102 that is included in the authentication request of the gateway 102, that the key type of the gateway 102 is an asymmetric key, and perform authentication on the gateway 102 by using the method shown in FIG. 2A and FIG. 2B. After the authentication is completed, the authentication server sends an authentication response for the gateway 102 to the gateway 102.

For example, the domain controller 104 sends an authentication request to the authentication server. The authentication request includes the identifier of the domain controller 104, and the authentication server stores the identifier of the domain controller 104, the key type of the domain controller 104, and the first registration key of the domain controller 104. An example in which the key type of the domain controller 104 is a symmetric key is used. After receiving the authentication request of the domain controller 104, the authentication server may detect, based on the identifier of the domain controller 104 that is included in the authentication request of the domain controller 104, that the key type of the domain controller 104 is a symmetric key, and perform authentication on the domain controller 104 by using the method shown in FIG. 3. After the authentication is completed, the authentication server sends an authentication response for the domain controller 104 to the domain controller 104.

For example, the ECU 108 sends an authentication request to the authentication server. The authentication request includes the identifier of the ECU 108, and the authentication server stores the identifier of the ECU 108, the key type of the ECU 108, and a first registration key of the ECU 108. An example in which the key type of the ECU 108 is a symmetric key is used. After receiving the authentication request of the ECU 108, the authentication server may detect, based on the identifier of the ECU 108 that is included in the authentication request of the ECU 108, that the key type of the ECU 108 is a symmetric key, and perform authentication on the ECU 108 by using the method shown in FIG. 3. After the authentication is completed, the authentication server sends an authentication response for the ECU 108 to the ECU 108.

For example, the sensor 114 sends an authentication request to the authentication server. The authentication request includes the identifier of the sensor 114, and the authentication server stores the identifier of the sensor 114, the key type of the sensor 114, and a first registration key of the sensor 114. An example in which the key type of the sensor 114 is a symmetric key is used. After receiving the authentication request of the sensor 114, the authentication server may detect, based on the identifier of the sensor 114 that is included in the authentication request of the sensor 114, that the key type of the sensor 114 is a symmetric key, and perform authentication on the sensor 114 by using the method shown in FIG. 3. After the authentication is completed, the authentication server sends an authentication response for the sensor 114 to the sensor 114.

In another possible implementation, the authentication request of the node includes an identifier of the node and a key type of the node. After receiving the authentication request of the node, the authentication server may perform authentication on the node based on the key type of the node, and send the authentication response for the node to the node.

Optionally, if the key type of the node is a symmetric key, the authentication server performs authentication on the node by using the method shown in FIG. 3. If the key type of the node is an asymmetric key, the authentication server performs authentication on the node by using the method shown in FIG. 2A and FIG. 2B.

For example, the T-Box 101 sends an authentication request to the authentication server. The authentication request includes the identifier of the T-Box 101 and the key type of the T-Box 101. An example in which the key type of the T-Box 101 is an asymmetric key is used. After receiving the authentication request of the T-Box 101, the authentication server may perform authentication on the T-Box 101 by using the method shown in FIG. 2A and FIG. 2B. After the authentication is completed, the authentication server sends an authentication response for the T-Box 101 to the T-Box 101.

For example, the domain controller 105 sends an authentication request to the authentication server. The authentication request includes the identifier of the domain controller 105 and the key type of the domain controller 105. An example in which the key type of the domain controller 105 is an asymmetric key is used. After receiving the authentication request of the domain controller 105, the authentication server may perform authentication on the domain controller 105 by using the method shown in FIG. 2A and FIG. 2B. After the authentication is completed, the authentication server sends an authentication response for the domain controller 105 to the domain controller 105.

For example, the OBD 103 sends an authentication request to the authentication server. The authentication request includes an identifier of the OBD 103 and a key type of the OBD 103. An example in which the key type of the OBD 103 is a symmetric key is used. After receiving the authentication request of the OBD 103, the authentication server may perform authentication on the OBD 103 by using the method shown in FIG. 3. After the authentication is completed, the authentication server sends an authentication response for the OBD 103 to the OBD 103.

For example, the ADAS 107 sends an authentication request to the authentication server. The authentication request includes the identifier of the ADAS 107 and the key type of the ADAS 107. An example in which the key type of the ADAS 107 is a symmetric key is used. After receiving the authentication request of the ADAS 107, the authentication server may perform authentication on the ADAS 107 by using the method shown in FIG. 3. After the authentication is completed, the authentication server sends an authentication response for the ADAS 107 to the ADAS 107.

It should be noted that the device manufacturer or the OEM may set a key type for a node based on a specific status of the node, so as to determine, by using the key type, a method in which the authentication server performs authentication on the node.

In a possible implementation, if the node has a sufficient computing capability and sufficient storage resources, the device manufacturer or the OEM sets the key type of the node to an asymmetric key. Subsequently, the authentication server performs authentication on the node by using the method shown in FIG. 2A and FIG. 2B. If the node does not have a sufficient computing capability and/or sufficient storage resources, the device manufacturer or the OEM sets the key type of the node to a symmetric key. Subsequently, the authentication server performs authentication on the node by using the method shown in FIG. 3.

In another possible implementation, if the node has a relatively high security requirement, the device manufacturer or the OEM sets the key type of the node to an asymmetric key. Subsequently, the authentication server performs authentication on the node by using the method shown in FIG. 2A and FIG. 2B. If the node has a relatively low security requirement, the device manufacturer or the OEM sets the key type of the node to a symmetric key. Subsequently, the authentication server performs authentication on the node by using the method shown in FIG. 3.

Optionally, the authentication response for the node is used to indicate that the authentication on the node succeeds or fails.

For example, the authentication response for the node may include 1-bit indication information. For example, if the authentication response for the node includes 0, it may indicate that the authentication on the node succeeds, or if the authentication response for the node includes 1, it may indicate that the authentication on the node fails. Alternatively, if the authentication response for the node includes 0, it may indicate that the authentication on the node fails, or if the authentication response for the node includes 1, it may indicate that the authentication on the node succeeds.

Optionally, if the authentication on the node succeeds, the authentication server sends the authentication response for the node to the node, and the authentication response for the node is used to indicate that the authentication on the node succeeds. If the authentication on the node fails, the authentication server does not send a message to the node.

For example, the authentication response for the node may include 1-bit indication information. For example, if the authentication on the gateway 102 succeeds, the authentication server may send 1-bit indication information (for example, 0) to the gateway 102, so that the gateway 102 learns that the authentication on the gateway 102 succeeds.

For example, the authentication response for the node may include the identifier of the node. For example, if the authentication on the OBD 103 succeeds, the authentication server may send the identifier of the OBD 103 to the OBD 103, so that the OBD 103 learns that the authentication on the OBD 103 succeeds.

For example, the authentication response for the node may include an identifier of a parent node of the node and key information of the parent node of the node. For example, if authentication on the ECU 111 succeeds, the authentication server may send an identifier of the domain controller 106 and key information of the domain controller 106 to the ECU 111, so that the ECU 111 learns that the authentication on the ECU 111 succeeds. Subsequently, when the vehicle 30 is started, the authentication server may perform authentication on the domain controller 106 based on the identifier of the domain controller 106 and the key information of the domain controller 106.

For example, the authentication response for the node may include an identifier of a subnode of the node and key information of the subnode of the node. For example, if the authentication on the gateway 102 succeeds, the authentication server sends the identifier of the ADAS 107 and key information of the ADAS 107 to the gateway 102, so that the gateway 102 learns that the authentication on the gateway 102 succeeds. Subsequently, when the vehicle 30 is started, the authentication server may perform authentication on the ADAS 107 based on the identifier of the ADAS 107 and the key information of the ADAS 107.

For example, the authentication response for the node may include an identifier of a parent node of the node, key information of the parent node of the node, an identifier of a subnode of the node, and key information of the subnode of the node. For example, if the authentication on the domain controller 105 succeeds, the authentication server sends the identifier of the gateway 102, key information of the gateway 102, an identifier of the ECU 110, and key information of the ECU 110 to the domain controller 105, so that the domain controller 105 learns that the authentication on the domain controller 105 succeeds. Subsequently, when the vehicle 30 is started, the authentication server may perform authentication on the gateway 102 based on the identifier of the gateway 102 and the key information of the gateway 102, and perform authentication on the ECU 110 based on the identifier of the ECU 110 and the key information of the ECU 110.

For example, if authentication on the ECU 109 fails, the authentication server does not send a message to the ECU 109. If the ECU 109 does not receive the authentication response for the node within a preset time (for example, 10 seconds (s)), the ECU 109 may consider that the authentication on the ECU 109 fails.

Step 505: The plurality of nodes in the in-vehicle system receive the authentication responses for the plurality of nodes from the authentication server.

It should be noted that the authentication server may alternatively perform authentication on the plurality of nodes in other manners. This is not limited. For example, the authentication server may alternatively perform authentication on the plurality of nodes by using the following method (step 1 to step 8) (an example in which the authentication server performs authentication on the gateway 102 is used for description).

Step 1: The gateway 102 sends the identifier of the gateway to the authentication server.

Step 2: The authentication server receives the identifier (ID) from the gateway 102, and generates a random number.

Step 3: The authentication server sends the random number (msg1) to the gateway 102.

Step 4: The gateway 102 receives the random number from the authentication server, and calculates a signature value based on the random number ($Sig=sig_{pk}$ (msg1, ID)).

Step 5: The gateway 102 sends the signature value to the authentication server.

Step 6: The authentication server receives the signature value from the gateway 102, and calculates a signature value based on the random number.

Step 7: If the signature value calculated by the authentication server is the same as the received signature value, the authentication server sends an authentication success message to the gateway 102.

Step 8: The gateway 102 receives the authentication success message from the authentication server.

According to the method shown in FIG. 5, the authentication server may receive the authentication requests from the plurality of nodes in the in-vehicle system, separately perform authentication on the plurality of nodes based on the obtained information about the plurality of nodes, and send the authentication responses for the plurality of nodes to the plurality of node, so as to perform authentication on the plurality of nodes in the in-vehicle system, thereby improving security of the in-vehicle system.

Optionally, in a first implementation scenario of the embodiment shown in FIG. 5, the plurality of nodes includes a primary authentication node and a plurality of secondary authentication nodes. The primary authentication node is connected to the plurality of secondary authentication nodes.

Optionally, if the authentication on the plurality of nodes succeeds, the method shown in FIG. 5 further includes step 506 to step 510.

Step 506: The authentication server sends an identifier of the secondary authentication node and key information of the secondary authentication node to the primary authentication node.

The primary authentication node may be the gateway 102 shown in FIG. 1B. The secondary authentication nodes may be a plurality of nodes such as the T-Box 101, the OBD 103, the domain controller 104 to the domain controller 106, and the ADAS 107 shown in FIG. 1B.

Optionally, the authentication server sends the identifier of the secondary authentication node and the key information of the secondary authentication node to the primary authentication node by using the T-Box 101.

For example, the primary authentication node is the gateway 102, and the secondary authentication node is the domain controller 104. The authentication server sends the identifier of the domain controller 104 and key information of the domain controller 104 to the T-Box 101. After receiving the identifier of the domain controller 104 and the key information of the domain controller 104, the T-Box 101 sends the identifier of the domain controller 104 and the key information of the domain controller 104 to the gateway 102.

For example, the primary authentication node is the gateway 102, and the secondary authentication node is the domain controller 105. The authentication server transparently transmits the identifier of the domain controller 105 and key information of the domain controller 105 to the gateway 102 by using the T-Box 101.

Optionally, if a key type of the secondary authentication node is an asymmetric key, the key information of the secondary authentication node includes a public key of the secondary authentication node, or if a key type of the secondary authentication node is a symmetric key, the key information of the secondary authentication node includes the symmetric key of the secondary authentication node.

For example, if the key type of the OBD 103 is a symmetric key, the authentication server sends the identifier of the OBD 103 and the symmetric key of the OBD 103 to the gateway 102.

For another example, if the key type of the domain controller 104 is an asymmetric key, the authentication server sends the identifier of the domain controller 104 and the public key of the domain controller 104 to the gateway 102.

Optionally, the identifier of the secondary authentication node and the key information of the secondary authentication node are encrypted by using a first registration key of the primary authentication node.

For example, if the key type of the domain controller 105 is a symmetric key, and the key type of the gateway 102 is an asymmetric key, the authentication server sends the identifier of the domain controller 105 and the symmetric key of the domain controller 105 to the gateway 102. The identifier of the domain controller 105 and the symmetric key of the domain controller 105 are encrypted by using a public key of the gateway 102.

For another example, if the key type of the T-Box 101 is an asymmetric key, and the key type of the gateway 102 is an asymmetric key, the authentication server sends the identifier of the T-Box 101 and the public key of the T-Box 101 to the gateway 102. The identifier of the T-Box 101 and the public key of the T-Box 101 are encrypted by using the public key of the gateway 102.

Step 507: The primary authentication node receives the identifier of the secondary authentication node and the key information of the secondary authentication node from the authentication server.

Optionally, the identifier of the secondary authentication node and the key information of the secondary authentication node are encrypted by using the first registration key of the primary authentication node. If a key type of the primary authentication node is an asymmetric key (in other words, if the first registration key of the primary authentication node includes a public key of the primary authentication node), the primary authentication node decrypts the encrypted identifier of the secondary authentication node and the encrypted key information of the secondary authentication node by using a private key of the primary authentication node, or if a key type of the primary authentication node is a symmetric key (in other words, if the first registration key of the primary authentication node includes the symmetric key of the primary authentication node), the primary authentication node decrypts the encrypted identifier of the secondary authentication node and the encrypted key information of the secondary authentication node by using the symmetric key of the primary authentication node, so that the primary authentication node obtains the identifier of the secondary authentication node and the key information of the secondary authentication node.

For example, the key type of the gateway 102 is an asymmetric key, and the gateway 102 receives the identifier of the domain controller 106 and the key information of the domain controller 106 from the authentication server. For example, the identifier of the domain controller 106 and the key information of the domain controller 106 are encrypted by using the public key of the gateway 102. The gateway 102 receives the encrypted identifier of the domain controller 106 and the encrypted key information of the domain controller 106, and decrypts the encrypted identifier of the domain controller 106 and the encrypted key information of the domain controller 106 by using a private key of the gateway 102.

Step 508: The authentication server sends an identifier of the primary authentication node and key information of the primary authentication node to the secondary authentication node.

Optionally, the authentication server sends the identifier of the primary authentication node and the key information of the primary authentication node to the secondary authentication node by using the T-Box 101.

For example, the primary authentication node is the gateway 102, and the secondary authentication node is the domain controller 104. The authentication server sends the identifier of the gateway 102 and the key information of the gateway 102 to the T-Box 101. After receiving the identifier of the gateway 102 and the key information of the gateway 102, the T-Box 101 sends the identifier of the gateway 102 and the key information of the gateway 102 to the gateway 102. After receiving the identifier of the gateway 102 and the key information of the gateway 102, the gateway 102 sends the identifier of the gateway 102 and the key information of the gateway 102 to the domain controller 104.

For example, the primary authentication node is the gateway 102, and the secondary authentication node is the domain controller 105. The authentication server transparently transmits the identifier of the gateway 102 and the key information of the gateway 102 to the domain controller 105 by using the T-Box 101 and the gateway 102.

Optionally, if the key type of the primary authentication node is an asymmetric key, the key information of the primary authentication node includes the public key of the primary authentication node, or if the key type of the primary authentication node is a symmetric key, the key information of the primary authentication node includes the symmetric key of the primary authentication node.

For example, if the key type of the gateway 102 is a symmetric key, the authentication server sends the identifier of the gateway 102 and the symmetric key of the gateway 102 to the ADAS 107.

For another example, if the key type of the gateway 102 is an asymmetric key, the authentication server sends the identifier of the gateway 102 and the public key of the gateway 102 to the OBD 103.

Optionally, the identifier of the primary authentication node and the key information of the primary authentication node are encrypted by using a first registration key of the secondary authentication node.

For example, if the key type of the domain controller 105 is a symmetric key, and the key type of the gateway 102 is an asymmetric key, the authentication server sends the identifier of the gateway 102 and the public key of the gateway 102 to the domain controller 105. The identifier of the gateway 102 and the public key of the gateway 102 are encrypted by using the symmetric key of the domain controller 105.

For another example, if the key type of the T-Box 101 is an asymmetric key, and the key type of the gateway 102 is an asymmetric key, the authentication server sends the identifier of the gateway 102 and the public key of the gateway 102 to the T-Box 101. The identifier of the gateway 102 and the public key of the gateway 102 are encrypted by using the public key of the T-Box 101.

Step 509: The secondary authentication node receives the identifier of the primary authentication node and the key information of the primary authentication node from the authentication server.

Optionally, the identifier of the primary authentication node and the key information of the primary authentication node are encrypted by using the first registration key of the secondary authentication node. If the key type of the secondary authentication node is an asymmetric key (in other words, if the first registration key of the secondary authentication node includes the public key of the secondary authentication node), the secondary authentication node decrypts the encrypted identifier of the primary authentication node and the encrypted key information of the primary authentication node by using a private key of the secondary authentication node, or if the key type of the secondary authentication node is a symmetric key (in other words, if the first registration key of the secondary authentication node includes the symmetric key of the secondary authentication node), the secondary authentication node decrypts the encrypted identifier of the primary authentication node and the encrypted key information of the primary authentication node by using the symmetric key of the secondary authentication node, so that the secondary authentication node obtains the identifier of the primary authentication node and the key information of the primary authentication node.

For example, a key type of the domain controller 106 is an asymmetric key, and the domain controller 106 receives the identifier of the gateway 102 and the key information of the gateway 102 from the authentication server. For example, the identifier of the gateway 102 and the key information of the gateway 102 are encrypted by using a public key of the domain controller 106. The domain controller 106 receives the encrypted identifier of the gateway 102 and the encrypted key information of the gateway 102, and decrypts the encrypted identifier of the gateway 102 and the encrypted key information of the gateway 102 by using a private key of the domain controller 106.

For example, the key type of the domain controller 105 is a symmetric key, and the domain controller 105 receives the identifier of the gateway 102 and the key information of the gateway 102 from the authentication server. For example, the identifier of the gateway 102 and the key information of the gateway 102 are encrypted by using the symmetric key of the domain controller 105. The domain controller 105 receives the encrypted identifier of the gateway 102 and the encrypted key information of the gateway 102, and decrypts the encrypted identifier of the gateway 102 and the encrypted key information of the gateway 102 by using the symmetric key of the domain controller 105.

Step 510: The primary authentication node performs authentication on the secondary authentication node.

Optionally, the primary authentication node performs two-way authentication on the secondary authentication node based on the identifier of the primary authentication node, the key information of the primary authentication node, the identifier of the secondary authentication node, and the key information of the secondary authentication node.

For a method in which the primary authentication node performs two-way authentication on the secondary authentication node based on the identifier of the primary authentication node, the key information of the primary authentication node, the identifier of the secondary authentication node, and the key information of the secondary authentication node, refer to the method shown in FIG. 2A and FIG. 2B.

Optionally, the primary authentication node performs one-way authentication on the secondary authentication node based on the identifier of the primary authentication node and the key information of the primary authentication node.

For a method in which the primary authentication node performs one-way authentication on the secondary authentication node based on the identifier of the primary authentication node and the key information of the primary authentication node, refer to the method shown in FIG. 3.

It should be noted that, if the primary authentication node performs one-way authentication on the secondary authentication node based on the identifier of the primary authentication node and the key information of the primary authentication node, step 506 and step 507 may not be performed.

Optionally, the primary authentication node performs one-way authentication on the secondary authentication node based on the identifier of the secondary authentication node and the key information of the secondary authentication node.

For a method in which the primary authentication node performs one-way authentication on the secondary authentication node based on the identifier of the secondary authentication node and the key information of the secondary authentication node, refer to the method shown in FIG. 3.

It should be noted that, if the primary authentication node performs one-way authentication on the secondary authentication node based on the identifier of the secondary authentication node and the key information of the secondary authentication node, step 508 and step 509 may not be performed.

Optionally, if the authentication performed by the primary authentication node on the secondary authentication node succeeds, step 511 is performed, or if the authentication performed by the primary authentication node on the secondary authentication node fails, the in-vehicle system is prohibited from being started.

It should be noted that, in actual application, step 508 and step 509 may alternatively be performed before step 506 and step 507. This is not limited.

Based on the first implementation scenario of the embodiment shown in FIG. 5, the primary authentication node may receive the identifier of the secondary authentication node and the key information of the secondary authentication node from the authentication server, and the secondary authentication node may receive the identifier of the primary authentication node and the key information of the primary authentication node from the authentication server, so that the primary authentication node can perform two-way authentication on the secondary authentication node based on the identifier of the primary authentication node, the key information of the primary authentication node, the identifier of the secondary authentication node, and the key information of the secondary authentication node.

Optionally, in a second implementation scenario of the embodiment shown in FIG. 5, the plurality of nodes further includes subnodes of the plurality of secondary authentication nodes, and the secondary authentication nodes are connected to the subnodes of the secondary authentication nodes. The first implementation scenario of the embodiment shown in FIG. 5 further includes step 511 to step 516.

Step 511: The authentication server generates an authentication key for each of the subnodes of the plurality of secondary authentication nodes.

The subnodes of the plurality of secondary authentication nodes may be a plurality of nodes in the ECU 108 to the ECU 113, and the sensor 114 and the sensor 115 shown in FIG. 1B.

Optionally, subnodes of one secondary authentication node have a same authentication key.

For example, the subnodes ECU 108 and ECU 109 of the domain controller 104 have a same authentication key.

For another example, the subnodes ECU 111, ECU 112, and ECU 113 of the domain controller 106 have a same authentication key.

It should be noted that, because subnodes of one secondary authentication node have a same authentication key, the secondary authentication node does not need to store authentication keys of the subnodes of the plurality of secondary authentication node, thereby saving storage resources. Moreover, the secondary authentication node does not need to manage the plurality of authentication keys, thereby reducing load of the secondary authentication node.

Optionally, the authentication server may generate an authentication key of a node in the in-vehicle system for the node, and nodes connected to each other have a same authentication key.

For example, the authentication server may generate an authentication key of the domain controller 104 for the domain controller 104, generate an authentication key of the domain controller 106 for the domain controller 106, and generate an authentication key of the OBD 103 for the OBD 103. The authentication key of the domain controller 104 is the same as the authentication key of the domain controller 106, and the authentication key of the domain controller 104 is different from the authentication key of the OBD 103.

Step 512: The authentication server sends an identifier and the authentication key of the subnode of the secondary authentication node to the secondary authentication node.

Optionally, the authentication server sends the identifier and the authentication key of the subnode of the secondary authentication node to the secondary authentication node by using the T-Box 101.

For example, the primary authentication node is the gateway 102, the secondary authentication node is the domain controller 104, and the subnode of the secondary authentication node is the ECU 108. The authentication server sends the identifier and an authentication key of the ECU 108 to the T-Box 101. After receiving the identifier and the authentication key of the ECU 108, the T-Box 101 sends the identifier and the authentication key of the ECU 108 to the gateway 102. The gateway 102 receives the identifier and the authentication key of the ECU 108, and sends the identifier and the authentication key of the ECU 108 to the domain controller 104.

For example, the primary authentication node is the gateway 102, the secondary authentication node is the domain controller 105, and the subnode of the secondary authentication node is the ECU 110. The authentication server transparently transmits the identifier and an authentication key of the ECU 110 to the domain controller 105 by using the T-Box 101 and the gateway 102.

Optionally, the identifier and the authentication key of the subnode of the secondary authentication node are encrypted by using the first registration key of the secondary authentication node.

For example, if the key type of the domain controller 105 is a symmetric key, and a key type of the ECU 110 is a symmetric key, the authentication server sends the identifier of the ECU 110 and the symmetric key of the ECU 110 to the domain controller 105. The identifier of the ECU 110 and the symmetric key of the ECU 110 are encrypted by using the symmetric key of the domain controller 105.

Step 513: The secondary authentication node receives the identifier and the authentication key of the subnode of the secondary authentication node from the authentication server.

Optionally, the identifier and the authentication key of the subnode of the secondary authentication node are encrypted by using the first registration key of the secondary authentication node. If the key type of the secondary authentication node is an asymmetric key (in other words, if the first registration key of the secondary authentication node includes the public key of the secondary authentication node), the secondary authentication node decrypts the encrypted identifier and the encrypted authentication key of the subnode of the secondary authentication node by using the private key of the secondary authentication node, or if the key type of the secondary authentication node is a symmetric key (in other words, if the first registration key of the secondary authentication node includes the symmetric key of the secondary authentication node), the secondary authentication node decrypts the encrypted identifier and the encrypted authentication key of the subnode of the secondary authentication node by using the symmetric key of the secondary authentication node, so that the secondary authentication node obtains the identifier and the authentication key of the subnode of the secondary authentication node.

For example, the key type of the domain controller 105 is an asymmetric key, and the domain controller 105 receives the identifier and the authentication key of the ECU 110 from the authentication server. For example, the identifier and the authentication key of the ECU 110 are encrypted by using a public key of the domain controller 105. The domain controller 105 receives the encrypted identifier and the encrypted authentication key of the ECU 110, and decrypts the encrypted identifier and the encrypted authentication key of the ECU 110 by using a private key of the domain controller 105.

Step 514: The authentication server sends the identifier of the secondary authentication node and the authentication key to the subnode of the secondary authentication node.

Optionally, the authentication server sends the identifier of the secondary authentication node and the authentication key to the subnode of the secondary authentication node by using the T-Box 101.

For example, the primary authentication node is the gateway 102, the secondary authentication node is the ADAS 107, and the subnode of the secondary authentication node is the sensor 114. The authentication server sends the identifier of the ADAS 107 and the authentication key to the T-Box 101. After receiving the identifier of the ADAS 107 and the authentication key, the T-Box 101 sends the identifier of the ADAS 107 and the authentication key to the gateway 102. After receiving the identifier of the ADAS 107 and the authentication key, the gateway 102 sends the identifier of the ADAS 107 and the authentication key to the ADAS 107. After receiving the identifier of the ADAS 107 and the authentication key, the ADAS 107 sends the identifier of the ADAS 107 and the authentication key to the sensor 114.

For example, the primary authentication node is the gateway 102, the secondary authentication node is the domain controller 106, and the subnode of the secondary authentication node is the ECU 113. The authentication server transparently transmits the identifier of the domain controller 106 and the authentication key to the ECU 113 by using the T-Box 101, the gateway 102, and the domain controller 106.

Optionally, the identifier of the secondary authentication node and the authentication key are encrypted by using a first registration key of the subnode of the secondary authentication node.

For example, if the key type of the domain controller 105 is a symmetric key, and the key type of the ECU 110 is a symmetric key, the authentication server sends the identifier of the domain controller 105 and the authentication key to the ECU 110. The identifier of the domain controller 105 and the authentication key are encrypted by using the symmetric key of the ECU 110.

Step 515: The subnode of the secondary authentication node receives the identifier and the authentication key from the secondary authentication node.

Optionally, the identifier of the secondary authentication node and the authentication key are encrypted by using the first registration key of the subnode of the secondary authentication node. If a key type of the subnode of the secondary authentication node is an asymmetric key (in other words, if the first registration key of the subnode of the secondary authentication node includes a public key of the subnode of the secondary authentication node), the subnode of the secondary authentication node decrypts the encrypted identifier of the secondary authentication node and the encrypted authentication key by using a private key of the subnode of the secondary authentication node, or if a key type of the subnode of the secondary authentication node is a symmetric key (in other words, if the first registration key of the subnode of the secondary authentication node includes the symmetric key of the subnode of the secondary authentication node), the subnode of the secondary authentication node decrypts the encrypted identifier of the secondary authentication node and the encrypted authentication key by using the symmetric key of the subnode of the secondary authentication node, so that the subnode of the secondary authentication node obtains the identifier of the secondary authentication node and the authentication key.

For example, a key type of the ECU 111 is a symmetric key, and the ECU 111 receives the identifier of the domain controller 106 and an authentication key from the authentication server. For example, the identifier of the domain controller 106 and the authentication key are encrypted by using the symmetric key of the ECU 111. The ECU 111 receives the encrypted identifier of the domain controller 106 and the encrypted authentication key, and decrypts the encrypted identifier of the domain controller 106 and the encrypted authentication key by using the symmetric key of the ECU 111.

Step 516: The secondary authentication node performs authentication on the subnode of the secondary authentication node.

Optionally, the secondary authentication node performs two-way authentication on the subnode of the secondary authentication node based on the identifier of the secondary authentication node, and the identifier and the authentication key of the subnode of the secondary authentication node.

For a method in which the secondary authentication node performs two-way authentication on the subnode of the secondary authentication node based on the identifier of the secondary authentication node, and the identifier and the authentication key of the subnode of the secondary authentication node, refer to the method shown in FIG. 2A and FIG. 2B.

Optionally, the secondary authentication node performs one-way authentication on the subnode of the secondary authentication node based on the identifier of the secondary authentication node and the authentication key.

For a method in which the secondary authentication node performs one-way authentication on the subnode of the secondary authentication node based on the identifier of the secondary authentication node and the authentication key, refer to the method shown in FIG. 3.

It should be noted that, if the secondary authentication node performs one-way authentication on the subnode of the secondary authentication node based on the identifier of the secondary authentication node and the authentication key, step 512 and step 513 may not be performed.

Optionally, the secondary authentication node performs one-way authentication on the subnode of the secondary authentication node based on the identifier and the authentication key of the subnode of the secondary authentication node.

For a method in which the secondary authentication node performs one-way authentication on the subnode of the secondary authentication node based on the identifier and the authentication key of the subnode of the secondary authentication node, refer to the method shown in FIG. 3.

It should be noted that, if the secondary authentication node performs one-way authentication on the subnode of the secondary authentication node based on the identifier and the authentication key of the subnode of the secondary authentication node, step 514 and step 515 may not be performed.

Optionally, if the authentication performed by the primary authentication node on the secondary authentication node succeeds, the in-vehicle system is started, or if the authentication performed by the primary authentication node on the secondary authentication node fails, the in-vehicle system is prohibited from being started.

It should be noted that, in actual application, step 514 and step 515 may alternatively be performed before step 512 and step 513. This is not limited.

Based on the second implementation scenario of the embodiment shown in FIG. 5, the authentication server may generate the authentication key for each of the subnodes of the plurality of secondary authentication nodes, send the identifier and the authentication key of the subnode of the secondary authentication node to the secondary authentication node, and send the identifier of the secondary authentication node and the authentication key to the subnode of the secondary authentication node, so that the secondary authentication node performs two-way authentication on the subnode of the secondary authentication node based on the identifier of the secondary authentication node, and the identifier and the authentication key of the subnode of the secondary authentication node.

Optionally, in a third implementation scenario of the embodiment shown in FIG. 5, the in-vehicle system further includes a replacement node. The method shown in FIG. 5 further includes step 517 to step 521.

Step 517: The authentication server obtains an identifier of the replacement node and key information of the replacement node.

The replacement node may be a node that replaces a node in one of the T-Box 101, the gateway 102, the OBD 103, the domain controller 104 to the domain controller 106, the ADAS 107, the ECU 108 to the ECU 113, and the sensor 114 and the sensor 115 shown in FIG. 1B, or the replacement node may be a node that replaces a component of a node in one of the T-Box 101, the gateway 102, the OBD 103, the domain controller 104 to the domain controller 106, the ADAS 107, the ECU 108 to the ECU 113, and the sensor 114 and the sensor 115 shown in FIG. 1B.

For example, the replacement node may be a new gateway that replaces the gateway 102, or the replacement node may be a domain controller that replaces a component of the domain controller 104.

For a description of step 517, refer to the specific description of step 501. Details are not described herein again.

Step 518: The replacement node sends an authentication request of the replacement node to the authentication server.

The authentication request of the replacement node is used to indicate to perform authentication on the replacement node.

For a description of step 518, refer to the specific description of step 502. Details are not described herein again.

Step 519: The authentication server receives the authentication request from the replacement node.

Step 520: The authentication server sends an authentication response for the replacement node to the replacement node based on the identifier of the replacement node and the key information of the replacement node.

The authentication response for the replacement node may respond to the authentication request of the replacement node.

For a description of step 520, refer to the specific description of step 504. Details are not described herein again.

Step 521: The replacement node receives the authentication response from the authentication server.

Based on the third implementation scenario of the embodiment shown in FIG. 5, the authentication server may receive the authentication request of the replacement node, perform authentication on the replacement node based on the obtained identifier of the replacement node and the obtained key information of the replacement node, and send the authentication response for the replacement node to the replacement node, so that authentication can be performed on the replacement node, thereby improving security of the in-vehicle system.

Optionally, in a fourth implementation scenario of the embodiment shown in FIG. 5, if the authentication on the replacement node succeeds and the replacement node has a parent node, the third implementation scenario of the embodiment shown in FIG. 5 further includes step 522 to step 526.

Step 522: The authentication server sends the identifier of the replacement node and the key information of the replacement node to the parent node of the replacement node.

Optionally, the primary authentication node is a parent node of the secondary authentication node, and the secondary authentication node is a parent node of the subnode of the secondary authentication node.

For example, if the replacement node is the domain controller 104, the parent node of the replacement node may be the gateway 102, or if the replacement node is the sensor 114, the parent node of the replacement node may be the ADAS 107.

Optionally, if the replacement node is the subnode of the secondary authentication node, the key information of the replacement node includes the authentication key.

If the replacement node is the secondary authentication node, for a description of step 522, refer to the specific description of step 506. Details are not described herein again.

If the replacement node is the subnode of the secondary authentication node, for a description of step 522, refer to the specific description of step 512. Details are not described herein again.

Step 523: The parent node of the replacement node receives the identifier of the replacement node and the key information of the replacement node from the authentication server.

If the replacement node is the secondary authentication node, for a description of step 523, refer to the specific description of step 507. Details are not described herein again.

If the replacement node is the subnode of the secondary authentication node, for a description of step 523, refer to the specific description of step 513. Details are not described herein again.

Step 524: The authentication server sends an identifier of the parent node of the replacement node and key information of the parent node of the replacement node to the replacement node.

Optionally, if the replacement node is the subnode of the secondary authentication node, the key information of the parent node of the replacement node includes the authentication key.

If the replacement node is the secondary authentication node, for a description of step 524, refer to the specific description of step 508. Details are not described herein again.

If the replacement node is the subnode of the secondary authentication node, for a description of step 524, refer to the specific descriptions of step 514. Details are not described herein again.

Step 525: The replacement node receives the identifier of the parent node of the replacement node and the key information of the parent node of the replacement node from the authentication server.

If the replacement node is the secondary authentication node, for a description of step 525, refer to the specific description of step 509. Details are not described herein again.

If the replacement node is the subnode of the secondary authentication node, for a description of step 525, refer to the specific description of step 515. Details are not described herein again.

Step 526: The replacement node performs two-way authentication on the parent node of the replacement node by using the identifier of the replacement node, the key information of the replacement node, the identifier of the parent node of the replacement node, and the key information of the parent node of the replacement node.

Optionally, for a method in which the replacement node performs two-way authentication on the parent node of the replacement node by using the identifier of the replacement node, the key information of the replacement node, the identifier of the parent node of the replacement node, and the key information of the parent node of the replacement node, refer to the method shown in FIG. 2A and FIG. 2B.

Optionally, if the authentication performed by the replacement node on the parent node of the replacement node succeeds, the replacement node sends an authentication complete message to the authentication server. The authentication complete message is used to indicate that the authentication performed by the replacement node on the parent node of the replacement node succeeds.

Optionally, if the authentication performed by the replacement node on the parent node of the replacement node fails, the replacement node sends an authentication failure message to the authentication server. The authentication failure message is used to indicate that the authentication performed by the replacement node on the parent node of the replacement node fails.

It should be noted that, in actual application, step 524 and step 525 may alternatively be performed before step 523 and step 524. This is not limited.

Based on the fourth implementation scenario of the embodiment shown in FIG. 5, the parent node of the replacement node may receive the identifier of the replacement node and the key information of the replacement node from the authentication server, and the replacement node may receive the identifier of the parent node of the replacement node and the key information of the parent node of the replacement node from the server, so that the replacement node performs two-way authentication on the parent node of the replacement node by using the identifier of the replacement node, the key information of the replacement node, the identifier of the parent node of the replacement node, and the key information of the parent node of the replacement node.

Optionally, in a fifth implementation scenario of the embodiment shown in FIG. 5, if the authentication on the replacement node succeeds and the replacement node has a subnode, the third implementation scenario of the embodiment shown in FIG. 5 or the fourth implementation scenario of the embodiment shown in FIG. 5 further includes step 527 to step 531.

Step 527: The authentication server sends an identifier of the subnode of the replacement node and key information of the subnode of the replacement node to the replacement node.

Optionally, the secondary authentication node is a subnode of the primary authentication node.

For example, if the replacement node is the gateway 102, the subnode of the replacement node may include one or more of the T-Box 101, the OBD 103, the domain controller 104 to the domain controller 106, and the ADAS 107, or if the replacement node is the domain controller 104, the subnode of the replacement node may include the ECU 108 and/or the ECU 109.

Optionally, if the subnode of the replacement node is the subnode of the secondary authentication node, the key information of the subnode of the replacement node includes the authentication key.

If the replacement node is the primary authentication node, for a description of step 527, refer to the specific description of step 506. Details are not described herein again.

If the replacement node is the secondary authentication node, for a description of step 527, refer to the specific description of step 512. Details are not described herein again.

Step 528: The replacement node receives the identifier of the subnode of the replacement node and the key information of the subnode of the replacement node from the authentication server.

If the replacement node is the primary authentication node, for a description of step 528, refer to the specific description of step 507. Details are not described herein again.

If the replacement node is the secondary authentication node, for a description of step 528, refer to the specific description of step 513. Details are not described herein again.

Step 529: The authentication server sends the identifier of the replacement node and the key information of the replacement node to the subnode of the replacement node.

Optionally, if the subnode of the replacement node is the subnode of the secondary authentication node, the key information of the replacement node includes the authentication key.

If the replacement node is the primary authentication node, for a description of step 529, refer to the specific description of step 508. Details are not described herein again.

If the replacement node is the secondary authentication node, for a description of step 529, refer to the specific description of step 514. Details are not described herein again.

Step 530: The subnode of the replacement node receives the identifier of the replacement node and the key information of the replacement node from the authentication server.

If the replacement node is the primary authentication node, for a description of step 530, refer to the specific description of step 509. Details are not described herein again.

If the replacement node is the secondary authentication node, for a description of step 530, refer to the specific description of step 515. Details are not described herein again.

Step 531: The replacement node performs two-way authentication on the subnode of the replacement node by using the identifier of the subnode of the replacement node, the key information of the subnode of the replacement node, the identifier of the replacement node, and the key information of the replacement node.

Optionally, for a method in which the replacement node performs two-way authentication on the subnode of the replacement node by using the identifier of the subnode of the replacement node, the key information of the subnode of the replacement node, the identifier of the replacement node, and the key information of the replacement node, refer to the method shown in FIG. 2A and FIG. 2B.

Optionally, if the authentication performed by the replacement node on the subnode of the replacement node succeeds, the replacement node sends an authentication complete message to the authentication server. The authentication complete message is used to indicate that the authentication performed by the replacement node on the subnode of the replacement node succeeds.

Optionally, if the authentication performed by the replacement node on the subnode of the replacement node fails, the replacement node sends an authentication failure message to the authentication server. The authentication failure message is used to indicate that the authentication performed by the replacement node on the subnode of the replacement node fails.

It should be noted that, in actual application, step 529 and step 530 may alternatively be performed before step 527 and step 528. This is not limited.

Based on the fifth implementation scenario of the embodiment shown in FIG. 5, the replacement node may receive the identifier of the subnode of the replacement node and the key information of the subnode of the replacement node from the authentication server, and the subnode of the replacement node may receive the identifier of the replacement node and the key information of the replacement node from the authentication server, so that the replacement node performs two-way authentication on the subnode of the replacement node by using the identifier of the subnode of the replacement node, the key information of the subnode of the replacement node, the identifier of the replacement node, and the key information of the replacement node.

According to the method shown in FIG. 5, the authentication method provided in this embodiment of this application is further described from a perspective of interaction between the in-vehicle system and the authentication server. The following describes authentication methods provided in the embodiments of this application from a perspective of interaction between a primary authentication node, a secondary authentication node, a subnode of the secondary authentication node, and an authentication server.

Figure 8A:
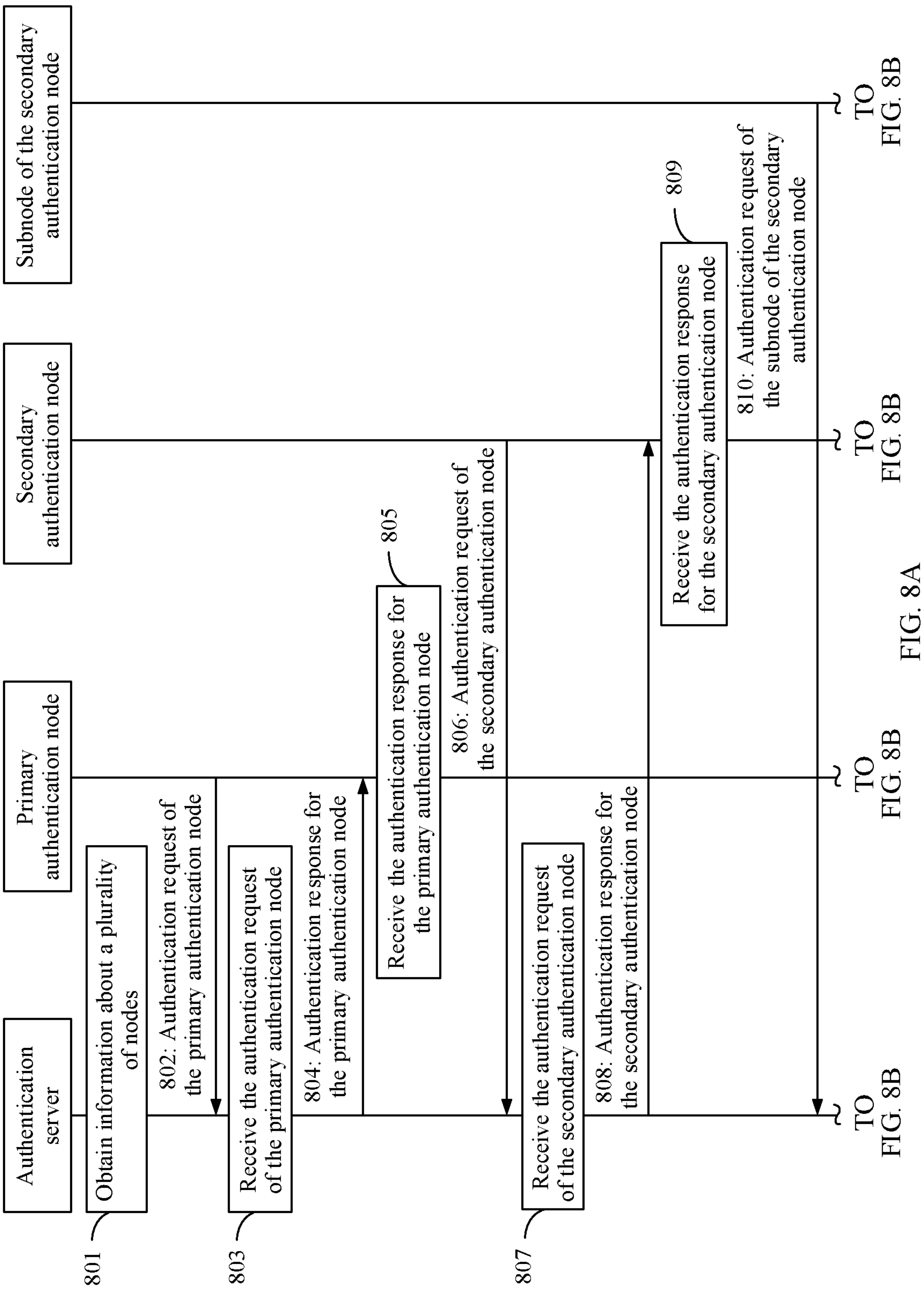
FIG. 8A, FIG. 8B, and FIG. 8C are a schematic flowchart of an authentication method according to an embodiment of this application.
Figure 8B:
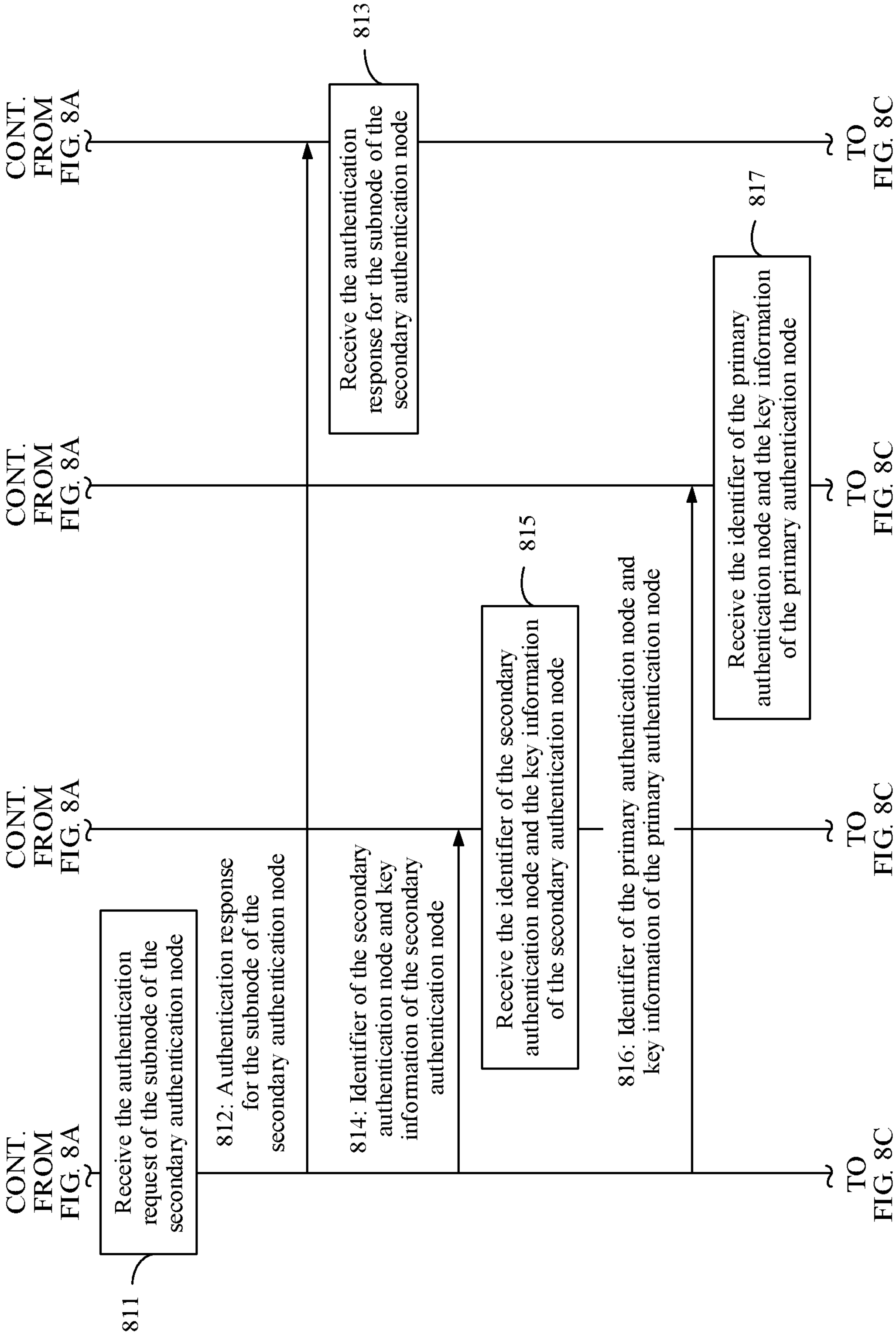
Figure 8C:
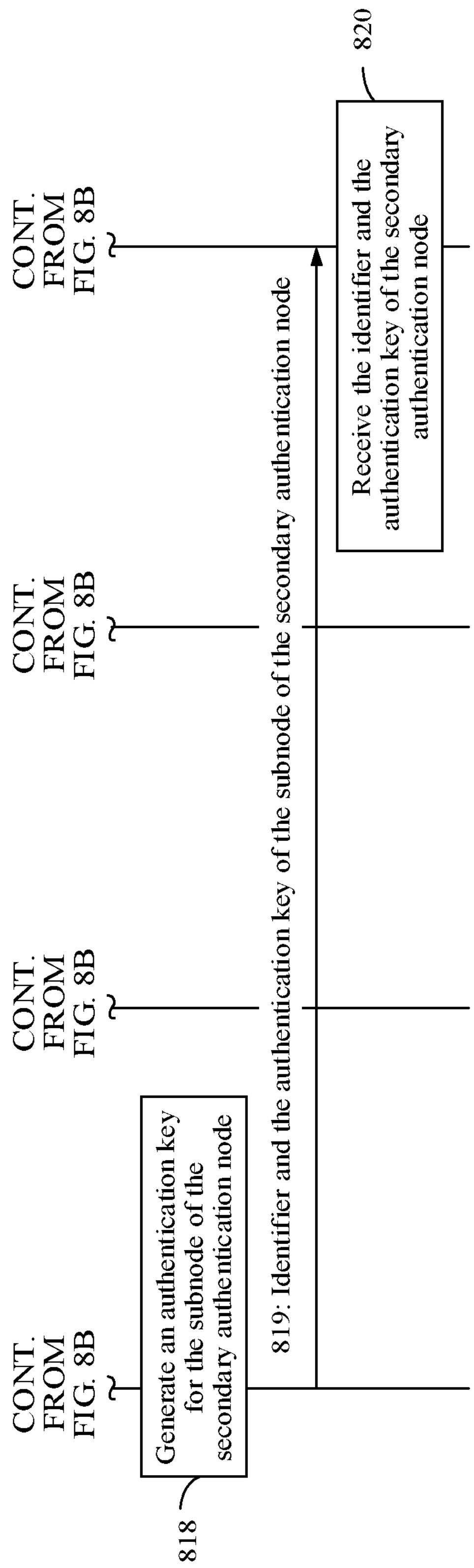
Figure 9A:
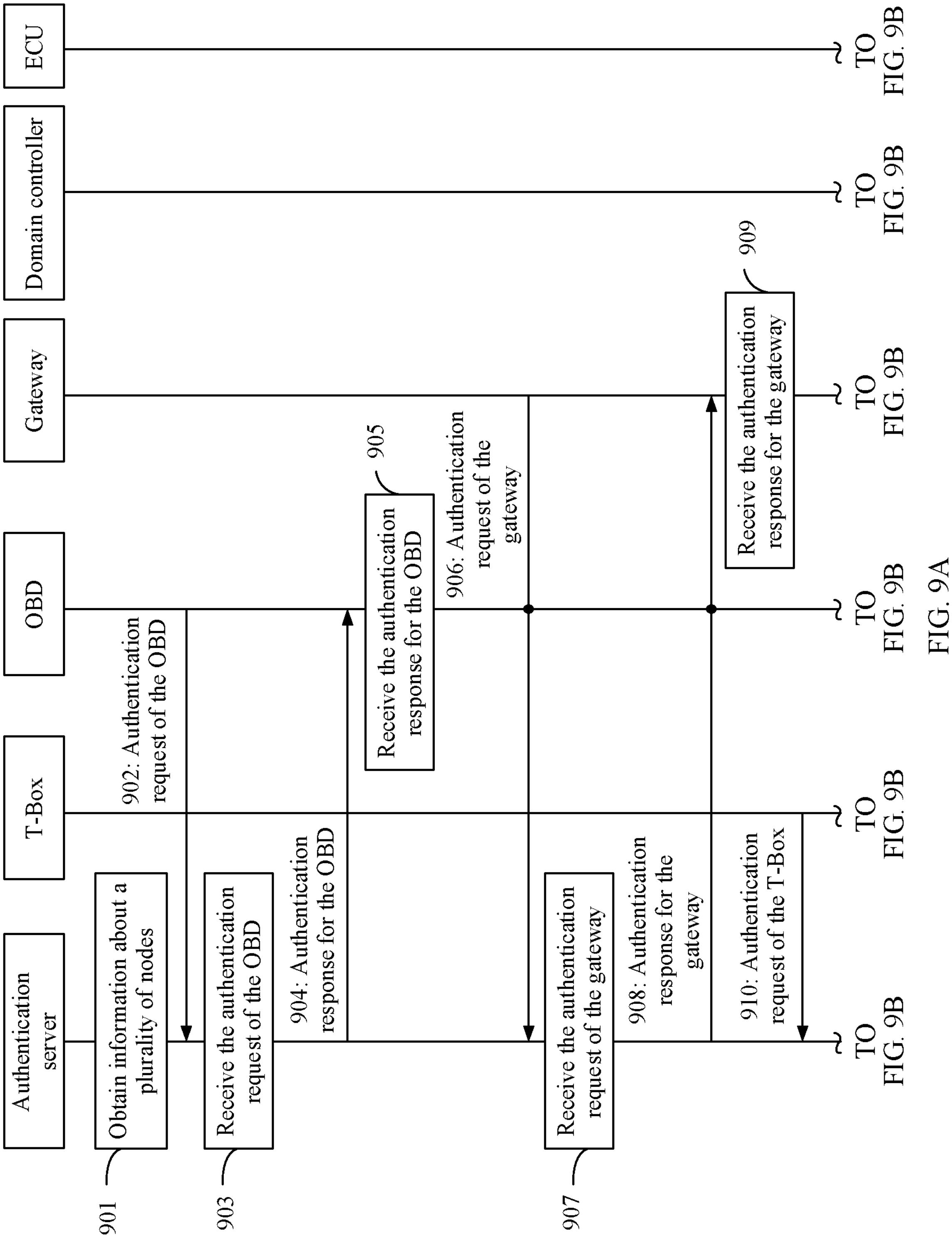
FIG. 9A, FIG. 9B, FIG. 9C, and FIG. 9D are a schematic flowchart of an authentication method according to an embodiment of this application.
Figure 9B:
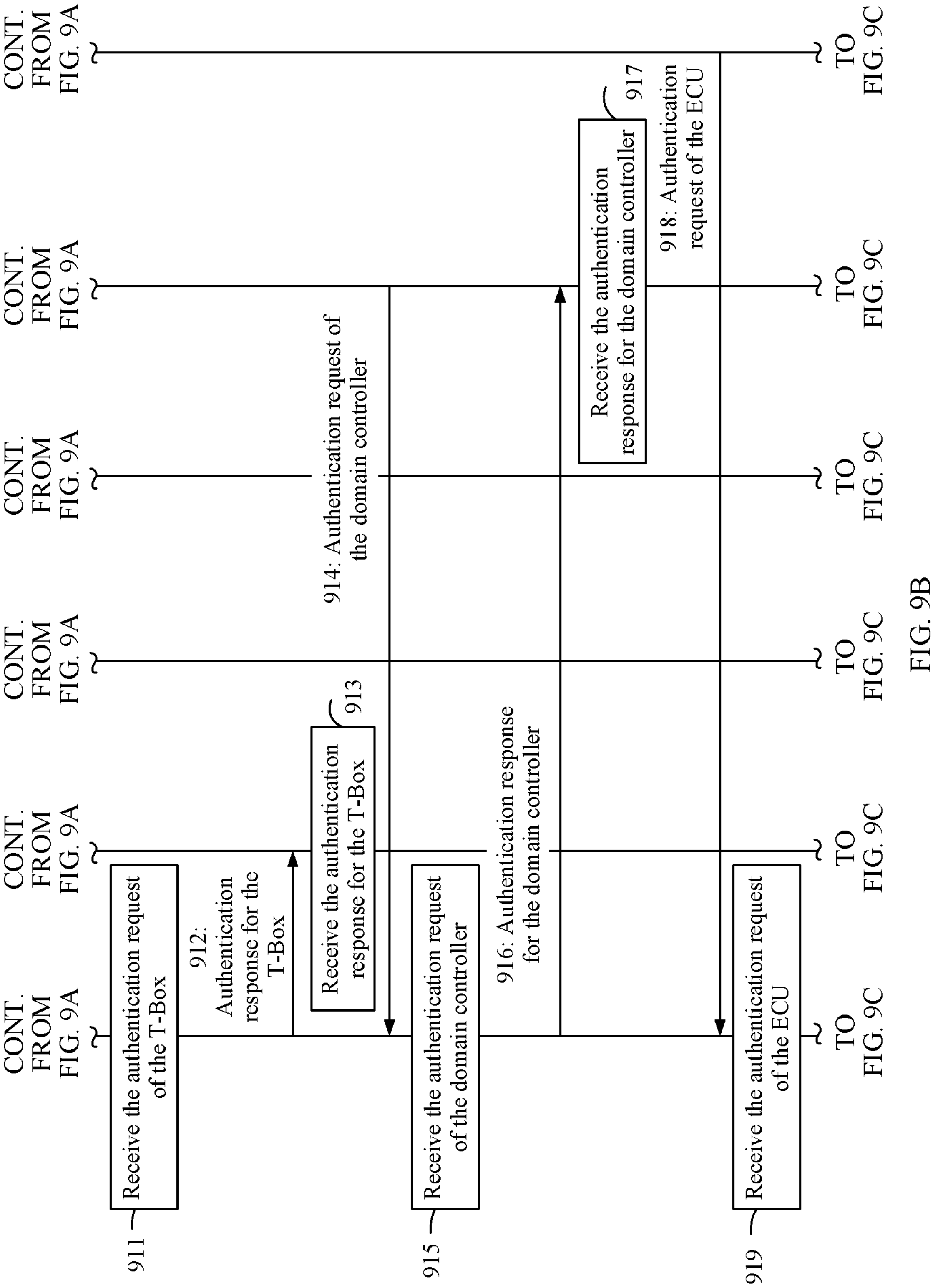
Figure 9C:
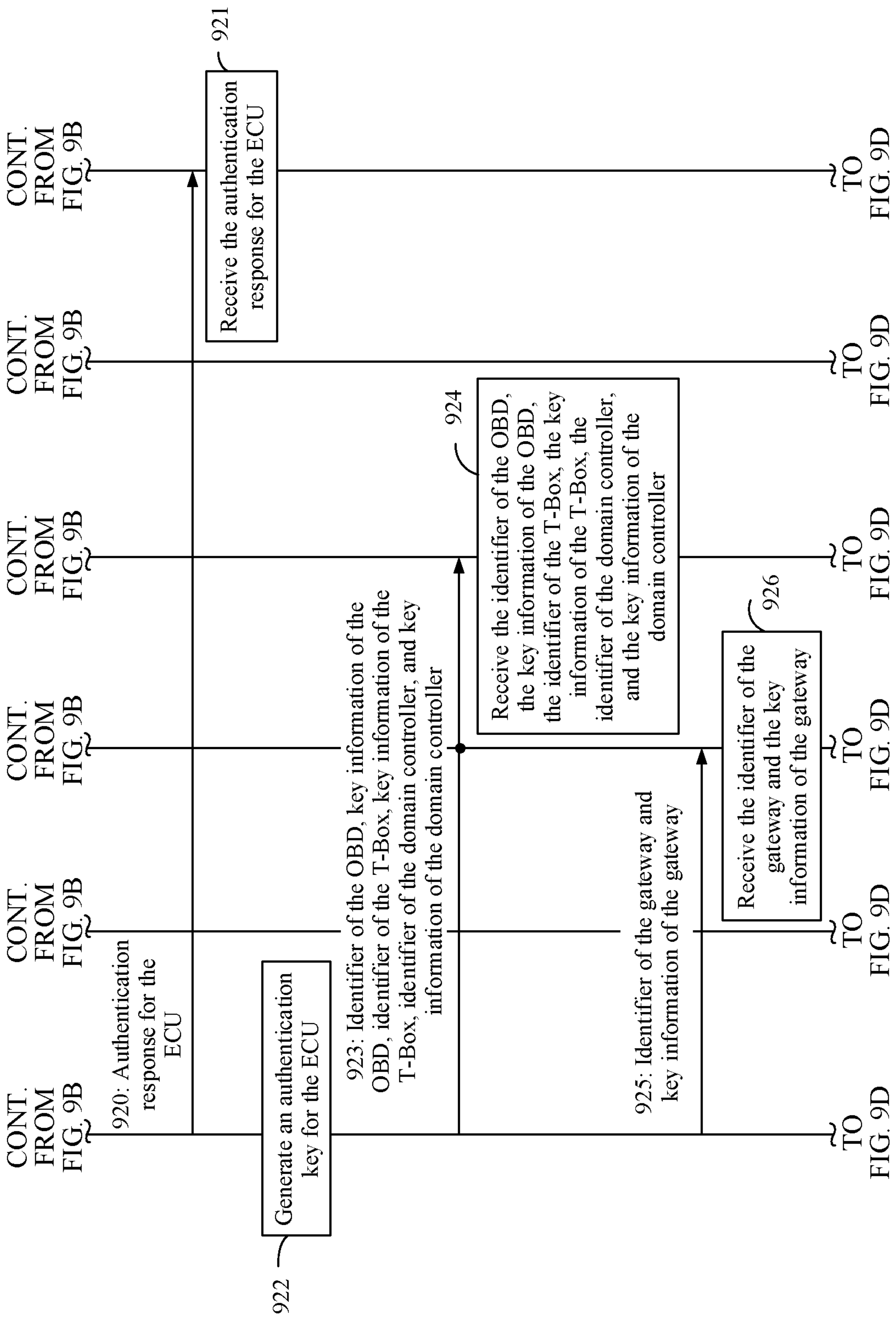
Figure 9D:
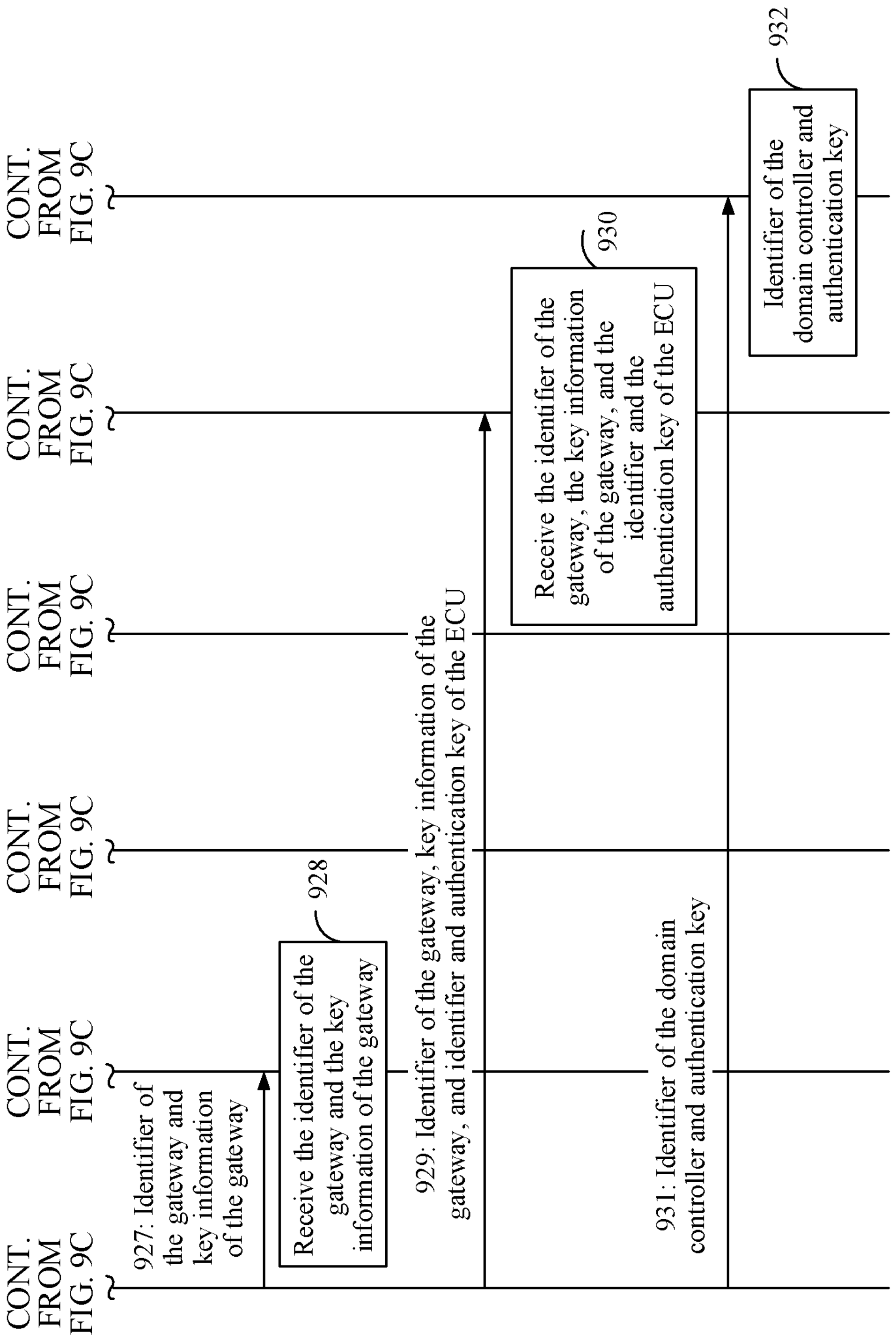
Figure 10A:
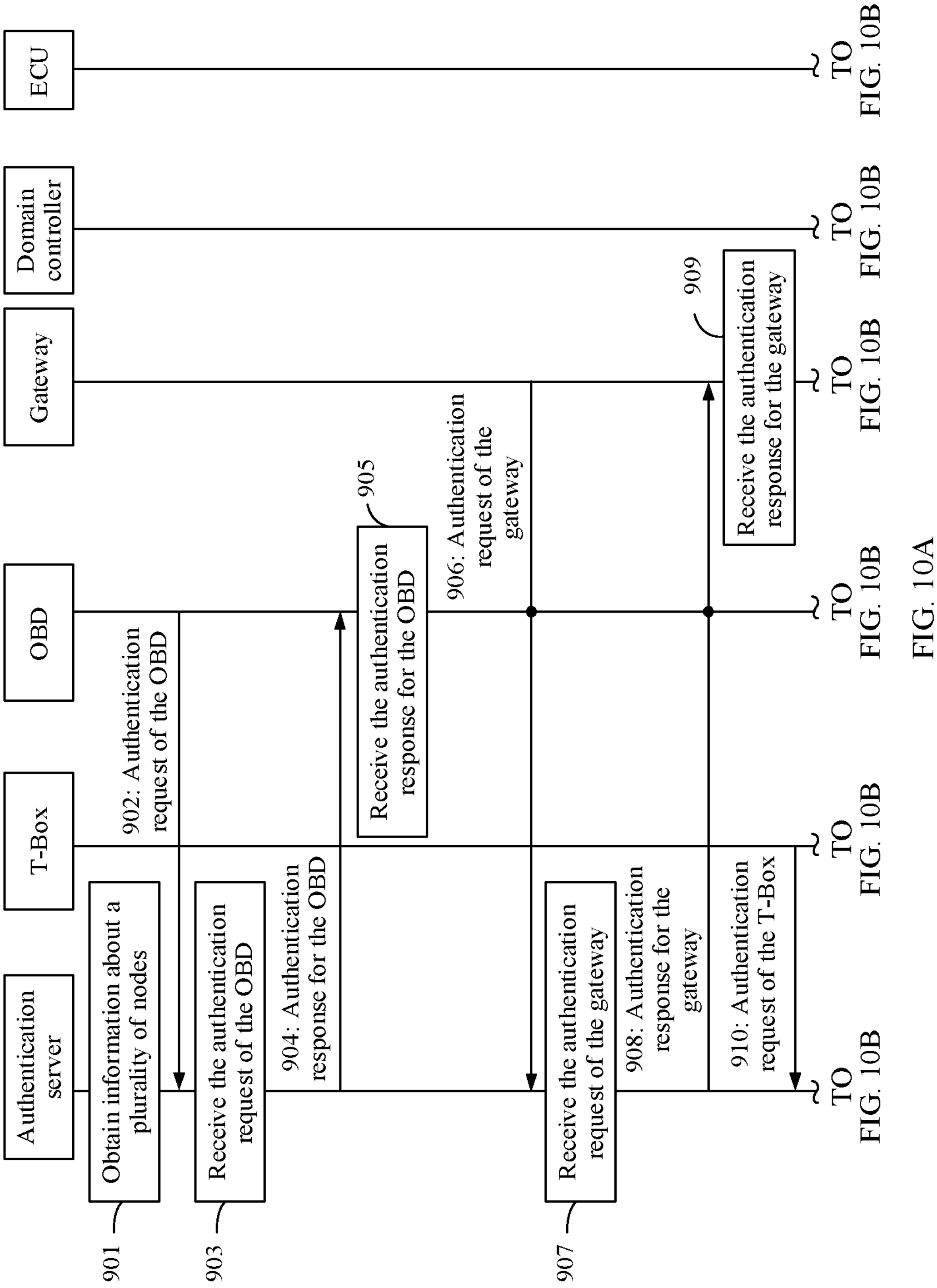
FIG. 10A, FIG. 10B, FIG. 10C, FIG. 10D, and FIG. 10E are a schematic flowchart of an authentication method according to an embodiment of this application.
Figure 10B:
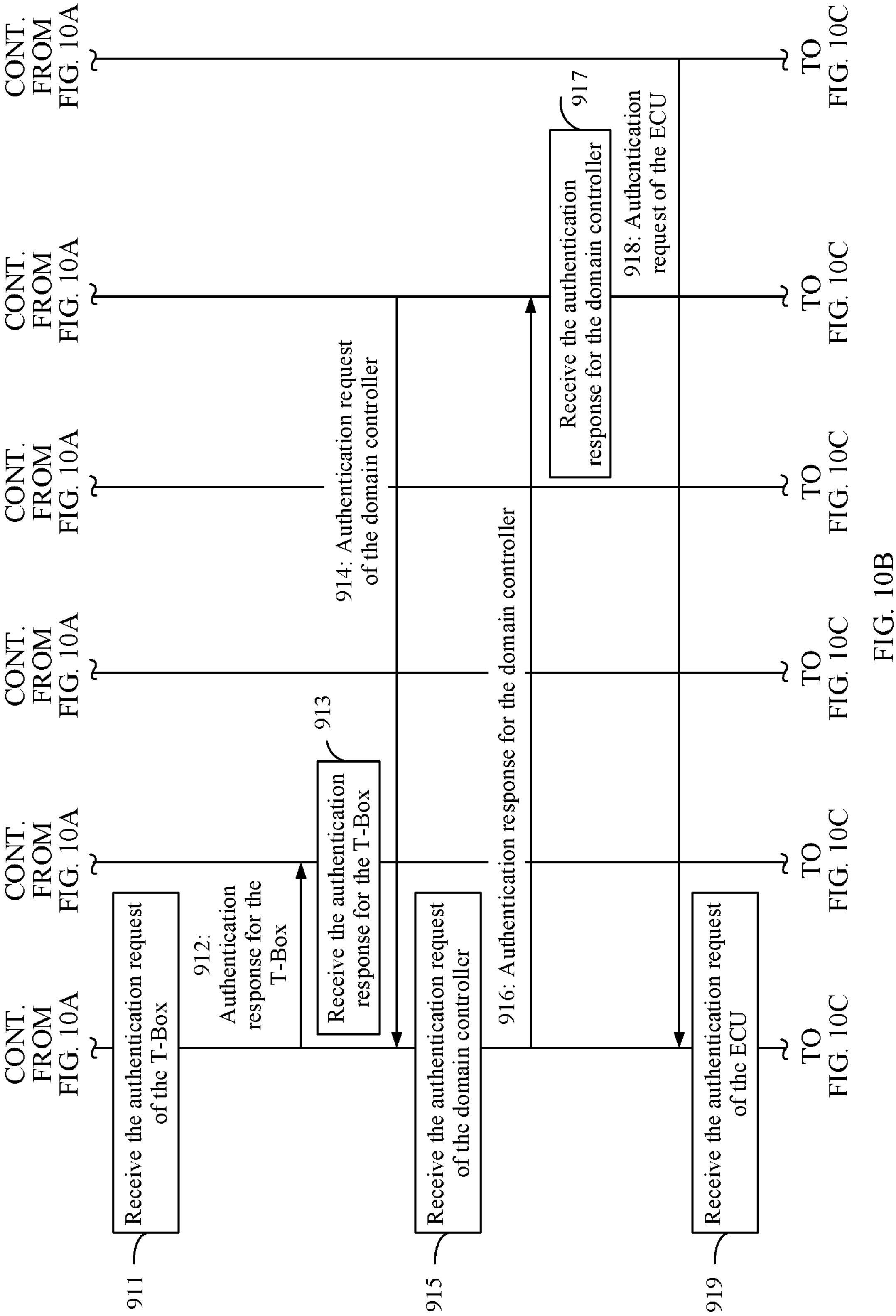
Figure 10C:
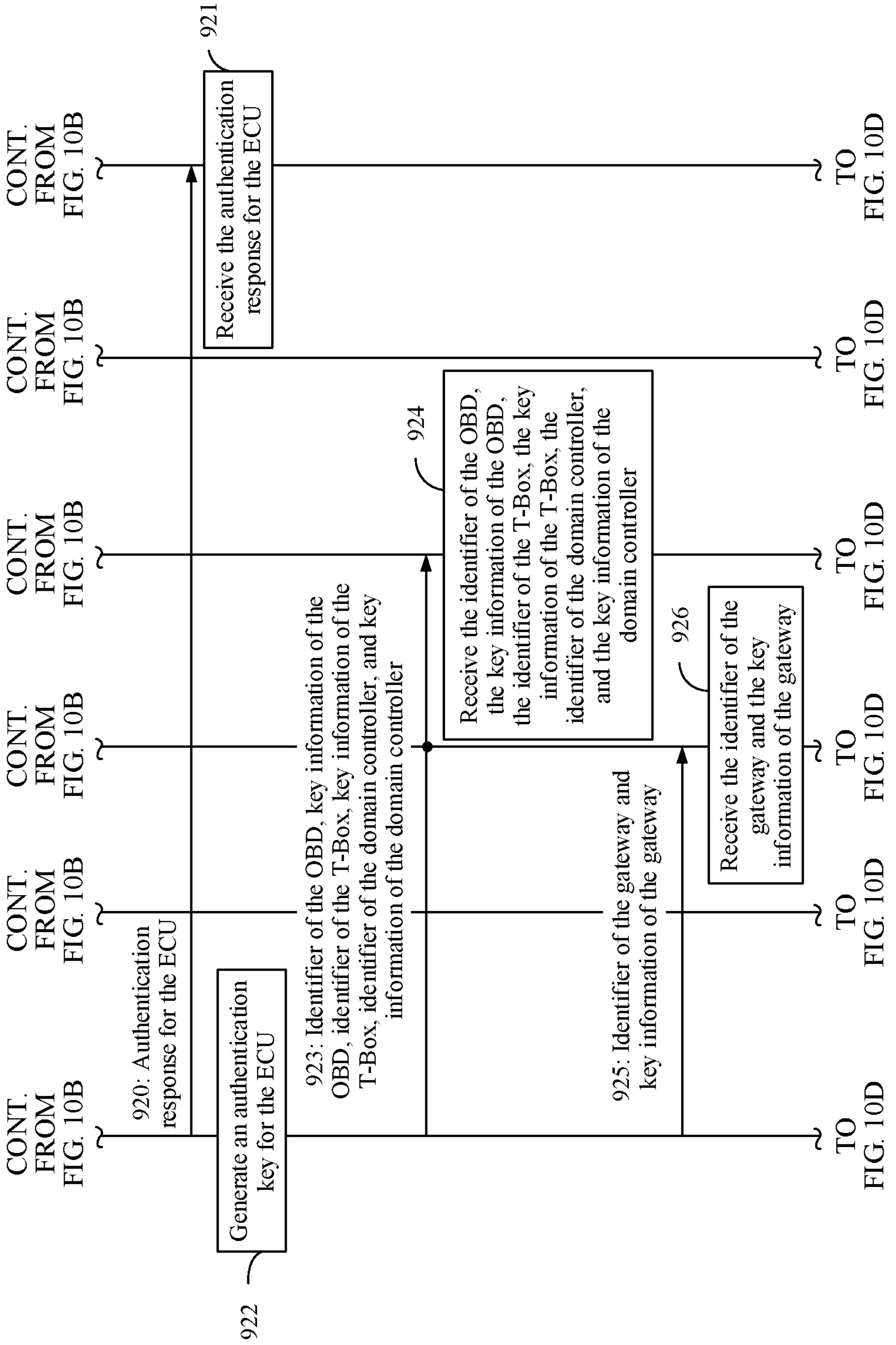
Figure 10D:
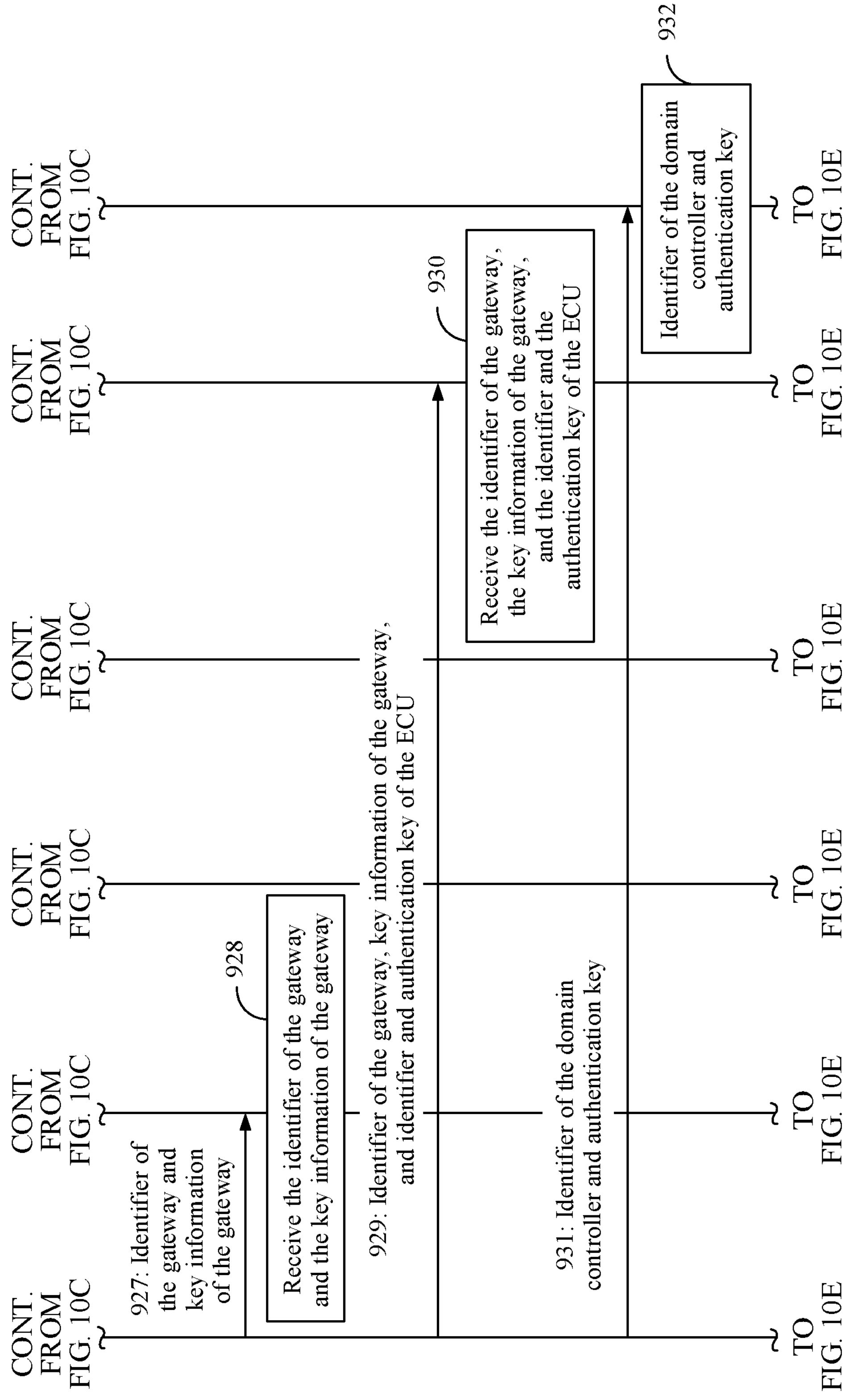
Figure 10E:
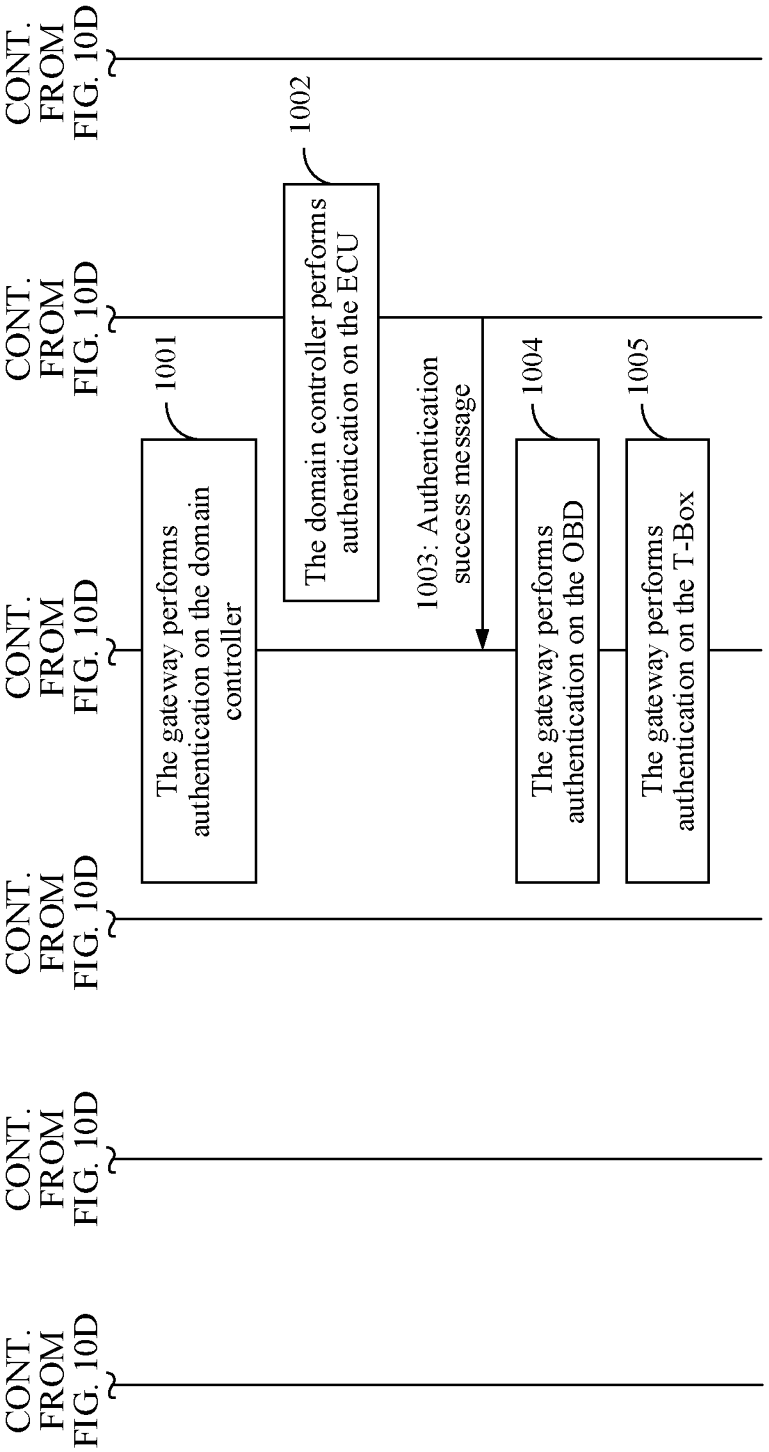

FIG. 8A to FIG. 8C show another authentication method according to an embodiment of this application. The authentication method shown in FIG. 8A to FIG. 8C may include step 801 to step 820.

Step 801: An authentication server obtains information about a plurality of nodes.

Step 802: A primary authentication node sends an authentication request of the primary authentication node to the authentication server.

The primary authentication node may be an initially deployed primary authentication node, or the primary authentication node may be a primary authentication node obtained after device replacement.

For example, the primary authentication node may be the gateway 102 shown in FIG. 1B.

For another example, the primary authentication node may be a node that replaces the gateway 102.

Step 803: The authentication server receives the authentication request from the primary authentication node.

Step 804: The authentication server sends an authentication response for the primary authentication node to the primary authentication node.

Step 805: The primary authentication node receives the authentication response for the primary authentication node from the authentication server.

For descriptions of step 801 to step 805, refer to the specific descriptions of step 501 to step 505. Details are not described herein again.

Step 806: A secondary authentication node sends an authentication request of the secondary authentication node to the authentication server.

The secondary authentication node is an initially deployed secondary authentication node, or the secondary authentication node is a secondary authentication node obtained after device replacement.

For example, the secondary authentication node may be one or more of the T-Box 101, the OBD 103, the domain controller 104 to the domain controller 106, and the ADAS 107 shown in FIG. 1B.

For another example, the secondary authentication node may be a node that replaces one or more of the T-Box 101, the OBD 103, the domain controller 104 to the domain controller 106, and the ADAS 107.

Step 807: The authentication server receives the authentication request from the secondary authentication node.

Step 808: The authentication server sends an authentication response for the secondary authentication node to the secondary authentication node.

Step 809: The secondary authentication node receives the authentication response for the secondary authentication node from the authentication server.

For descriptions of step 806 to step 809, refer to the specific descriptions of step 502 to step 505. Details are not described herein again.

Step 810: A subnode of the secondary authentication node sends an authentication request of the subnode of the secondary authentication node to the authentication server.

The subnode of the secondary authentication node is a subnode of an initially deployed secondary authentication node, or the subnode of the secondary authentication node is a subnode of a secondary authentication node obtained after device replacement.

For example, the subnode of the secondary authentication node may be one or more of the ECU 108 to the ECU 113, and the sensor 114 and the sensor 115 shown in FIG. 1B.

For another example, the subnode of the secondary authentication node may be a node that replaces one or more of the ECU 108 to the ECU 113, and the sensor 114 and the sensor 115 shown in FIG. 1B.

Step 811: The authentication server receives the authentication request from the subnode of the secondary authentication node.

Step 812: The authentication server sends an authentication response for the subnode of the secondary authentication node to the subnode of the secondary authentication node.

Step 813: The subnode of the secondary authentication node receives the authentication response for the subnode of the secondary authentication node from the authentication server.

For descriptions of step 810 to step 813, refer to the specific descriptions of step 502 to step 505. Details are not described herein again.

Step 814: The authentication server sends an identifier of the secondary authentication node and key information of the secondary authentication node to the primary authentication node.

Step 815: The primary authentication node receives the identifier of the secondary authentication node and the key information of the secondary authentication node from the authentication server.

Step 816: The authentication server sends an identifier of the primary authentication node and key information of the primary authentication node to the secondary authentication node.

Step 817: The secondary authentication node receives the identifier of the primary authentication node and the key information of the primary authentication node from the authentication server.

For descriptions of step 814 to step 817, refer to the specific descriptions of step 506 to step 509. Details are not described herein again.

Step 818: The authentication server generates an authentication key for the subnode of the secondary authentication node.

For a description of step 818, refer to the specific description of step 511. Details are not described herein again.

Step 819: The authentication server sends the identifier of the secondary authentication node and the authentication key to the subnode of the secondary authentication node.

Step 820: The subnode of the secondary authentication node receives the identifier of the secondary authentication node and the authentication key from the authentication server.

For descriptions of step 819 and step 820, refer to the specific descriptions of step 514 and step 515. Details are not described herein again.

It should be noted that a sequence of performing step 802 to step 804, step 806 to step 809, and step 810 to step 813 is not limited in this embodiment of this application. For example, in this embodiment of this application, step 806 to step 809 may be performed before step 802 to step 805 that may be performed before step 810 to step 813. Alternatively, in this embodiment of this application, step 810 to step 813 may be performed before step 806 to step 809 that may be performed before step 802 to step 805.

It should be noted that a sequence of performing step 814 and step 815, step 816 and step 817, and step 818 to step 820 is not limited in this embodiment of this application. For example, in this embodiment of this application, step 818 to step 820 may be performed before step 816 and step 817 that may be performed before step 814 and step 815. Alternatively, in this embodiment of this application, step 816 and step 817 may be performed step 818 to step 820 that may be performed before step 814 and step 815.

According to the method shown in FIG. 8A to FIG. 8C, after the authentication on the primary authentication node, the secondary authentication node, and the subnode of the secondary authentication node succeeds, the authentication server may send the identifier of the secondary authentication node and the key information of the secondary authentication node to the primary authentication node, send the identifier of the primary authentication node and the key information of the primary authentication node to the secondary authentication node, and send the identifier of the secondary authentication node and the key information of the secondary authentication node to the subnode of the secondary authentication node, so that the primary authentication node subsequently performs authentication on the secondary authentication node and the secondary authentication node subsequently performs authentication on the subnode of the secondary authentication node.

Optionally, in a first implementation scenario of the embodiment shown in FIG. 8A to FIG. 8C, the method shown in FIG. 8A to FIG. 8C further includes step 821 to step 824.

Step 821: The authentication server sends the identifier and the authentication key of the subnode of the secondary authentication node to the secondary authentication node.

Step 822: The secondary authentication node receives the identifier and the authentication key of the subnode of the secondary authentication node from the authentication server.

For descriptions of step 821 and step 822, refer to the specific descriptions of step 512 and step 513. Details are not described herein again.

Step 823: The primary authentication node performs authentication on the secondary authentication node.

For a description of step 823, refer to the specific description of step 510. Details are not described herein again.

Step 824: The secondary authentication node performs authentication on the subnode of the secondary authentication node.

For a description of step 824, refer to the specific description of step 516. Details are not described herein again.

It should be noted that a sequence of performing step 821 and step 822 and step 823 is not limited in this embodiment of this application. In this embodiment of this application, step 821 and step 822 may be performed before step 823. Alternatively, in this embodiment of this application, step 823 may be performed before step 821 and step 822.

It should be noted that a sequence of performing step 823 and step 824 is not limited in this embodiment of this application. In this embodiment of this application, step 823 may be performed before step 824. Alternatively, in this embodiment of this application, step 824 may be performed before step 823.

Based on the first implementation scenario of the embodiment shown in FIG. 8A to FIG. 8C, the primary authentication node may perform authentication on the secondary authentication node based on the identifier of the primary authentication node, the key information of the primary authentication node, the identifier of the secondary authentication node, and the key information of the secondary authentication node, and the secondary authentication node may perform authentication on the subnode of the secondary authentication node based on the identifier of the secondary authentication node, and the identifier and the authentication key of the subnode of the secondary authentication node.

An example in which the in-vehicle system includes a gateway, an OBD, a T-Box, a domain controller, and an ECU is used below to describe the authentication method provided in this embodiment of this application.

FIG. 9A to FIG. 9D show still another authentication method according to an embodiment of this application. On a vehicle production line, the authentication method shown in FIG. 9A to FIG. 9D may be used by the authentication server to perform authentication on the gateway, the OBD, the T-Box, the domain controller, and the ECU. The authentication method shown in FIG. 9A to FIG. 9D includes step 901 to step 932.

Step 901: The authentication server obtains information about a plurality of nodes.

The plurality of nodes includes the gateway, the OBD, the T-Box, the domain controller, and the ECU.

Step 902: The OBD sends an authentication request of the OBD to the authentication server.

Step 903: The authentication server receives the authentication request from the OBD.

Step 904: The authentication server sends an authentication response for the OBD to the OBD.

Step 905: The OBD receives the authentication response for the OBD from the authentication server.

Step 906: If the authentication on the OBD succeeds, the gateway sends an authentication request of the gateway to the authentication server by using the OBD.

Step 907: The authentication server receives the authentication request from the gateway by using the OBD.

Step 908: The authentication server sends an authentication response for the gateway to the gateway by using the OBD.

Step 909: The gateway receives the authentication response for the gateway from the authentication server by using the OBD.

Step 910: The T-Box sends an authentication request of the T-Box to the authentication server.

Step 911: The authentication server receives the authentication request from the T-Box.

Step 912: The authentication server sends an authentication response for the T-Box to the T-Box.

Step 913: The T-Box receives the authentication response for the T-Box from the authentication server.

Step 914: The domain controller sends an authentication request of the domain controller to the authentication server.

Step 915: The authentication server receives the authentication request from the domain controller.

Step 916: The authentication server sends an authentication response for the domain controller to the domain controller.

Step 917: The domain controller receives the authentication response for the domain controller from the authentication server.

Step 918: The ECU sends an authentication request of the ECU to the authentication server.

Step 919: The authentication server receives the authentication request from the ECU.

Step 920: The authentication server sends an authentication response for the ECU to the ECU.

Step 921: The ECU receives the authentication response for the ECU from the authentication server.

If the authentication performed by the authentication server on the gateway, the OBD, the T-Box, the domain controller, and the ECU succeeds, step 922 is performed.

If the authentication performed by the authentication server on a device in the gateway, the OBD, the T-Box, the domain controller, and the ECU fails, the device may be an unauthorized device, and the authentication server may perform authentication on the device again, or the authentication server performs authentication on a replacement device after the device is replaced.

Step 922: The authentication server generates an authentication key for the ECU.

Step 923: The authentication server sends an identifier of the OBD, key information of the OBD, an identifier of the T-Box, key information of the T-Box, an identifier of the domain controller, and key information of the domain controller to the gateway by using the OBD.

Step 924: The gateway receives the identifier of the OBD, the key information of the OBD, the identifier of the T-Box, the key information of the T-Box, the identifier of the domain controller, and the key information of the domain controller from the authentication server by using the OBD.

Step 925: The authentication server sends an identifier of the gateway and key information of the gateway to the OBD.

Step 926: The OBD receives the identifier of the gateway and the key information of the gateway from the authentication server.

Step 927: The authentication server sends the identifier of the gateway and the key information of the gateway to the T-Box.

Step 928: The T-Box receives the identifier of the gateway and the key information of the gateway from the authentication server.

Step 929: The authentication server sends the identifier of the gateway, the key information of the gateway, and an identifier and the authentication key of the ECU to the domain controller.

Step 930: The domain controller receives the identifier of the gateway, the key information of the gateway, and the identifier and the authentication key of the ECU from the authentication server.

Step 931: The authentication server sends the identifier of the domain controller and the authentication key to the ECU.

Step 932: The ECU receives the identifier of the domain controller and the authentication key from the authentication server.

For a specific process and beneficial effects of the method shown in FIG. 9A to FIG. 9D, refer to descriptions of FIG. 5 and various implementation scenarios of the embodiment shown in FIG. 5 and descriptions of FIG. 8A to FIG. 8C and various implementation scenarios of the embodiment shown in FIG. 8A to FIG. 8C. Details are not described herein again.

Optionally, in a first implementation scenario of the embodiment shown in FIG. 9A to FIG. 9D, after the authentication on the gateway, the OBD, the T-Box, the domain controller, and the ECU succeeds, the gateway, the OBD, the T-Box, the domain controller, and the ECU may be combined into an in-vehicle system. In the in-vehicle system, the gateway is connected to the OBD, the T-Box, and the domain controller, and the domain controller is further connected to the ECU. As shown in FIG. 10A to FIG. 10E, the method shown in FIG. 9A to FIG. 9D further includes step 1001 to step 1005.

Step 1001: The gateway performs authentication on the domain controller.

Step 1002: If the authentication performed by the gateway on the domain controller succeeds, the domain controller performs authentication on the ECU.

Optionally, if the authentication performed by the gateway on the domain controller fails, the in-vehicle system is prohibited from being started.

Step 1003: If the authentication performed by the domain controller on the ECU succeeds, the domain controller sends an authentication success message to the gateway.

Optionally, if the authentication performed by the domain controller on the ECU fails, the in-vehicle system is prohibited from being started.

Optionally, if the authentication performed by the domain controller on the ECU fails, the domain controller sends an authentication failure message to the gateway.

Step 1004: The gateway performs authentication on the OBD.

Step 1005: If the authentication performed by the gateway on the OBD succeeds, the gateway performs authentication on the T-Box.

Optionally, if the authentication performed by the gateway on the OBD fails, the in-vehicle system is prohibited from being started.

Optionally, if the authentication performed by the gateway on the T-Box fails, the in-vehicle system is prohibited from being started, or if the authentication performed by the gateway on the T-Box succeeds, the in-vehicle system is started.

For a specific process and beneficial effects of the method shown in FIG. 10A to FIG. 10E, refer to descriptions in various implementation scenarios of the embodiment shown in FIG. 5 and descriptions in various implementation scenarios of the embodiment shown in FIG. 8A to FIG. 8C. Details are not described herein again.

Figure 11A:
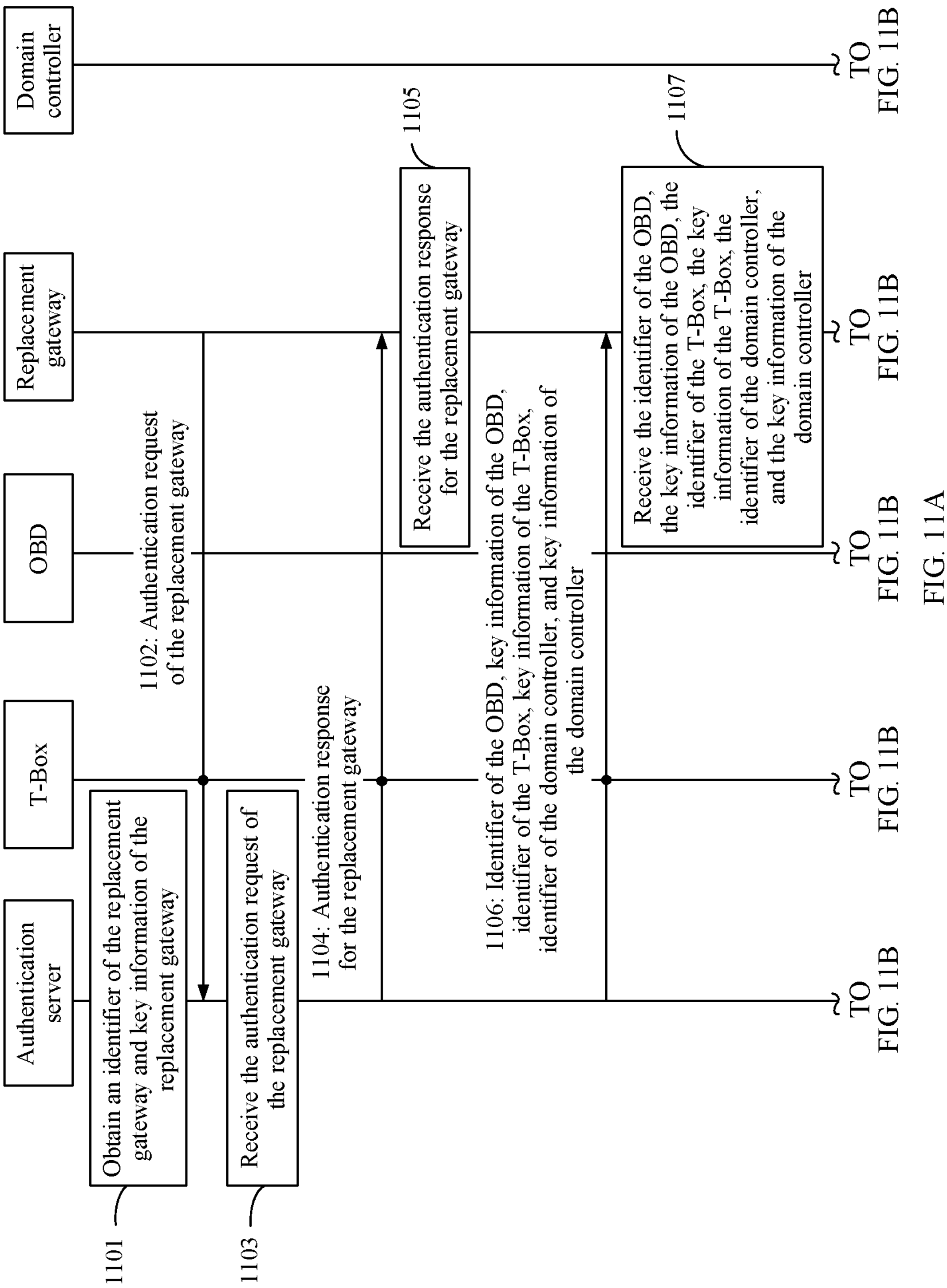
FIG. 11A, FIG. 11B, and FIG. 11C are a schematic flowchart of an authentication method according to an embodiment of this application.
Figure 11B:
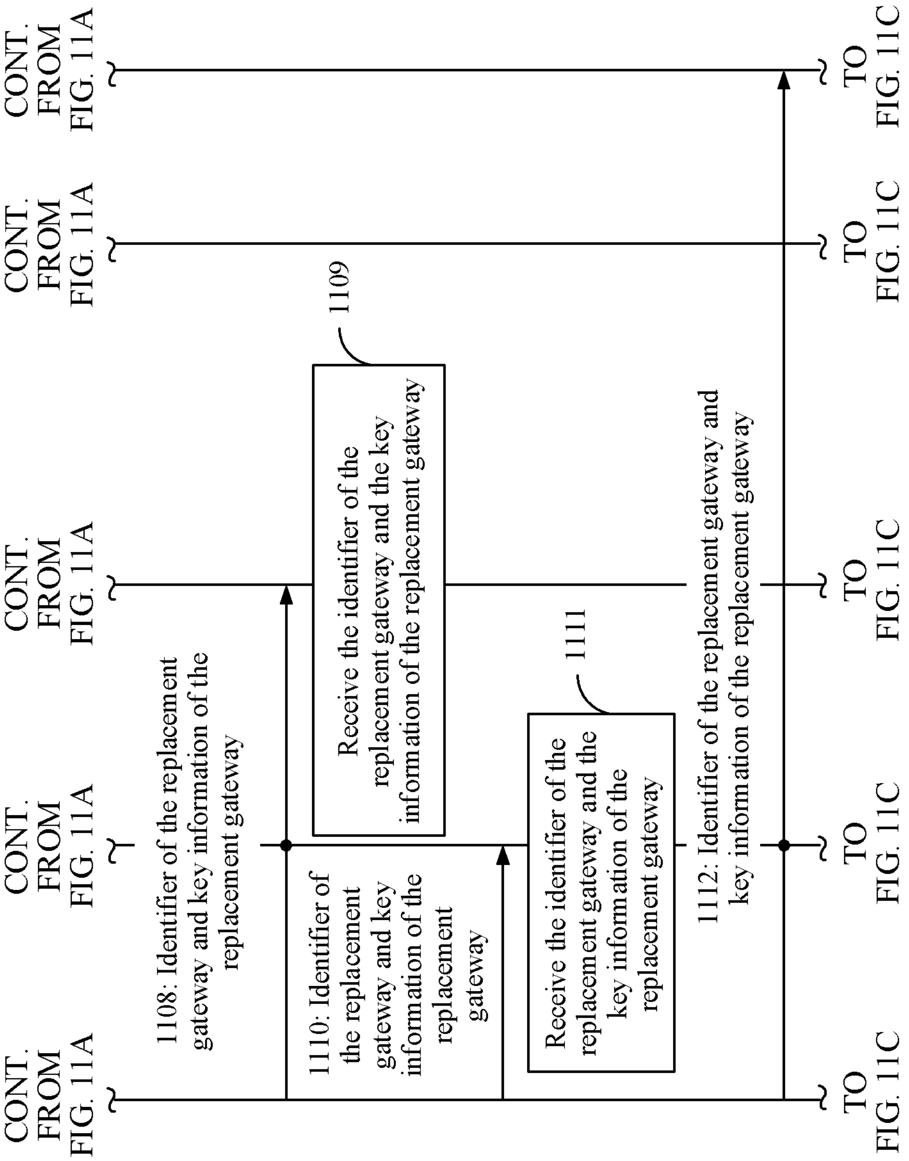
Figure 11C:
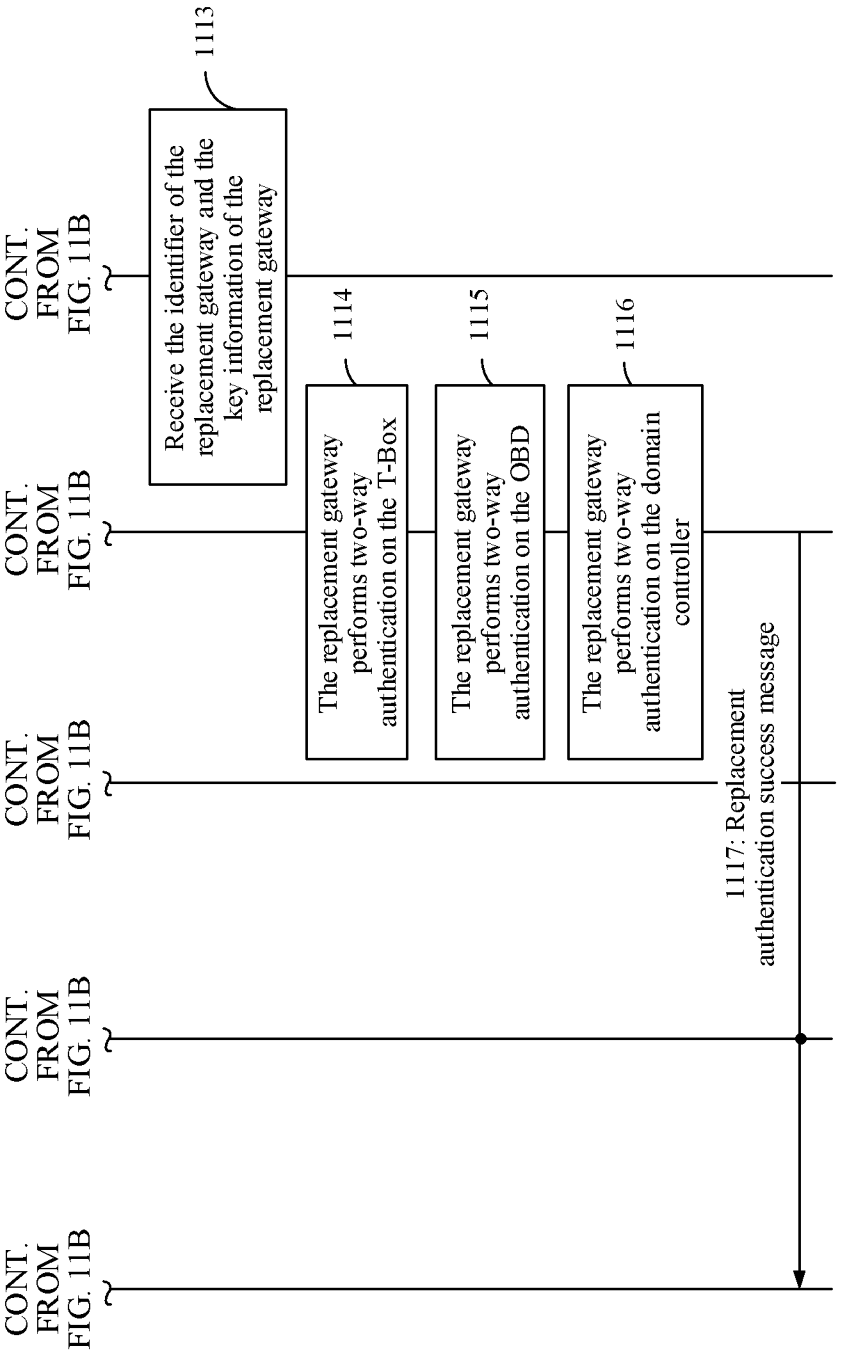

FIG. 11A to FIG. 11C show still another authentication method according to an embodiment of this application. After the gateway in the in-vehicle system in FIG. 10A to FIG. 10E is replaced, the method shown in FIG. 11A to FIG. 11C may be used to perform authentication on a replacement gateway. The authentication method shown in FIG. 11A to FIG. 11C may include step 1101 to step 1117.

Step 1101: The authentication server obtains an identifier of the replacement gateway and key information of the replacement gateway.

Step 1102: The replacement gateway sends an authentication request of the replacement gateway to the authentication server by using the T-Box.

Step 1103: The authentication server receives the authentication request from the replacement gateway by using the T-Box.

Step 1104: The authentication server sends an authentication response for the replacement gateway to the replacement gateway based on the identifier of the replacement gateway and the key information of the replacement gateway by using the T-Box.

Step 1105: The replacement gateway receives the authentication response for the replacement gateway from the authentication server by using the T-Box.

Step 1106: If the authentication on the replacement gateway succeeds, the authentication server sends an identifier of the OBD, key information of the OBD, an identifier of the T-Box, key information of the T-Box, an identifier of the domain controller, and key information of the domain controller to the replacement gateway by using the T-Box.

Step 1107: The replacement gateway receives the identifier of the OBD, the key information of the OBD, the identifier of the T-Box, the key information of the T-Box, the identifier of the domain controller, and the key information of the domain controller from the authentication server by using the T-Box.

Step 1108: The authentication server sends the identifier of the replacement gateway and the key information of the replacement gateway to the OBD by using the T-Box.

Step 1109: The OBD receives the identifier of the replacement gateway and the key information of the replacement gateway from the authentication server by using the T-Box.

Step 1110: The authentication server sends the identifier of the replacement gateway and the key information of the replacement gateway to the T-Box.

Step 1111: The T-Box receives the identifier of the replacement gateway and the key information of the replacement gateway from the authentication server.

Step 1112: The authentication server sends the identifier of the replacement gateway and the key information of the replacement gateway to the domain controller by using the T-Box.

Step 1113: The domain controller receives the identifier of the replacement gateway and the key information of the replacement gateway from the authentication server by using the T-Box.

Step 1114: The replacement gateway performs two-way authentication on the T-Box.

Step 1115: If the two-way authentication performed by the replacement gateway on the T-Box succeeds, the replacement gateway performs two-way authentication on the OBD.

Step 1116: If the two-way authentication performed by the replacement gateway on the OBD succeeds, the replacement gateway performs two-way authentication on the domain controller.

Step 1117: If the two-way authentication performed by the replacement gateway on the domain controller succeeds, the replacement gateway sends an authentication success message to the authentication server by using the T-Box.

For a specific process and beneficial effects of the method shown in FIG. 11A to FIG. 11C, refer to descriptions in various implementation scenarios of the embodiment shown in FIG. 5 and descriptions in various implementation scenarios of the embodiment shown in FIG. 8A to FIG. 8C. Details are not described herein again.

Figure 12A:
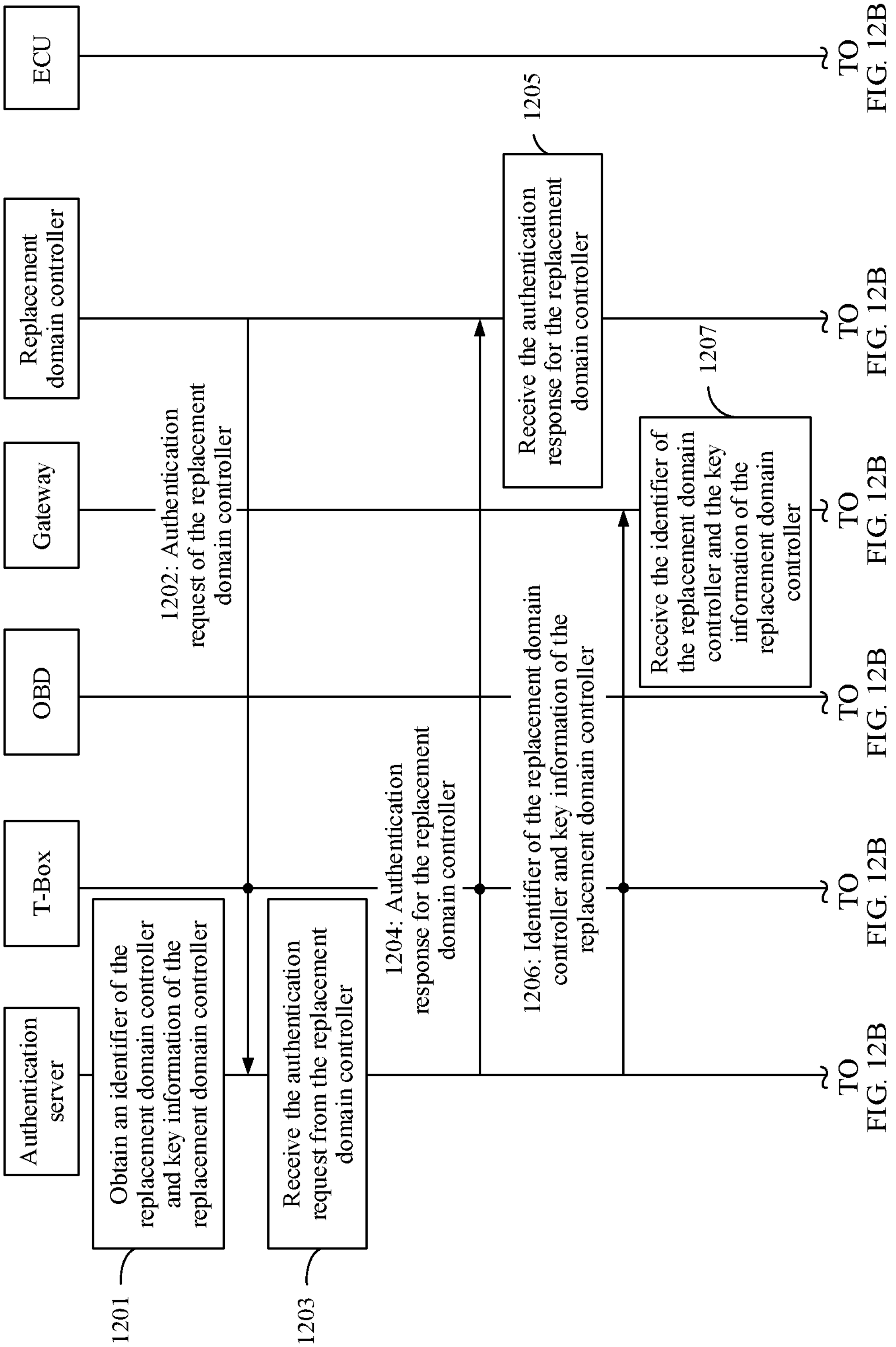
FIG. 12A and FIG. 12B are a schematic flowchart of an authentication method according to an embodiment of this application.
Figure 12B:
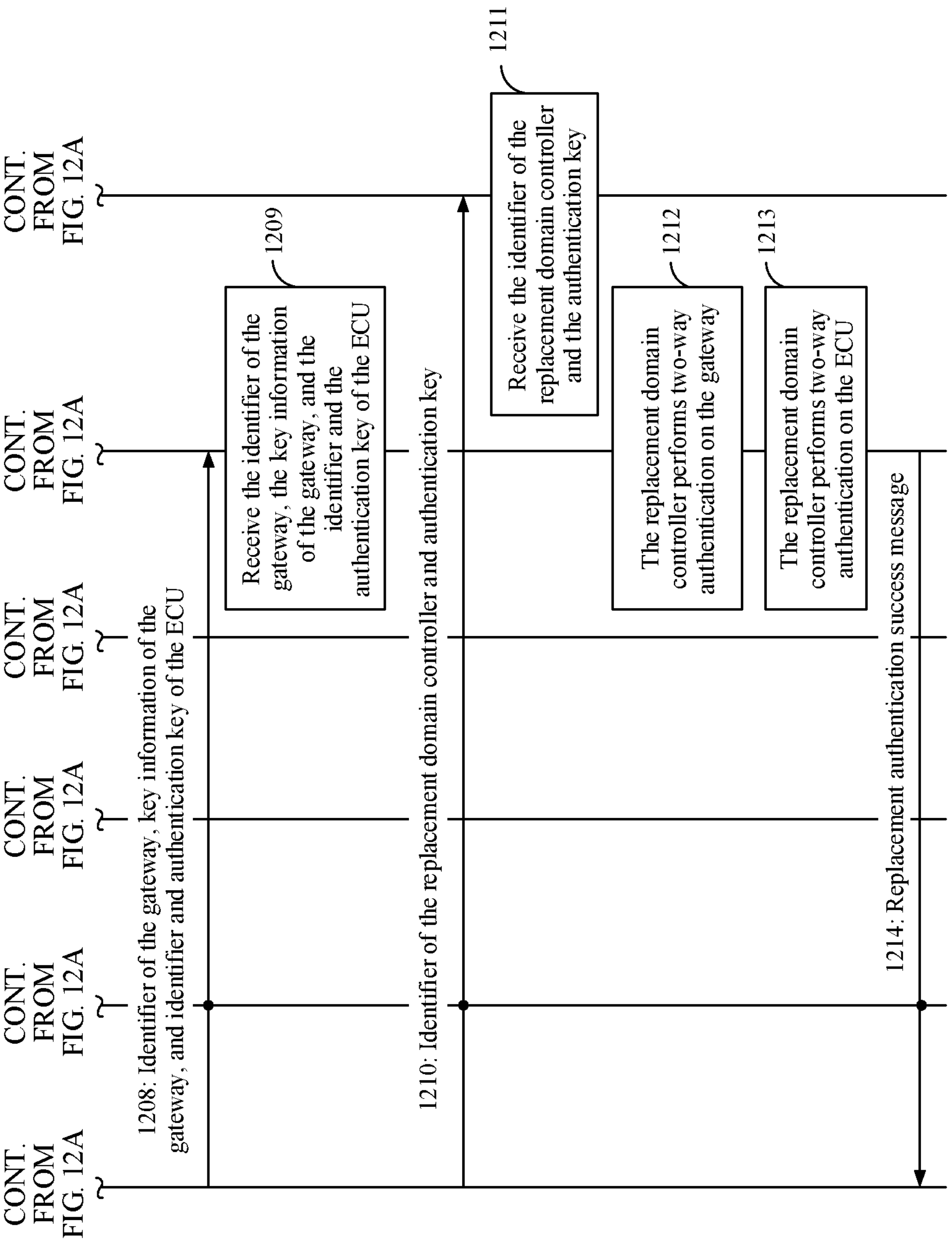

FIG. 12A and FIG. 12B show still another authentication method according to an embodiment of this application. After the domain controller in the in-vehicle system in FIG. 10A to FIG. 10E is replaced, the method shown in FIG. 12A and FIG. 12B may be used to perform authentication on a replacement domain controller. The authentication method shown in FIG. 12A and FIG. 12B may include step 1201 to step 1214.

Step 1201: The authentication server obtains an identifier of the replacement domain controller and key information of the replacement domain controller.

Step 1202: The replacement domain controller sends an authentication request of the replacement domain controller to the authentication server by using the T-Box.

Step 1203: The authentication server receives the authentication request from the replacement domain controller by using the T-Box.

Step 1204: The authentication server sends an authentication response for the replacement domain controller to the replacement domain controller based on the identifier of the replacement domain controller and the key information of the replacement domain controller by using the T-Box.

Step 1205: The replacement domain controller receives the authentication response for the replacement domain controller from the authentication server by using the T-Box.

Step 1206: If the authentication on the replacement domain controller succeeds, the authentication server sends the identifier of the replacement domain controller and the key information of the replacement domain controller to the gateway by using the T-Box.

Step 1207: The gateway receives the identifier of the replacement domain controller and the key information of the replacement domain controller from the authentication server by using the T-Box.

Step 1208: The authentication server sends an identifier of the gateway, key information of the gateway, and an identifier and the authentication key of the ECU to the replacement domain controller by using the T-Box.

Step 1209: The replacement domain controller receives the identifier of the gateway, the key information of the gateway, and the identifier and the authentication key of the ECU from the authentication server by using the T-Box.

Step 1210: The authentication server sends the identifier of the replacement domain controller and the authentication key to the ECU by using the T-Box.

Step 1211: The ECU receives the identifier of the replacement domain controller and the authentication key from the authentication server by using the T-Box.

Step 1212: The replacement domain controller performs two-way authentication on the gateway.

Step 1213: If the two-way authentication performed by the replacement domain controller on the gateway succeeds, the replacement domain controller performs two-way authentication on the ECU.

Step 1214: If the two-way authentication performed by the replacement domain controller on the ECU succeeds, the replacement domain controller sends an authentication success message to the authentication server by using the T-Box.

For a specific process and beneficial effects of the method shown in FIG. 12A and FIG. 12B, refer to descriptions in various implementation scenarios of the embodiment shown in FIG. 5 and descriptions in various implementation scenarios of the embodiment shown in FIG. 8A to FIG. 8C. Details are not described herein again.

After the OBD in the in-vehicle system in FIG. 10A to FIG. 10E is replaced, for a method for performing authentication on a replacement OBD, refer to the method shown in FIG. 12A and FIG. 12B. Details are not described herein again.

Figure 13:
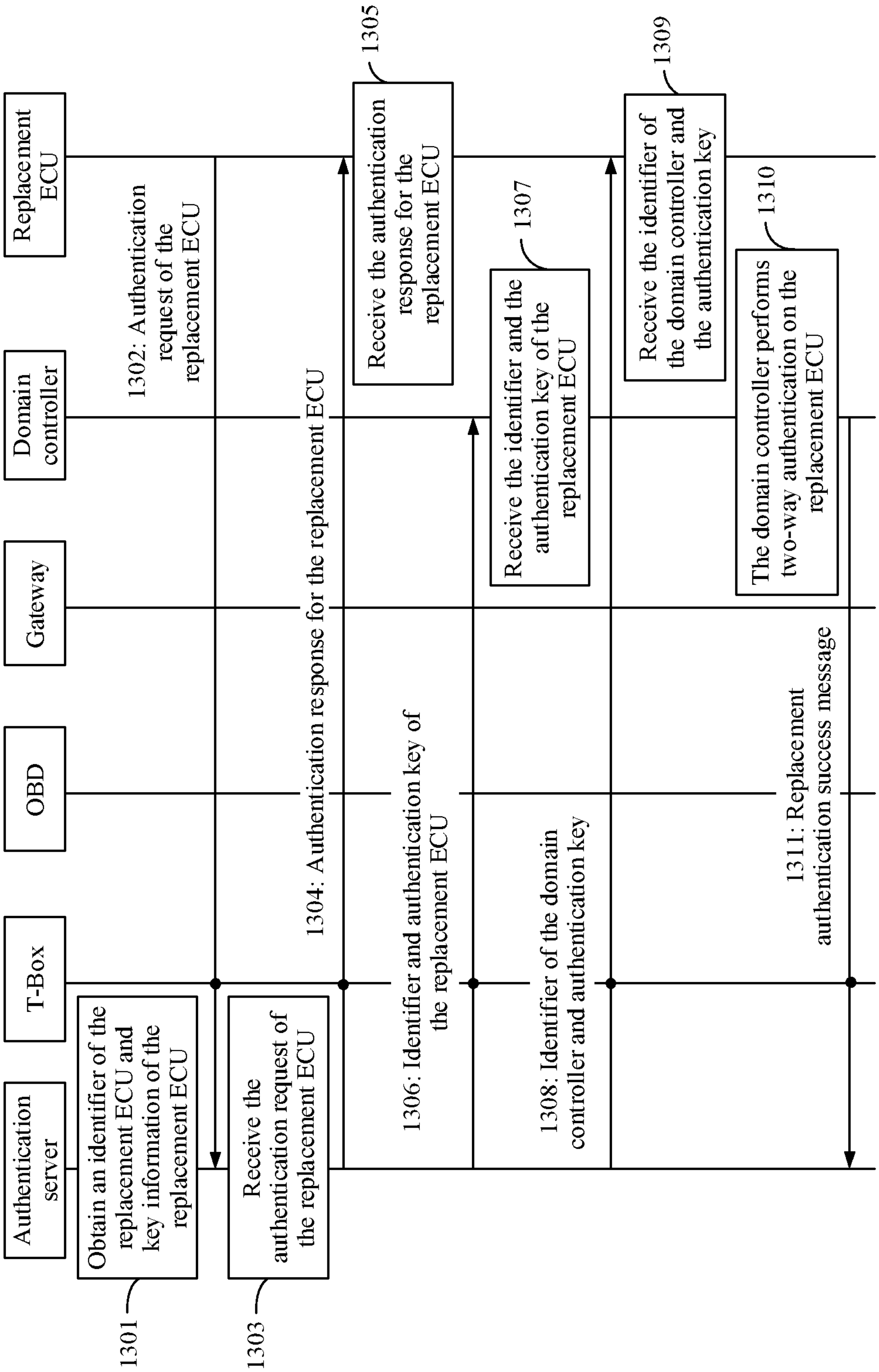
FIG. 13 is a schematic flowchart of an authentication method according to an embodiment of this application.

FIG. 13 shows still another authentication method according to an embodiment of this application. After the ECU in the in-vehicle system in FIG. 10A to FIG. 10E is replaced, the method shown in FIG. 13 may be used to perform authentication on a replacement ECU. The authentication method shown in FIG. 13 may include step 1301 to step 1311.

Step 1301: The authentication server obtains an identifier of the replacement ECU and key information of the replacement ECU.

Step 1302: The replacement ECU sends an authentication request of the replacement ECU to the authentication server by using the T-Box.

Step 1303: The authentication server receives the authentication request from the replacement ECU by using the T-Box.

Step 1304: The authentication server sends an authentication response for the replacement ECU to the replacement ECU based on the identifier of the replacement ECU and the key information of the replacement ECU by using the T-Box.

Step 1305: The replacement ECU receives the authentication response for the replacement ECU from the authentication server by using the T-Box.

Step 1306: If the authentication on the replacement ECU succeeds, the authentication server sends an identifier and an authentication key of the replacement ECU to the domain controller by using the T-Box.

Step 1307: The domain controller receives the identifier and the authentication key of the replacement ECU from the authentication server by using the T-Box.

Step 1308: The authentication server sends an identifier of the domain controller and the authentication key to the replacement ECU by using the T-Box.

Step 1309: The replacement ECU receives the identifier of the domain controller and the authentication key from the authentication server by using the T-Box.

Step 1310: The replacement ECU performs two-way authentication on the domain controller.

Step 1311: If the two-way authentication performed by the replacement ECU on the domain controller succeeds, the replacement ECU sends an authentication success message to the authentication server by using the T-Box.

For a specific process and beneficial effects of the method shown in FIG. 13, refer to descriptions in various implementation scenarios of the embodiment shown in FIG. 5 and descriptions in various implementation scenarios of the embodiment shown in FIG. 8A to FIG. 8C. Details are not described herein again.

The foregoing mainly describes the solutions provided in the embodiments of this application from the perspective of interaction between the network elements. It can be understood that, to implement the foregoing functions, the authentication server, the in-vehicle system, the primary authentication node, the secondary authentication node, the subnode of the secondary authentication node, or the like includes corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the authentication server may be obtained through division based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of this application is an example, and is merely logical function division and may be other division during actual implementation.

Figure 14:
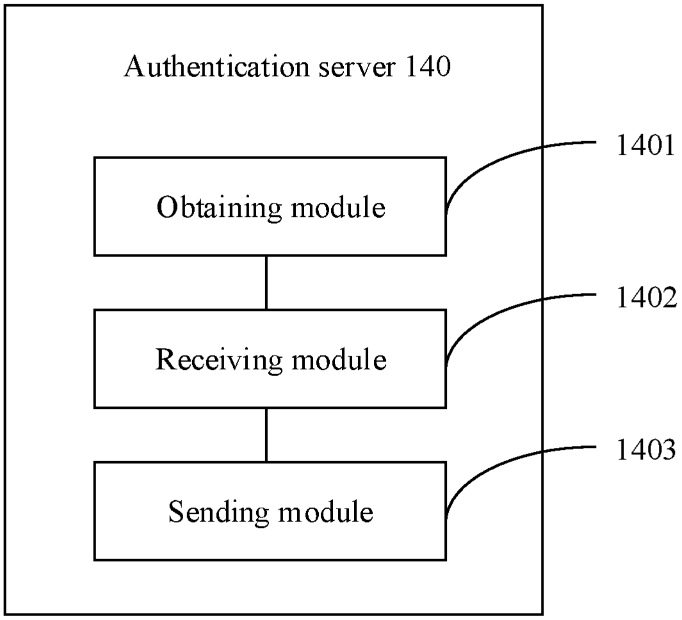
FIG. 14 is a schematic structural diagram of an authentication server according to an embodiment of this application.

For example, if each function module is obtained through integration, FIG. 14 is a schematic structural diagram of an authentication server 140. The authentication server 140 includes an obtaining module 1401, a receiving module 1402, and a sending module 1403. The obtaining module 1401 is configured to obtain information about the plurality of nodes. The receiving module 1402 is configured to receive authentication requests from the plurality of nodes. The sending module 1403 is configured to separately send authentication responses for the plurality of nodes to the plurality of nodes based on the information about the plurality of nodes.

Optionally, the information about the plurality of nodes includes identifiers of the plurality of nodes and key information of the plurality of nodes.

Optionally, the plurality of nodes includes a primary authentication node and a plurality of secondary authentication nodes. If authentication on the plurality of nodes succeeds, the sending module 1403 is further configured to send an identifier of the secondary authentication node and key information of the secondary authentication node to the primary authentication node. The sending module 1403 is further configured to send an identifier of the primary authentication node and key information of the primary authentication node to the secondary authentication node.

Figure 15:
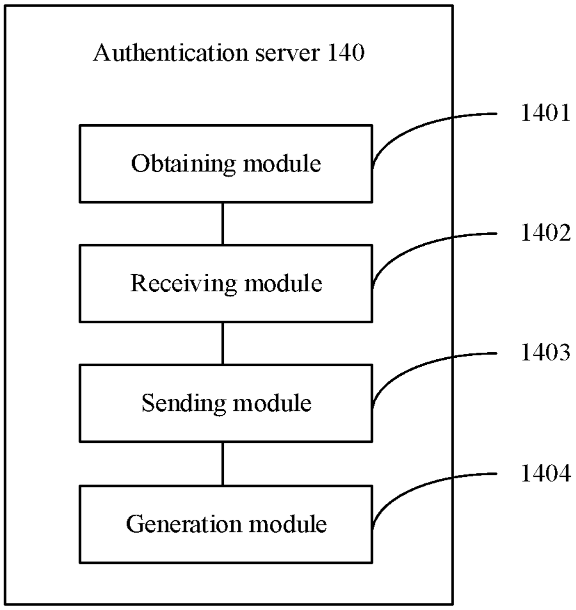
FIG. 15 is a schematic structural diagram of an authentication server according to an embodiment of this application.

Optionally, the plurality of nodes further includes subnodes of the plurality of secondary authentication nodes. As shown in FIG. 15, the authentication server further includes a generation module 1404. The generation module 1404 is configured to generate an authentication key for each of the subnodes of the plurality of secondary authentication nodes. Subnodes of one secondary authentication node have a same authentication key. The sending module 1403 is further configured to send an identifier and the authentication key of the subnode of the secondary authentication node to the secondary authentication node. The sending module 1403 is further configured to send the identifier of the secondary authentication node and the authentication key to the subnode of the secondary authentication node.

Optionally, the obtaining module 1401 is further configured to obtain an identifier of a replacement node and key information of the replacement node. The receiving module 1402 is further configured to receive an authentication request from the replacement node. The sending module 1403 is further configured to send an authentication response for the replacement node to the replacement node based on the identifier of the replacement node and the key information of the replacement node.

Optionally, if authentication on the replacement node succeeds and the replacement node has a parent node, the sending module 1403 is further configured to send the identifier of the replacement node and the key information of the replacement node to the parent node of the replacement node. The sending module 1403 is further configured to send an identifier of the parent node of the replacement node and key information of the parent node of the replacement node to the replacement node.

Optionally, if the replacement node is a subnode of a secondary authentication node, the key information of the replacement node and the key information of the parent node of the replacement node each include the authentication key.

Optionally, if the replacement node has a subnode, the sending module 1403 is further configured to send an identifier of the subnode of the replacement node and key information of the subnode of the replacement node to the replacement node. The sending module 1403 is further configured to send the identifier of the replacement node and the key information of the replacement node to the subnode of the replacement node.

Optionally, the receiving module 1402 is further configured to receive an authentication complete message from the replacement node.

All related content of the operations in the foregoing method embodiment may be cited in function descriptions of the corresponding function modules. Details are not described herein again.

In this embodiment, the authentication server 140 is presented in a form of function modules obtained through division in an integration manner. The "module" herein may be a specific application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the authentication server 140 may use a form shown in FIG. 4.

For example, the processor 401 in FIG. 4 may invoke a computer-executable instruction stored in the memory 404, so that the authentication server 140 performs the authentication method in the foregoing method embodiment.

For example, functions/implementation processes of the obtaining module 1401, the receiving module 1402, the sending module 1403, and the generation module 1404 in FIG. 15 may be implemented by the processor 401 in FIG. 4 by invoking the computer-executable instruction stored in the memory 404. Alternatively, functions/implementation processes of the obtaining module 1401 and the generation module 1404 in FIG. 15 may be implemented by the processor 401 in FIG. 4 by invoking the computer-executable instruction stored in the memory 404, and functions/implementation processes of the receiving module 1402 and the sending module 1403 in FIG. 15 may be implemented through the communications interface 403 in FIG. 4.

The authentication server 140 provided in this embodiment can perform the foregoing authentication method. Therefore, for technical effects that can be achieved by the authentication server 140, refer to the foregoing method embodiment. Details are not described herein again.

In the embodiments of this application, function modules of the in-vehicle system may be obtained through division based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of this application is an example, and is merely logical function division and may be other division during actual implementation.

Figure 16:
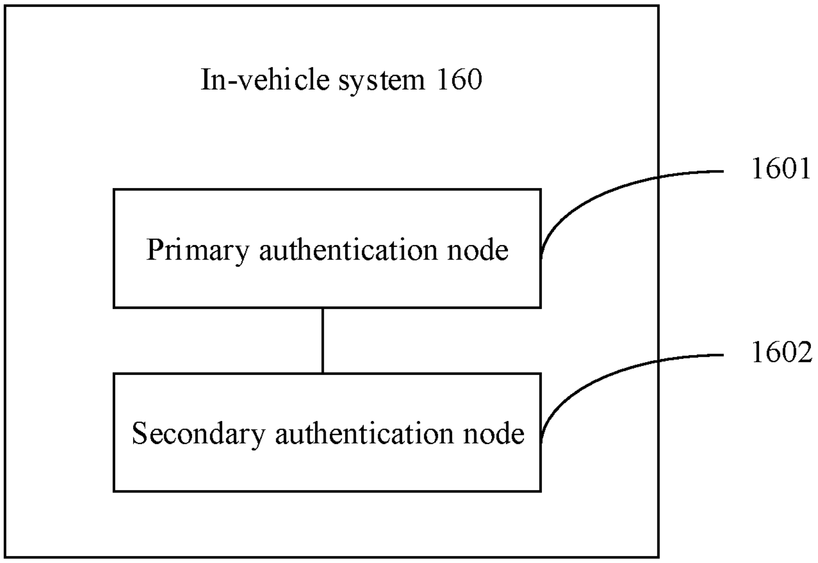
FIG. 16 is a schematic structural diagram of an in-vehicle system according to an embodiment of this application.

For example, if each function module is obtained through integration, FIG. 16 is a schematic structural diagram of an in-vehicle system 160. The in-vehicle system 160 includes a plurality of nodes. The plurality of nodes includes a primary authentication node 1601 and a secondary authentication node 1602. The plurality of nodes is configured to send authentication requests of the plurality of nodes to an authentication server. The plurality of nodes is further configured to receive authentication responses for the plurality of nodes from the authentication server.

Optionally, the primary authentication node 1601 is connected to the secondary authentication node 1602. If authentication on the plurality of nodes succeeds, the primary authentication node 1601 is configured to receive an identifier of the secondary authentication node and key information of the secondary authentication node from the authentication server. The secondary authentication node 1602 is configured to receive an identifier of the primary authentication node and key information of the primary authentication node from the authentication server. The primary authentication node 1602 is further configured to perform authentication on the secondary authentication node.

Figure 17:
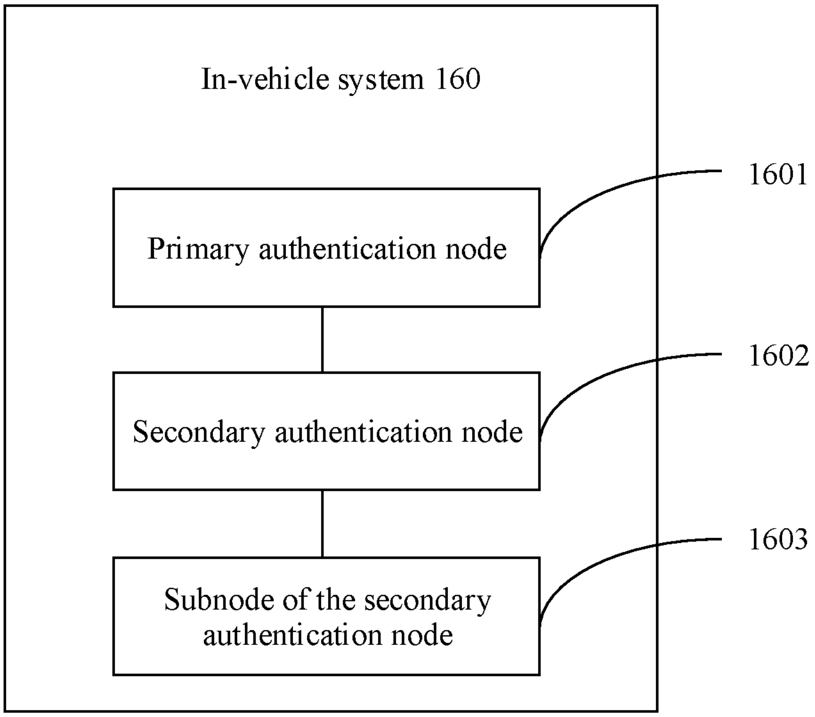
FIG. 17 is a schematic structural diagram of an in-vehicle system according to an embodiment of this application.

Optionally, as shown in FIG. 17, the plurality of nodes further includes a subnode 1603 of the secondary authentication node. The secondary authentication node 1602 is connected to the subnode 1603 of the secondary authentication node. If the authentication performed by the primary authentication node 1601 on the secondary authentication node 1602 succeeds, the secondary authentication node 1602 is further configured to receive an identifier and an authentication key of the subnode of the secondary authentication node from the authentication server. The authentication key is generated by the authentication server for each of the subnodes of the plurality of secondary authentication nodes, and subnodes of one secondary authentication node have a same authentication key. The subnode 1603 of the secondary authentication node is configured to receive the identifier of the secondary authentication node and the authentication key from the authentication server. The secondary authentication node 1602 is further configured to perform authentication on the subnode 1603 of the secondary authentication node.

Figure 18:
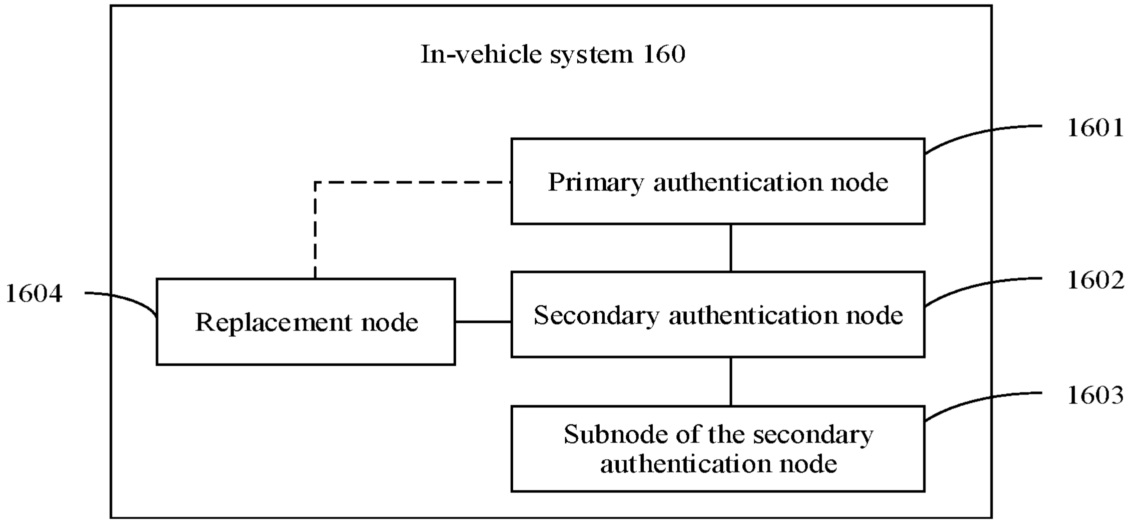
FIG. 18 is a schematic structural diagram of an in-vehicle system according to an embodiment of this application.

Optionally, as shown in FIG. 18, the in-vehicle system 160 further includes a replacement node 1604. The replacement node 1604 is configured to send an authentication request of the replacement node to the authentication server. The replacement node 1604 is further configured to receive an authentication response for the replacement node from the authentication server.

Optionally, if authentication on the replacement node 1604 succeeds, a parent node of the replacement node is configured to receive an identifier of the replacement node and key information of the replacement node from the authentication server. The replacement node 1604 is further configured to receive an identifier of the parent node of the replacement node and key information of the parent node of the replacement node from the authentication server. The replacement node 1604 is further configured to perform two-way authentication on the parent node of the replacement node by using the identifier of the replacement node, the key information of the replacement node, the identifier of the parent node of the replacement node, and the key information of the parent node of the replacement node.

Optionally, if the replacement node 1604 is a subnode of the secondary authentication node, the key information of the replacement node and the key information of the parent node of the replacement node each include the authentication key.

Optionally, if the authentication performed by the replacement node 1604 on the parent node of the replacement node succeeds, and the replacement node has a subnode, the replacement node 1604 is further configured to receive an identifier of the subnode of the replacement node and key information of the subnode of the replacement node from the authentication server. The subnode of the replacement node is configured to receive the identifier of the replacement node and the key information of the replacement node from the authentication server. The replacement node 1604 is further configured to perform two-way authentication on the subnode of the replacement node by using the identifier of the subnode of the replacement node, the key information of the subnode of the replacement node, the identifier of the replacement node, and the key information of the replacement node.

Optionally, if the authentication performed by the replacement node 1604 on the parent node of the replacement node succeeds, or if the authentication performed by the replacement node 1604 on the parent node of the replacement node succeeds and the authentication performed by the replacement node on the subnode of the replacement node succeeds, the replacement node 1604 is further configured to send an authentication complete message to the authentication server.

All related content of the operations in the foregoing method embodiment may be cited in function descriptions of the corresponding function modules. Details are not described herein again.

The in-vehicle system 160 provided in this embodiment may perform the foregoing authentication method. Therefore, for technical effects that can be achieved by the in-vehicle system 160, refer to the foregoing method embodiment. Details are not described herein again.

In the embodiments of this application, function modules of the primary authentication node may be obtained through division based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of this application is an example, and is merely logical function division and may be other division during actual implementation.

Figure 19:
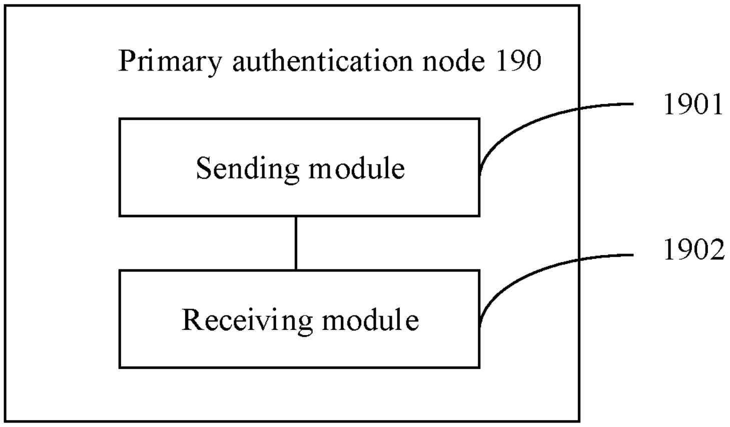
FIG. 19 is a schematic structural diagram of a primary authentication node according to an embodiment of this application.

For example, if each function module is obtained through integration, FIG. 19 is a schematic structural diagram of a primary authentication node 190. The primary authentication node 190 includes a sending module 1901 and a receiving module 1902. The sending module 1901 is configured to send an authentication request of the primary authentication node to an authentication server. The receiving module 1902 is configured to receive an authentication response for the primary authentication node from the authentication server. The receiving module 1902 is further configured to receive an identifier of a secondary authentication node and key information of the secondary authentication node from the authentication server.

Figure 20:
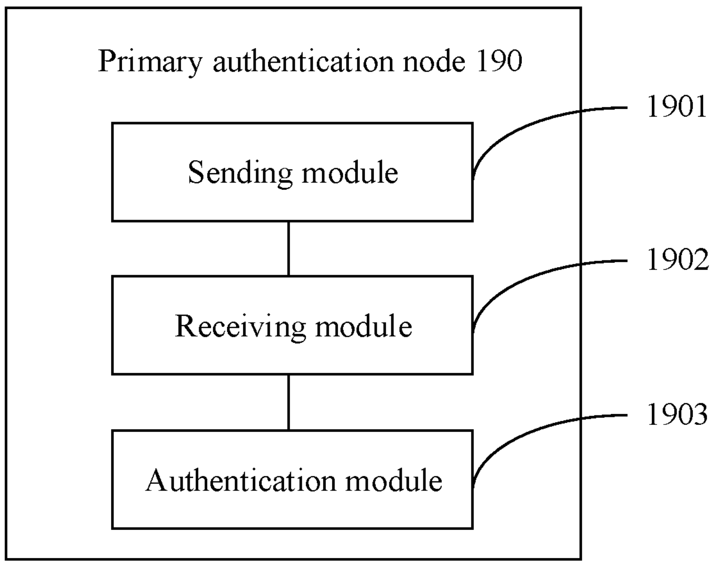
FIG. 20 is a schematic structural diagram of a primary authentication node according to an embodiment of this application.

Optionally, as shown in FIG. 20, the primary authentication node 190 further includes an authentication module 1903. The authentication module 1903 is configured to perform authentication on the secondary authentication node.

Optionally, the primary authentication node is an initially deployed primary authentication node, or the primary authentication node is a primary authentication node obtained after device replacement.

All related content of the operations in the foregoing method embodiment may be cited in function descriptions of the corresponding function modules. Details are not described herein again.

In this embodiment, the primary authentication node 190 is presented in a form of function modules obtained through division in an integration manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the primary authentication node 190 may use a form shown in FIG. 4.

For example, the processor 401 in FIG. 4 may invoke a computer-executable instruction stored in the memory 404, so that the primary authentication node 190 performs the authentication method in the foregoing method embodiment.

For example, functions/implementation processes of the sending module 1901, the receiving module 1902, and the authentication module 1903 in FIG. 20 may be implemented by the processor 401 in FIG. 4 by invoking the computer-executable instruction stored in the memory 404. Alternatively, a function/an implementation process of the authentication module 1903 in FIG. 20 may be implemented by the processor 401 in FIG. 4 by invoking the computer-executable instruction stored in the memory 404, and functions/implementation processes of the sending module 1901 and the receiving module 1902 in FIG. 20 may be implemented through the communications interface 403 in FIG. 4.

The primary authentication node 190 provided in this embodiment can perform the foregoing authentication method. Therefore, for technical effects that can be achieved by the primary authentication node 190, refer to the foregoing method embodiment. Details are not described herein again.

In the embodiments of this application, function modules of the secondary authentication node may be obtained through division based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of this application is an example, and is merely logical function division and may be other division during actual implementation.

Figure 21:
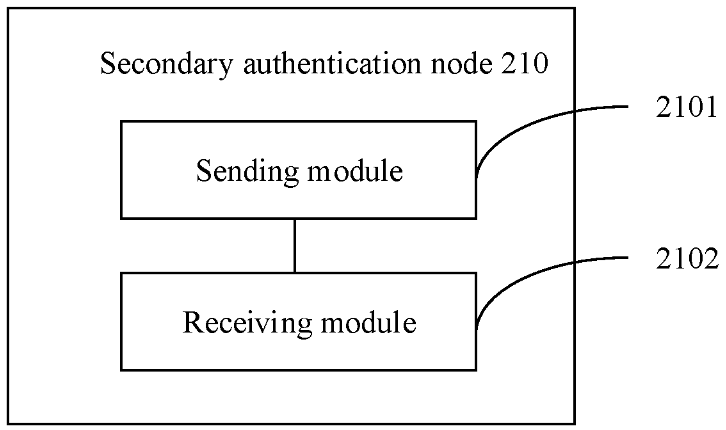
FIG. 21 is a schematic structural diagram of a secondary authentication node according to an embodiment of this application.

For example, if each function module is obtained through integration, FIG. 21 is a schematic structural diagram of a secondary authentication node 210. The secondary authentication node 210 includes a sending module 2101 and a receiving module 2102. The sending module 2101 is configured to send an authentication request of the secondary authentication node to an authentication server. The receiving module 2102 is configured to receive an authentication response for the secondary authentication node from the authentication server. The receiving module 2102 is further configured to receive an identifier of a primary authentication node and key information of the primary authentication node from the authentication server.

Figure 22:
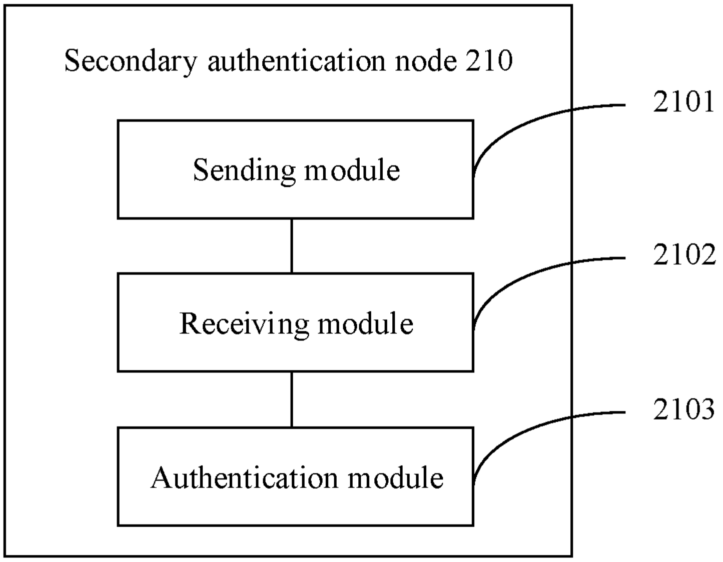
FIG. 22 is a schematic structural diagram of a secondary authentication node according to an embodiment of this application.

Optionally, as shown in FIG. 22, the secondary authentication node 210 further includes an authentication module 2103. The receiving module 2102 is further configured to receive an identifier and an authentication key of a subnode of the secondary authentication node from the authentication server. The authentication key is generated by the authentication server for the subnode of the secondary authentication node. The authentication module 2103 is configured to perform authentication on the subnode of the secondary authentication node.

Optionally, the secondary authentication node is an initially deployed secondary authentication node, or the secondary authentication node is a secondary authentication node obtained after device replacement.

All related content of the operations in the foregoing method embodiment may be cited in function descriptions of the corresponding function modules. Details are not described herein again.

In this embodiment, the secondary authentication node 210 is presented in a form of function modules obtained through division in an integration manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the secondary authentication node 210 may use a form shown in FIG. 4.

For example, the processor 401 in FIG. 4 may invoke a computer-executable instruction stored in the memory 404, so that the secondary authentication node 210 performs the authentication method in the foregoing method embodiment.

For example, functions/implementation processes of the sending module 2101, the receiving module 2102, and the authentication module 2103 in FIG. 22 may be implemented by the processor 401 in FIG. 4 by invoking the computer-executable instruction stored in the memory 404. Alternatively, a function/an implementation process of the authentication module 2103 in FIG. 22 may be implemented by the processor 401 in FIG. 4 by invoking the computer-executable instruction stored in the memory 404, and functions/implementation processes of the sending module 2101 and the receiving module 2102 in FIG. 22 may be implemented through the communications interface 403 in FIG. 4.

The secondary authentication node 210 provided in this embodiment can perform the foregoing authentication method. Therefore, for technical effects that can be achieved by the secondary authentication node 210, refer to the foregoing method embodiment. Details are not described herein again.

In the embodiments of this application, function modules of the subnode of the secondary authentication node may be obtained through division based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of this application is an example, and is merely logical function division and may be other division during actual implementation.

Figure 23:
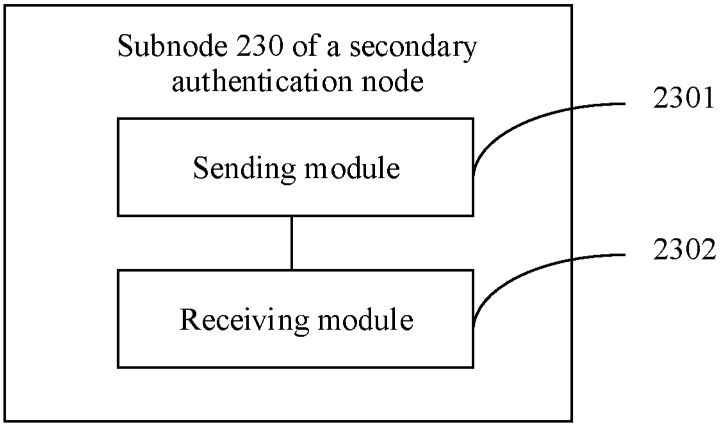
FIG. 23 is a schematic structural diagram of a subnode of a secondary authentication node according to an embodiment of this application.

For example, if each function module is obtained through integration, FIG. 23 is a schematic structural diagram of a subnode 230 of a secondary authentication node. The subnode 230 of the secondary authentication node includes a sending module 2301 and a receiving module 2302. The sending module 2301 is configured to send an authentication request of the subnode of the secondary authentication node to an authentication server. The receiving module 2302 is configured to receive an authentication response for the subnode of the secondary authentication node from the authentication server. The receiving module 2302 is further configured to receive an identifier of the secondary authentication node and an authentication key from the authentication server. The authentication key is generated by the authentication server for the subnode of the secondary authentication node.

Optionally, the subnode of the authentication node is a subnode of an initially deployed secondary authentication node, or the subnode of the secondary authentication node is a subnode of a secondary authentication node obtained after device replacement.

All related content of the operations in the foregoing method embodiment may be cited in function descriptions of the corresponding function modules. Details are not described herein again.

In this embodiment, the subnode 230 of the secondary authentication node is presented in a form of function modules obtained through division in an integration manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the subnode 230 of the secondary authentication node may use a form shown in FIG. 4.

For example, the processor 401 in FIG. 4 may invoke a computer-executable instruction stored in the memory 404, so that the subnode 230 of the secondary authentication node performs the authentication method in the foregoing method embodiment.

For example, functions/implementation processes of the sending module 2301 and the receiving module 2302 in FIG. 23 may be implemented by the processor 401 in FIG. 4 by invoking the computer-executable instruction stored in the memory 404. Alternatively, functions/implementation processes of the sending module 2301 and the receiving module 2302 in FIG. 23 may be implemented through the communications interface 403 in FIG. 4.

The subnode 230 of the secondary authentication node provided in this embodiment can perform the foregoing authentication method. Therefore, for technical effects that can be achieved by the subnode 230 of the secondary authentication node, refer to the foregoing method embodiment. Details are not described herein again.

Figure 24:
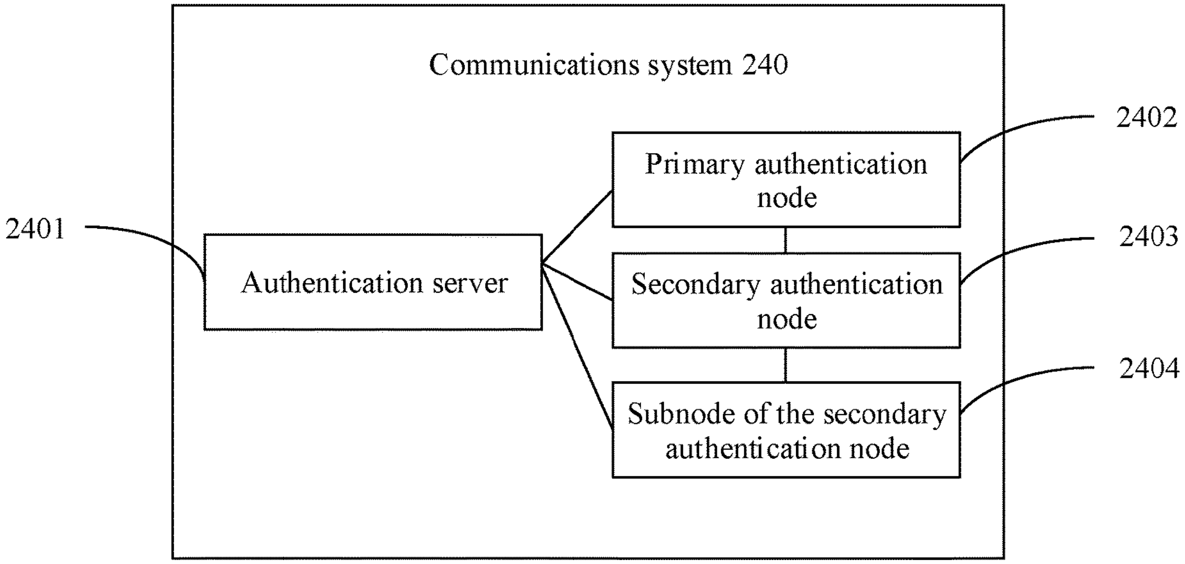
FIG. 24 is a schematic structural diagram of a communications system according to an embodiment of this application.

FIG. 24 is a schematic composition diagram of a communications system. As shown in FIG. 24, the communications system 240 may include an authentication server 2401, a primary authentication node 2402, a secondary authentication node 2403, and a subnode 2404 of the secondary authentication node. It should be noted that FIG. 24 is merely an example of the accompanying drawing. Network elements included in the communications system shown in FIG. 24 and a quantity of the network elements are not limited in this embodiment of this application.

The authentication server 2401 has a function of the authentication server 140 shown in FIG. 14 or FIG. 15, and may be configured to obtain information about the plurality of nodes, and may be further configured to receive authentication requests from the plurality of nodes, and separately send authentication responses for the plurality of nodes to the plurality of nodes based on the information about the plurality of nodes.

The primary authentication node 2402 has a function of the primary authentication node 190 shown in FIG. 19 or FIG. 20, and is configured to send an authentication request of the primary authentication node to the authentication server 2101, and receive an authentication response for the primary authentication node from the authentication server 2401. The primary authentication node 2402 is further configured to receive an identifier of the secondary authentication node and key information of the secondary authentication node from the authentication server 2401.

The secondary authentication node 2403 has a function of the secondary authentication node 210 shown in FIG. 21 or FIG. 22, and is configured to send an authentication request of the secondary authentication node to the authentication server 2101, and receive an authentication response for the secondary authentication node from the authentication server 2401. The secondary authentication node 2403 is further configured to receive an identifier of the primary authentication node and key information of the primary authentication node from the authentication server 2401.

The subnode 2404 of the secondary authentication node has a function of the subnode 230 of the secondary authentication node shown in FIG. 23, and is configured to send an authentication request of the subnode of the secondary authentication node to the authentication server 2401, and receive an authentication response for the subnode of the secondary authentication node from the authentication server 2401. The subnode 2404 of the secondary authentication node is further configured to receive the identifier of the secondary authentication node and an authentication key from the authentication server 2401.

It should be noted that all related content of the steps in the foregoing method embodiments may be cited in function descriptions of corresponding network elements of the communications system. Details are not described herein again.

The authentication server 2401, the primary authentication node 2402, the secondary authentication node 2403, or the subnode 2404 of the secondary authentication node provided in this embodiment may perform the foregoing authentication method. Therefore, for technical effects that can be achieved by the authentication server 2401, the primary authentication node 2402, the secondary authentication node 2403, or the subnode 2404 of the secondary authentication node, refer to the foregoing method embodiment. Details are not described herein again.

All or some of the foregoing embodiments may be implemented by using software, hardware, firmware, or any combination thereof. When a software program is used to implement the embodiments, the embodiments may be implemented all or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the spirit and scope of this application. Correspondingly, this specification and accompanying drawings are merely example description of this application defined by the accompanying claims, and is considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method comprising:

sending, to an authentication server, authentication requests of a plurality of nodes of an in-vehicle system;

receiving, in response to authentication on the nodes succeeding, by a primary authentication node of the nodes, and from the authentication server, a first identifier of a secondary authentication node of the nodes and first key information of the secondary authentication node, wherein the first key information comprises a registration key of the secondary authentication node, wherein the registration key is an encrypted symmetric key of the secondary authentication node when a key type of the secondary authentication node is a symmetric key, and wherein the registration key is a public key of the secondary authentication node when the key type is an asymmetric key;

performing, by the primary authentication node, authentication on the secondary authentication node based on the first identifier, and the first key information when the in-vehicle system has been started;

receiving, from the authentication server, a second identifier of a subnode of the secondary authentication node and an authentication key for the subnode to perform authentication on the subnode, wherein all subnodes of the secondary authentication node share the same authentication key;

obtaining, by the authentication server, a third identifier and second key information of a replacement node, wherein the replacement node is another subnode of the secondary authentication node;

receiving, by the authentication server, an authentication request from the replacement node; and sending, by the authentication server, an authentication response for the replacement node based on the third identifier and the second key information of the replacement node, wherein, in response to authentication on the replacement node succeeding and the replacement node having a parent node that is the secondary authentication node, the method further comprises:

receiving, by the parent node and from the authentication server, the third identifier of the replacement node and the second key information of the replacement node;

receiving, by the replacement node and from the authentication server, a fourth identifier of the parent node and third key information of the parent node, wherein each of the second key information and the third key information comprises the authentication key shared by the subnodes of the secondary authentication node; and performing, by the replacement node and using the third identifier, the second key information, the fourth identifier, and the third key information, two-way authentication on the parent node.

2. The method of claim 1, further comprising:

receiving, by the subnode and from the authentication server, the first identifier and the authentication key; and performing, by the secondary authentication node, authentication on the subnode.

3. The method of claim 1, wherein the second key information of the replacement node comprises the same authentication key.

4. The method of claim 1, wherein in response to the two-way authentication on the parent node succeeding and the replacement node having the subnode, the method further comprises:

receiving, by the replacement node and from the authentication server, a fifth identifier of the subnode and fourth key information of the subnode;

receiving, by the subnode and from the authentication server, the second identifier and the second key information; and performing, by the replacement node and using the fifth identifier, the fourth key information, the second identifier, and the second key information, two-way authentication on the subnode.

5. The method of claim 4, further comprising sending, by the replacement node and to the authentication server, an authentication complete message in response to the two-way authentication on the parent node succeeding or in response to the two-way authentication on the parent node succeeding and the two-way authentication on the subnode succeeding.

6. A vehicle-mounted device in an in-vehicle system, comprising:

a memory configured to store instructions; and a processor coupled to the memory, wherein when executed by the processor, the instructions cause the vehicle-mounted device to be configured to:

send, to an authentication server, authentication requests of a plurality of nodes, wherein the nodes comprise a primary authentication node, a secondary authentication node, and a subnode of the secondary authentication node;

receive, from the authentication server and in response to authentication on the nodes succeeding, a first identifier of the secondary authentication node and first key information of the secondary authentication node, wherein the first key information comprises a registration key of the secondary authentication node, wherein the registration key is an encrypted symmetric key of the secondary authentication node when a key type of the secondary authentication node is a symmetric key, and wherein the registration key is a public key of the secondary authentication node when the key type is an asymmetric key;

perform authentication on the secondary authentication node based on the first identifier and the first key information when the in-vehicle system has been started;

receive, from the authentication server, a second identifier of the subnode and an authentication key for the subnode to perform authentication on the subnode, wherein subnodes of the secondary authentication node share the same authentication key;

send, to the authentication server, an authentication request of a replacement node, wherein the replacement node is another subnode of the secondary authentication node; and receive, from the authentication server, an authentication response for the replacement node based on a third identifier and second key information of the replacement node, wherein, in response to authentication on the replacement node succeeding and the replacement node having a parent node that is the secondary authentication node, the instructions further cause the vehicle-mounted device to be configured to:

receive, from the authentication server, the third identifier of the replacement node and the second key information of the replacement node;

receive, from the authentication server, a fourth identifier of the parent node and third key information of the parent node, wherein each of the second key information and the third key information comprises the authentication key shared by the subnodes of the secondary authentication node; and perform, using the third identifier, the second key information, the fourth identifier, and the third key information, two-way authentication on the parent node.

7. The vehicle-mounted device of claim 6, wherein when executed by the processor, the instructions further cause the vehicle-mounted device to be configured to:

receive, from the authentication server, the first identifier and the authentication key; and perform authentication on the subnode.

8. The vehicle-mounted device of claim 6, wherein the second key information of the replacement node comprises the same authentication key.

9. The vehicle-mounted device of claim 6, wherein in response to the two-way authentication on the parent node succeeding and the replacement node having the subnode, when executed by the processor, the instructions further cause the vehicle-mounted device to be configured to:

receive, from the authentication server, a fifth identifier of the subnode and fourth key information of the subnode;

receive, from the authentication server, the second identifier and the second key information; and perform, using the fifth identifier, the fourth key information, the second identifier, and the second key information, two-way authentication on the subnode.

10. The vehicle-mounted device of claim 9, wherein when executed by the processor, the instructions further cause the vehicle-mounted device to be configured to send, to the authentication server, an authentication complete message in response to the two-way authentication on the parent node succeeding or in response to the two-way authentication on the parent node succeeding and the two-way authentication on the subnode succeeding.

11. A computer program product comprising computer-executable instructions that are stored on a non-transitory computer readable medium and that, when executed by a processor, cause an in-vehicle system to:

send, using a plurality of nodes of the in-vehicle system, authentication requests of the nodes to an authentication server, wherein the nodes comprise a primary authentication node and a secondary authentication node;

receive, using the primary authentication node, from the authentication server, and in response to authentication on the nodes succeeding, a first identifier of the secondary authentication node of the nodes and first key information of the secondary authentication node, wherein the first key information comprises a registration key of the secondary authentication node, wherein the registration key is an encrypted symmetric key of the secondary authentication node when a key type of the secondary authentication node is a symmetric key, and wherein the registration key is a public key of the secondary authentication node when the key type is an asymmetric key;

perform, using the primary authentication node, authentication on the secondary authentication node based on the first identifier and the first key information, when the in-vehicle system has been started;

receive, from the authentication server, a second identifier of a subnode of the secondary authentication node and an authentication key for the subnode to perform authentication on the subnode, wherein subnodes of the secondary authentication node share the same authentication key;

send, to the authentication server, an authentication request of a replacement node;

receive, from the authentication server, an authentication response for the replacement node based on a third identifier and second key information of the replacement node, wherein, in response to authentication on the replacement node succeeding and the replacement node having a parent node that is the secondary authentication node, the computer-executable instructions further cause the in-vehicle system to:

receive, by the parent node and from the authentication server, the third identifier of the replacement node and the second key information of the replacement node;

receive, by the replacement node and from the authentication server, a fourth identifier of the parent node and third key information of the parent node, wherein each of the second key information and the third key information comprises the authentication key shared by the subnodes of the secondary authentication node; and perform, by the replacement node and using the third identifier, the second key information, the fourth identifier, and the third key information, two-way authentication on the parent node.

12. The computer program product of claim 11, wherein the computer-executable instructions further cause the in-vehicle system to:

receive, using the subnode and from the authentication server, the first identifier and the authentication key; and perform, using the secondary authentication node, authentication on the subnode.

13. The computer program product of claim 11, wherein the second key information of the replacement node comprises the same authentication key.

14. The computer program product of claim 11, wherein in response to the two-way authentication on the parent node succeeding and the replacement node having the subnode, the computer-executable instructions further cause the in-vehicle system to:

receive, using the replacement node and from the authentication server, a fifth identifier of the subnode and fourth key information of the subnode;

receive, using the subnode and from the authentication server, the second identifier and the second key information; and perform, using the replacement node and using the fifth identifier, the fourth key information, the second identifier, and the second key information, two-way authentication on the subnode.

15. The computer program product of claim 14, wherein the computer-executable instructions further cause the in-vehicle system to send, using the replacement node and to the authentication server, an authentication complete message in response to the two-way authentication on the parent node succeeding or in response to the two-way authentication on the parent node succeeding and the two-way authentication on the subnode succeeding.

16. An authentication server comprising:

a memory configured to store instructions; and a processor coupled to the memory, wherein when executed by the processor, the instructions cause the authentication server to be configured to:

obtain information about a plurality of nodes of an in-vehicle system;

receive, from the nodes, authentication requests; and when the in-vehicle system has been started:

perform authentication on the nodes;

send, to a primary authentication node of the nodes and when the authentication succeeds, a first identifier of a secondary authentication node of the nodes and first key information of the secondary authentication node, wherein the first key information comprises a registration key of the secondary authentication node, wherein the registration key is an encrypted symmetric key of the secondary authentication node when a key type of the secondary authentication node is a symmetric key, and wherein the registration key is a public key of the secondary authentication node when the key type is an asymmetric key;

perform authentication on the secondary authentication node based on the first identifier and the first key information;

generate an authentication key for a subnode of the secondary authentication node and a second identifier of the subnode;

send the second identifier and the authentication key to the secondary authentication node to perform authentication on the subnode, wherein subnodes of the secondary authentication node share the same authentication key;

obtain a third identifier of a replacement node and second key information of the replacement node;

receive an authentication request from the replacement node; and send an authentication response for the replacement node based on the third identifier and the second key information, wherein, in response to authentication on the replacement node succeeding and the replacement node having a parent node that is the secondary authentication node:

send the third identifier and the second key information to the parent node;

send a fourth identifier of the parent node and third key information of the parent node to the replacement node, wherein each of the second key information and the third key information comprises the authentication key shared by the subnodes of the secondary authentication node.

17. The authentication server of claim 16, wherein when executed by the processor, the instructions further cause the authentication server to be configured to send the first identifier and the authentication key to the subnode.

18. The authentication server of claim 16, wherein the second key information of the replacement node comprises the same authentication key.

19. The method of claim 1, further comprising sending, by the replacement node to the authentication server in response to the two-way authentication performed by the replacement node on the parent node failing, an authentication failure message indicating that the two-way authentication performed by the replacement node on the parent node failed.

20. The method of claim 1, wherein the secondary authentication node is one of a T-Box, an on-board diagnostics device, a domain controller, or an advanced driver assistance system device, and wherein the subnode is one of an electronic control unit or a sensor.

* * * * *